Nov. 19, 1963 W. JONES ETAL 3,111,065
BOX FORMING MACHINE
Filed Dec. 12, 1961 30 Sheets-Sheet 22
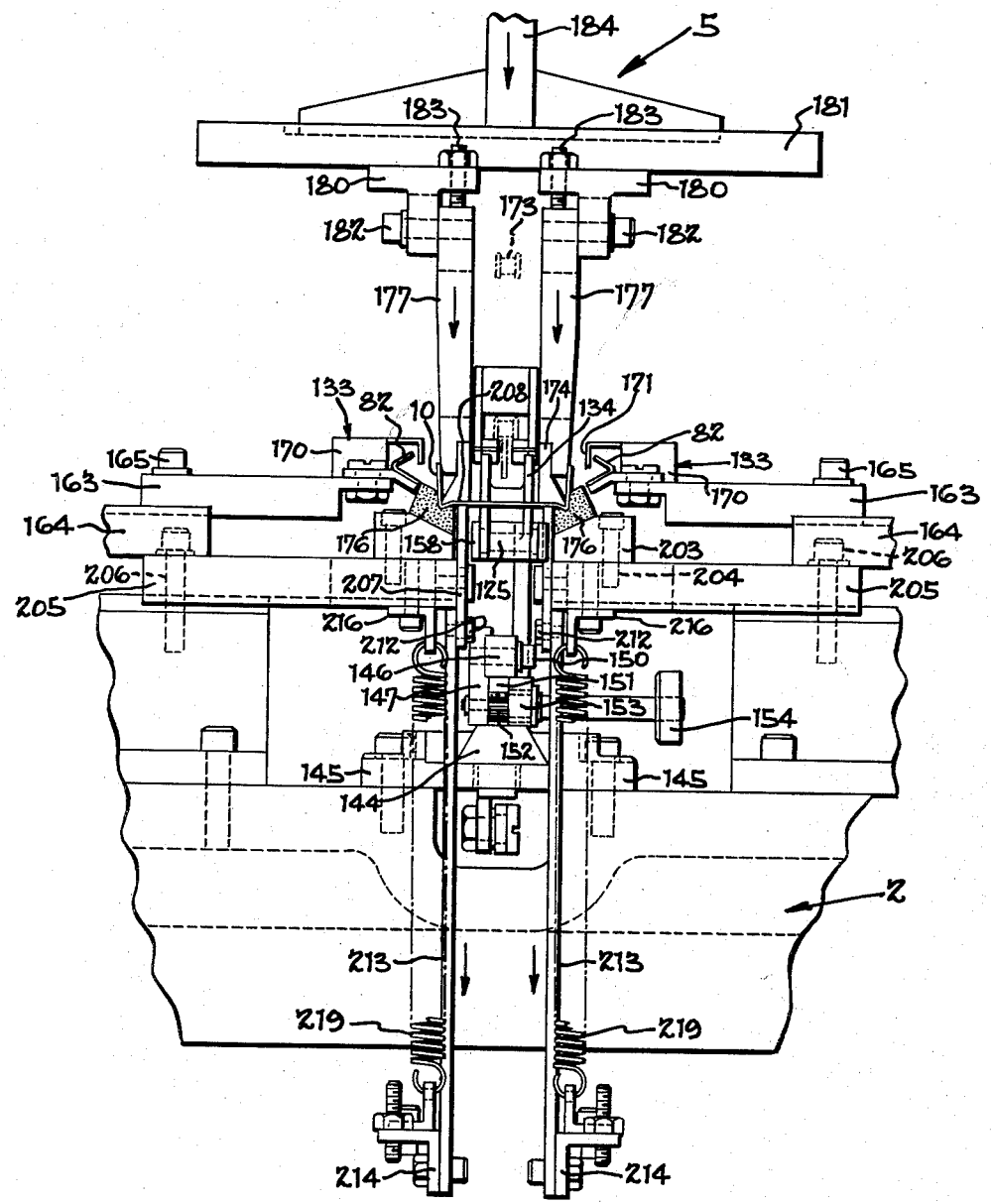

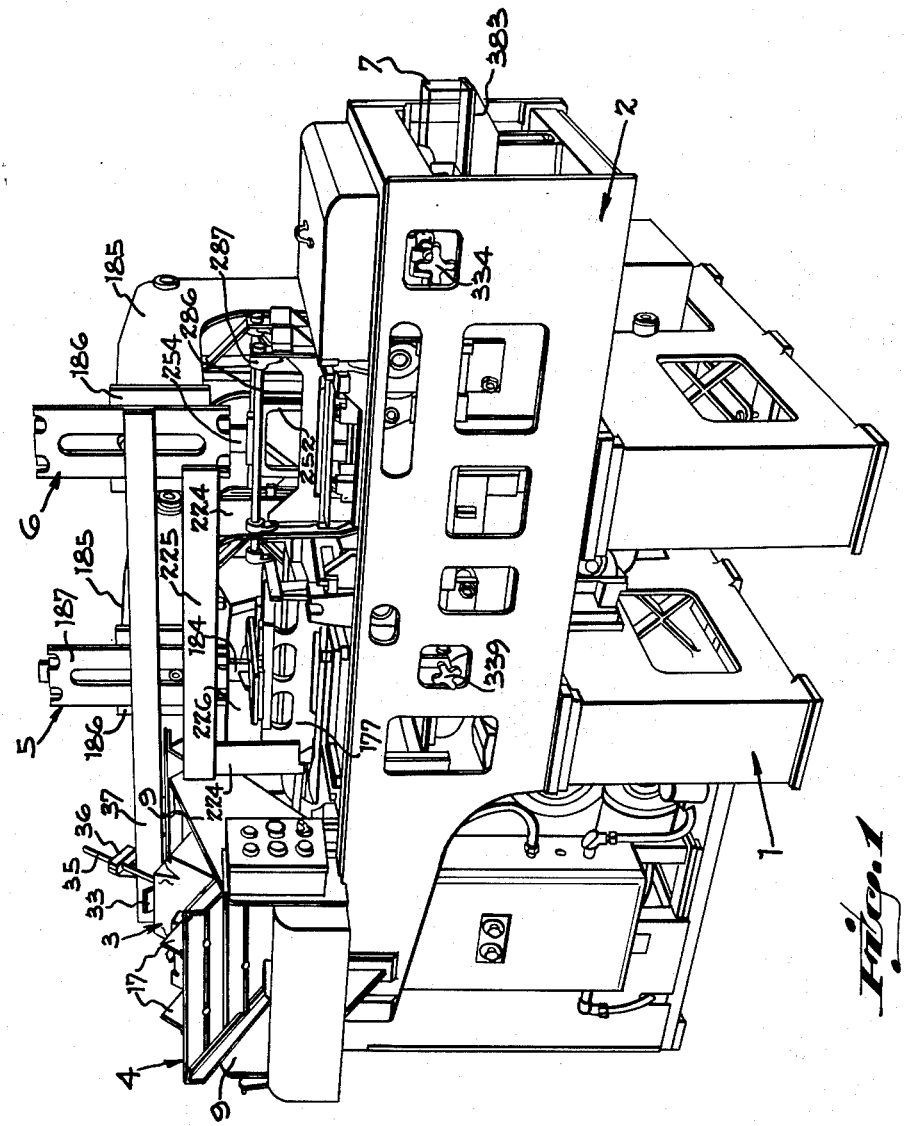

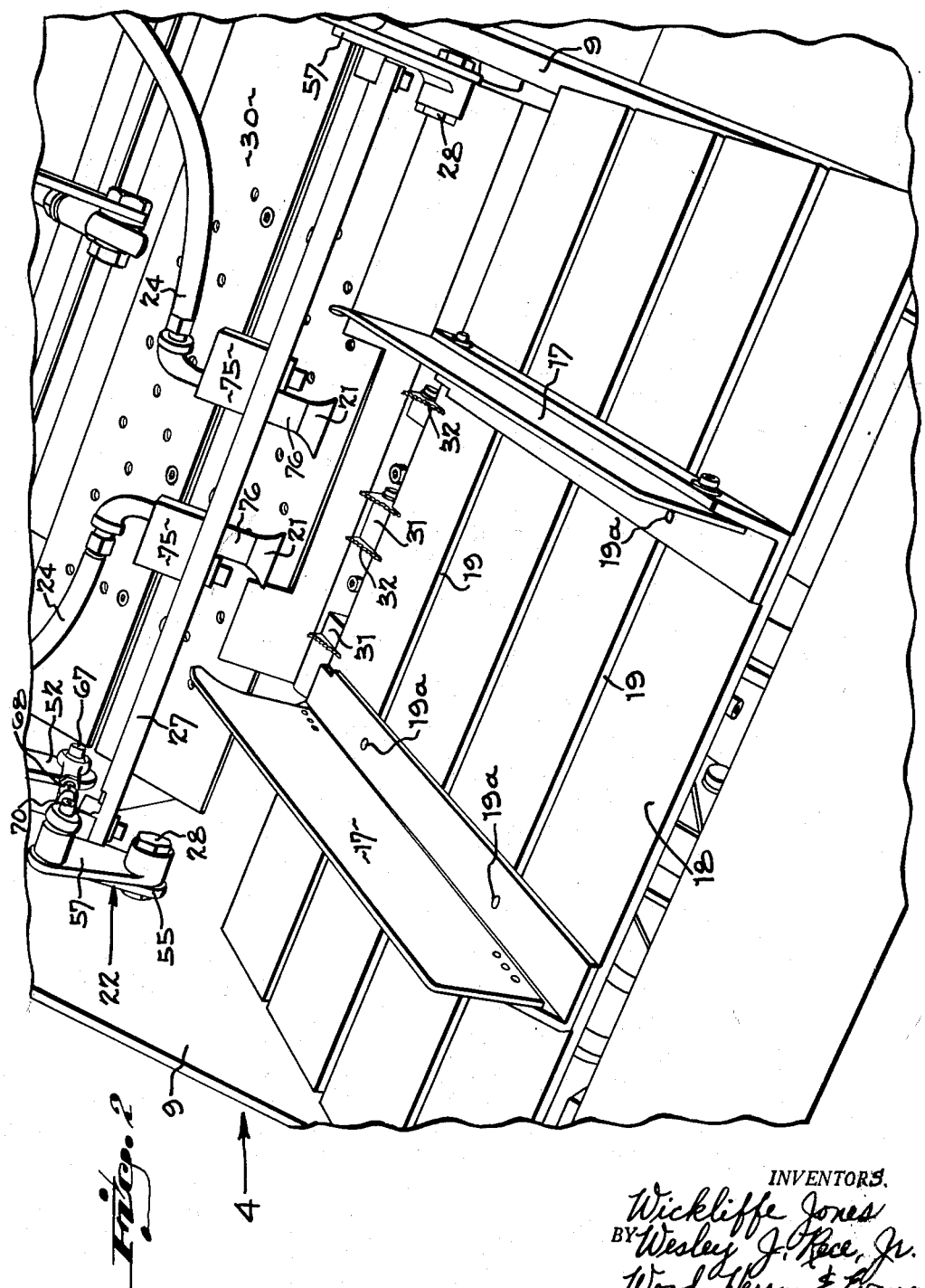

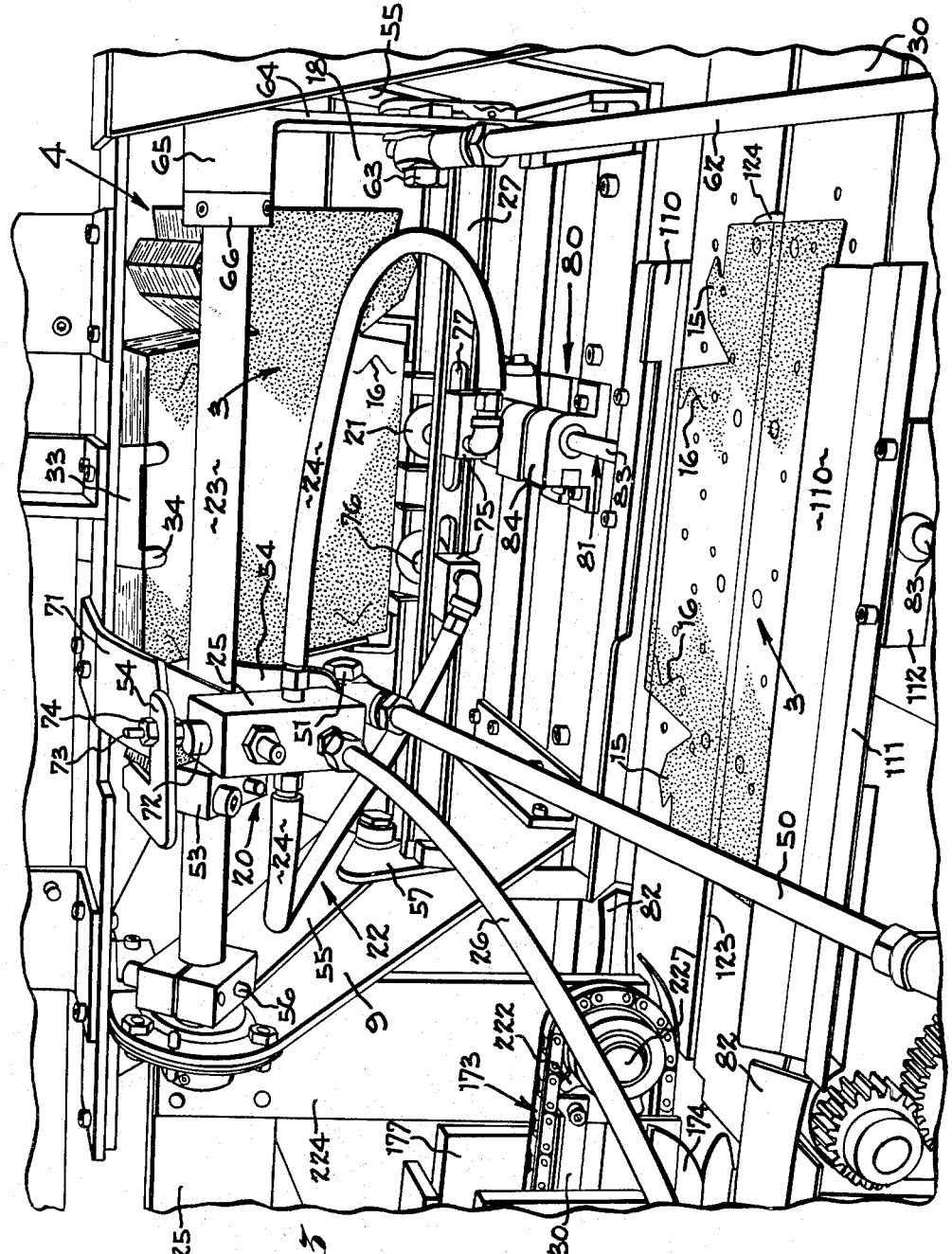

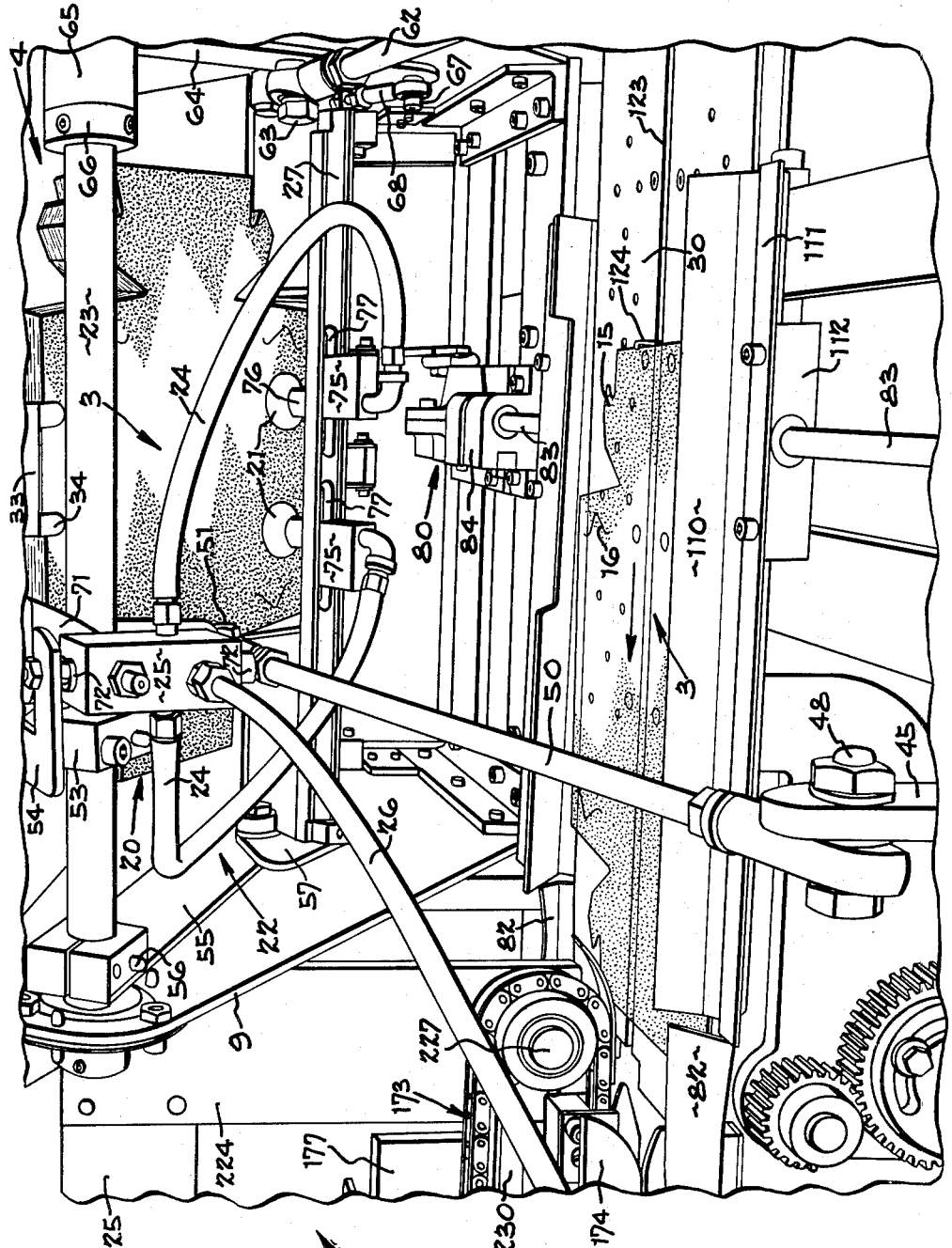

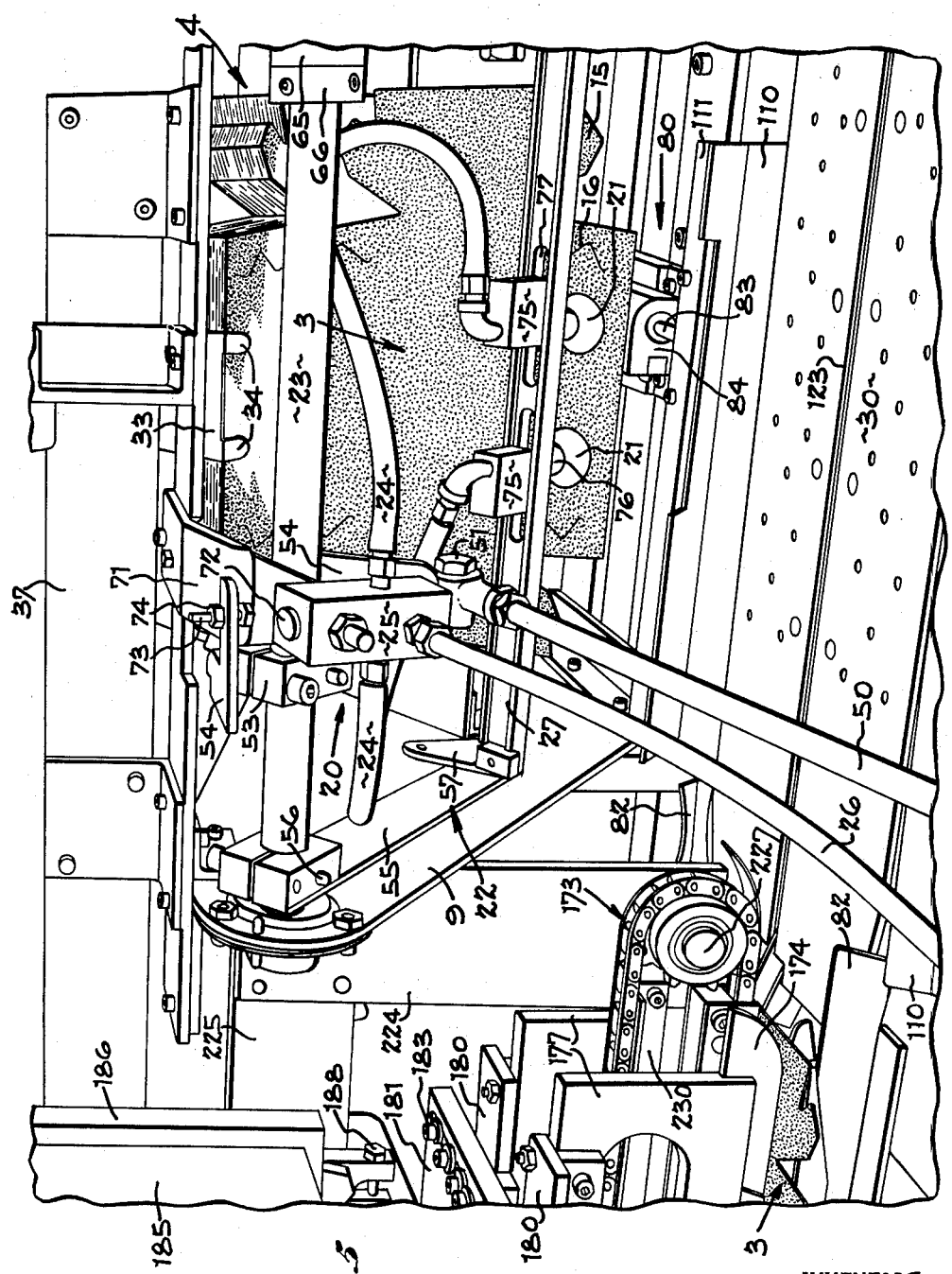

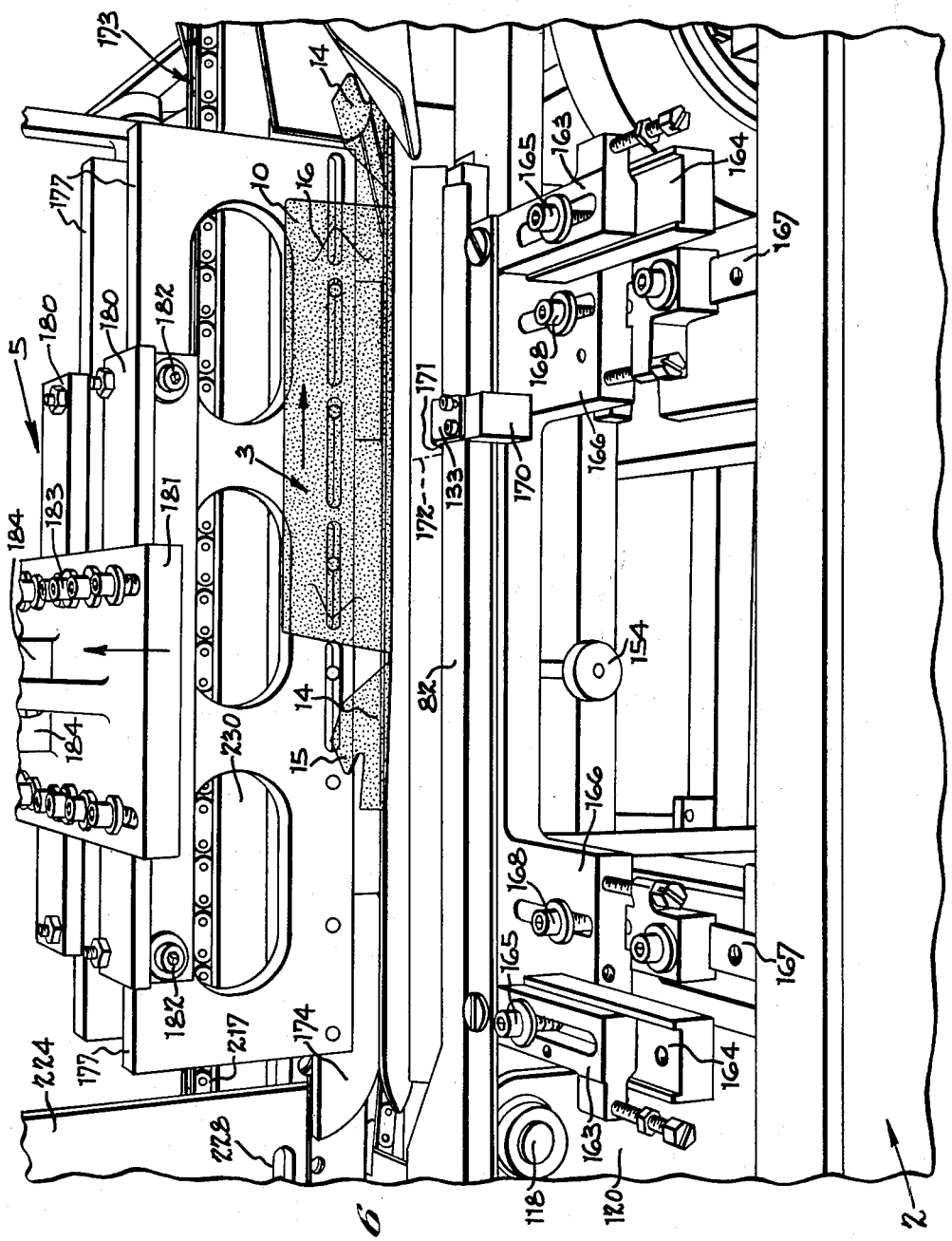

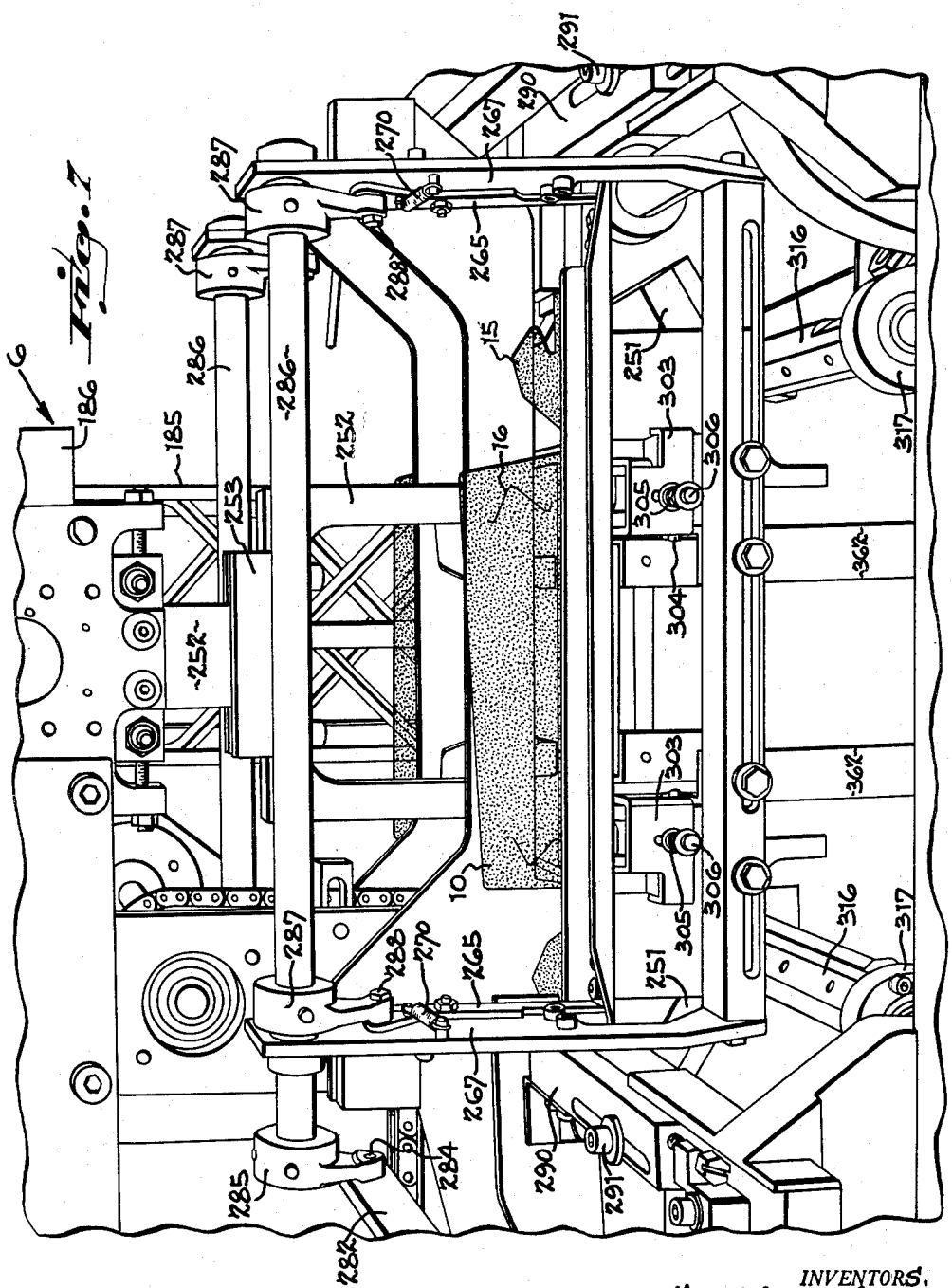

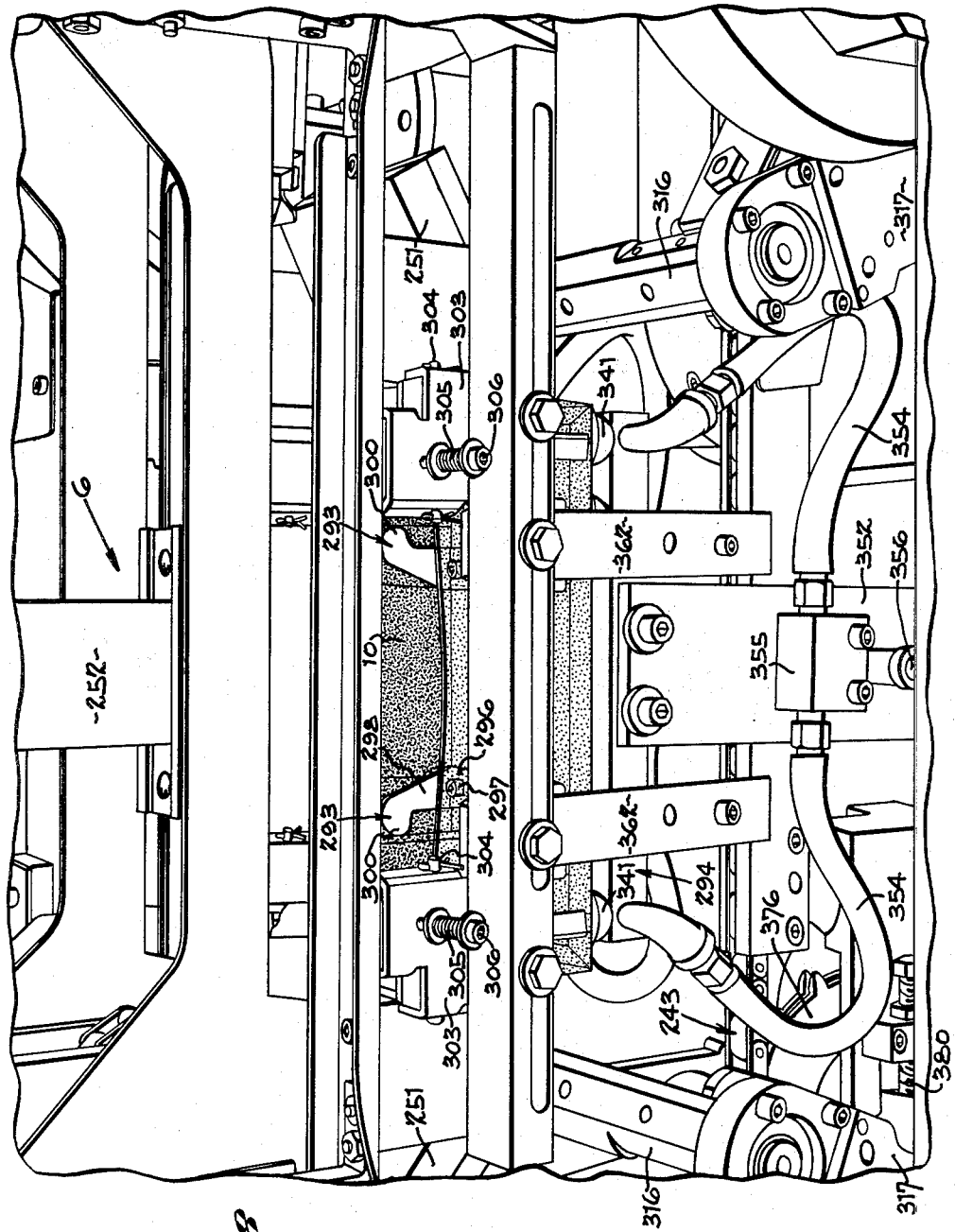

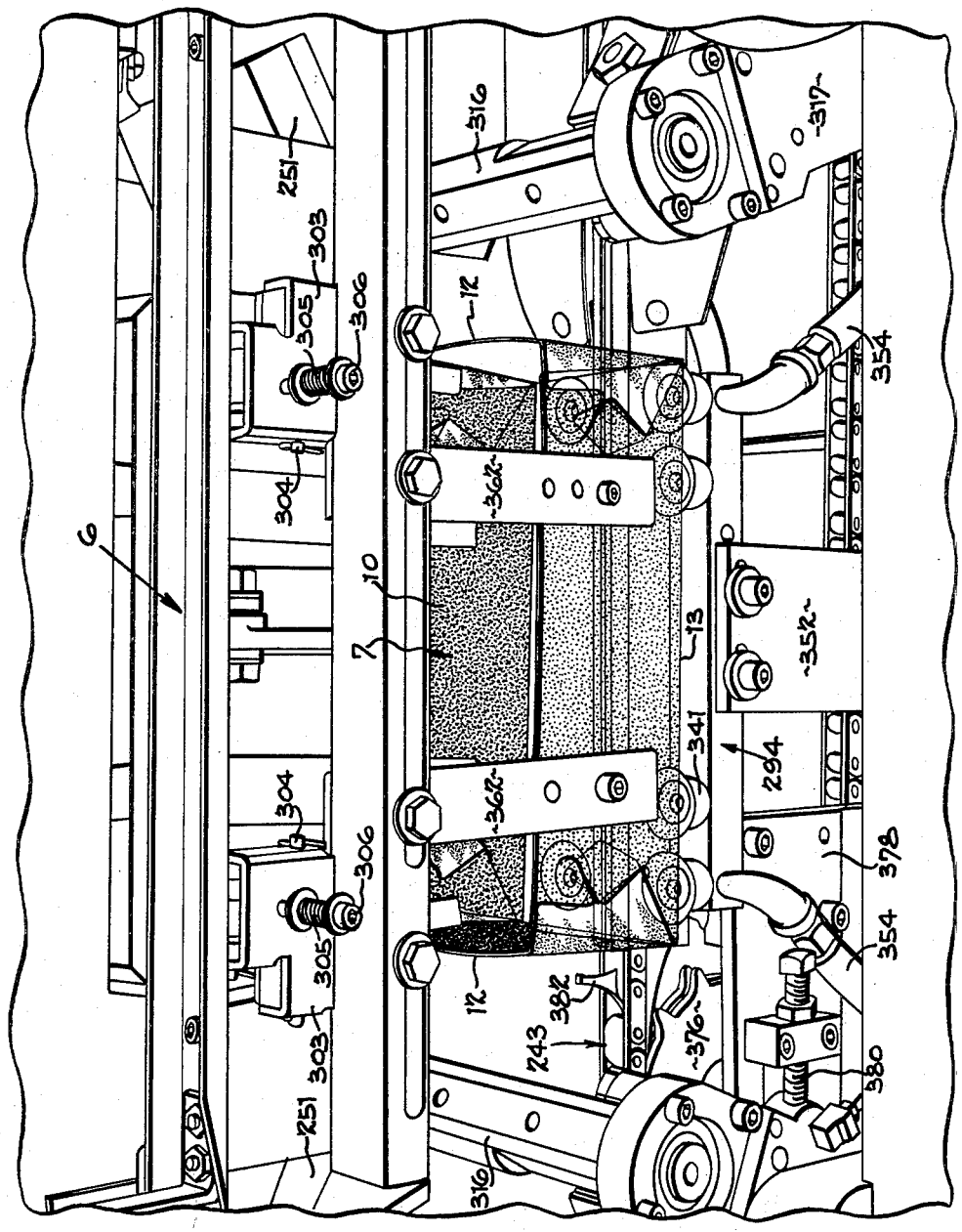

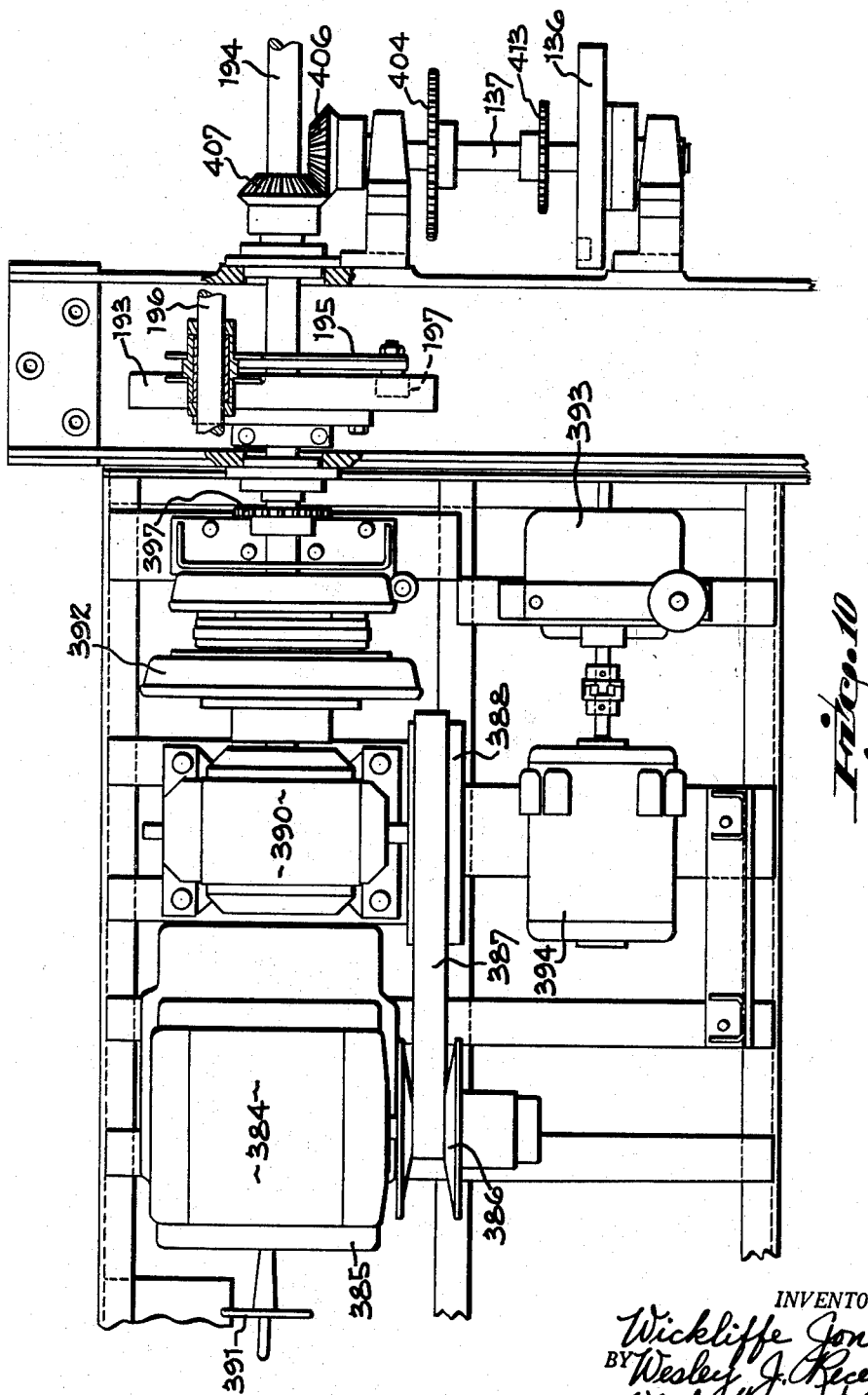

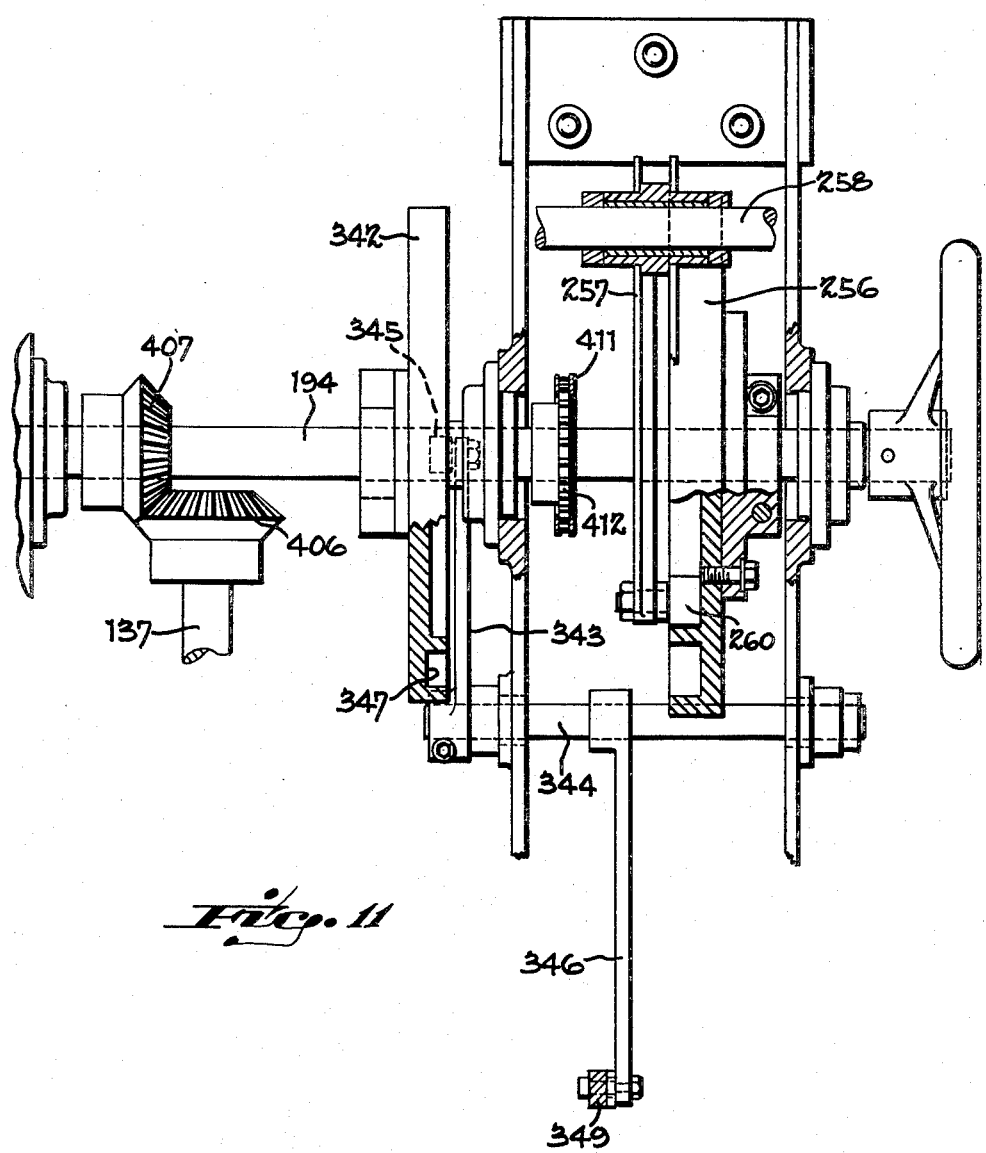

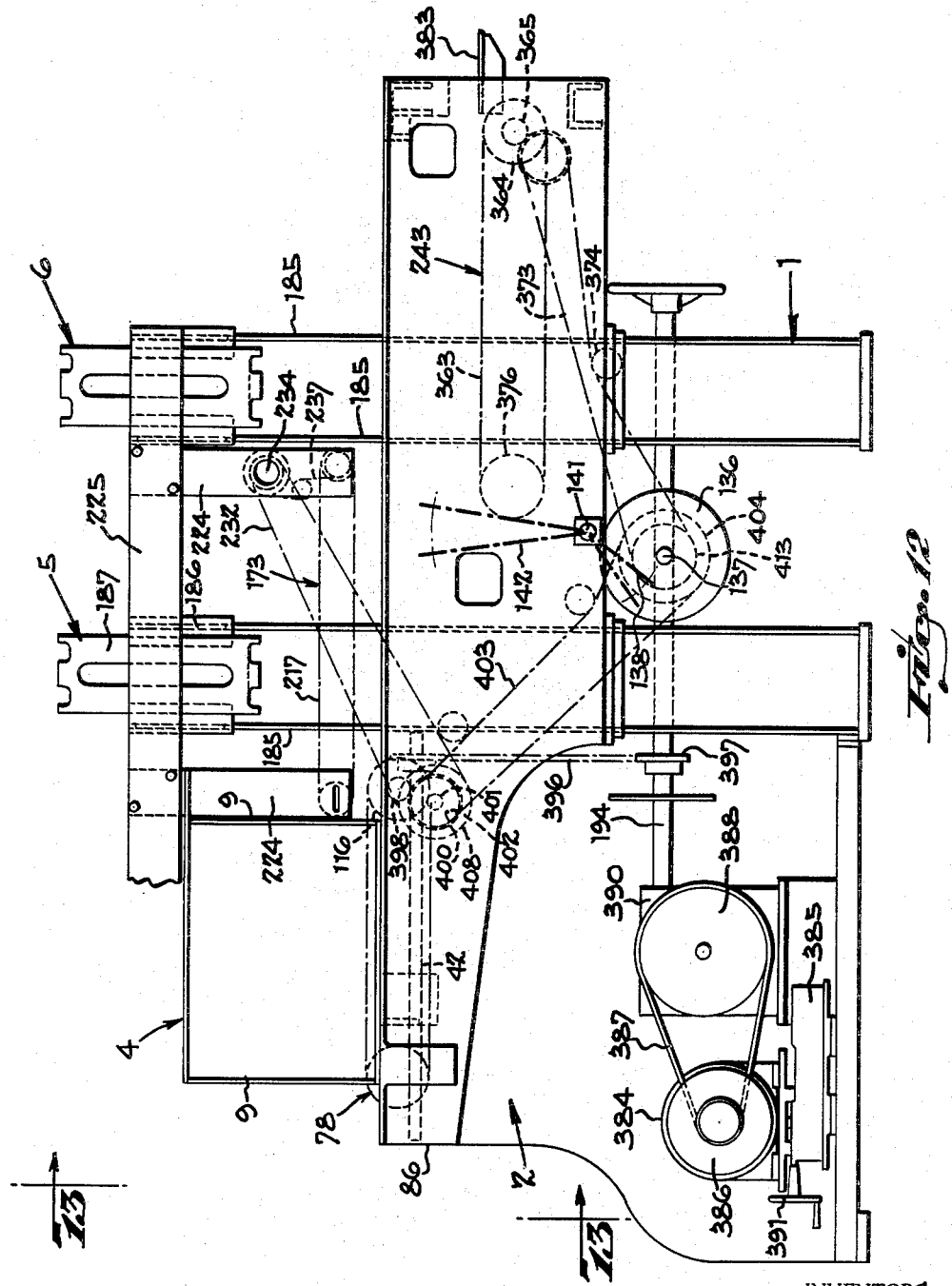

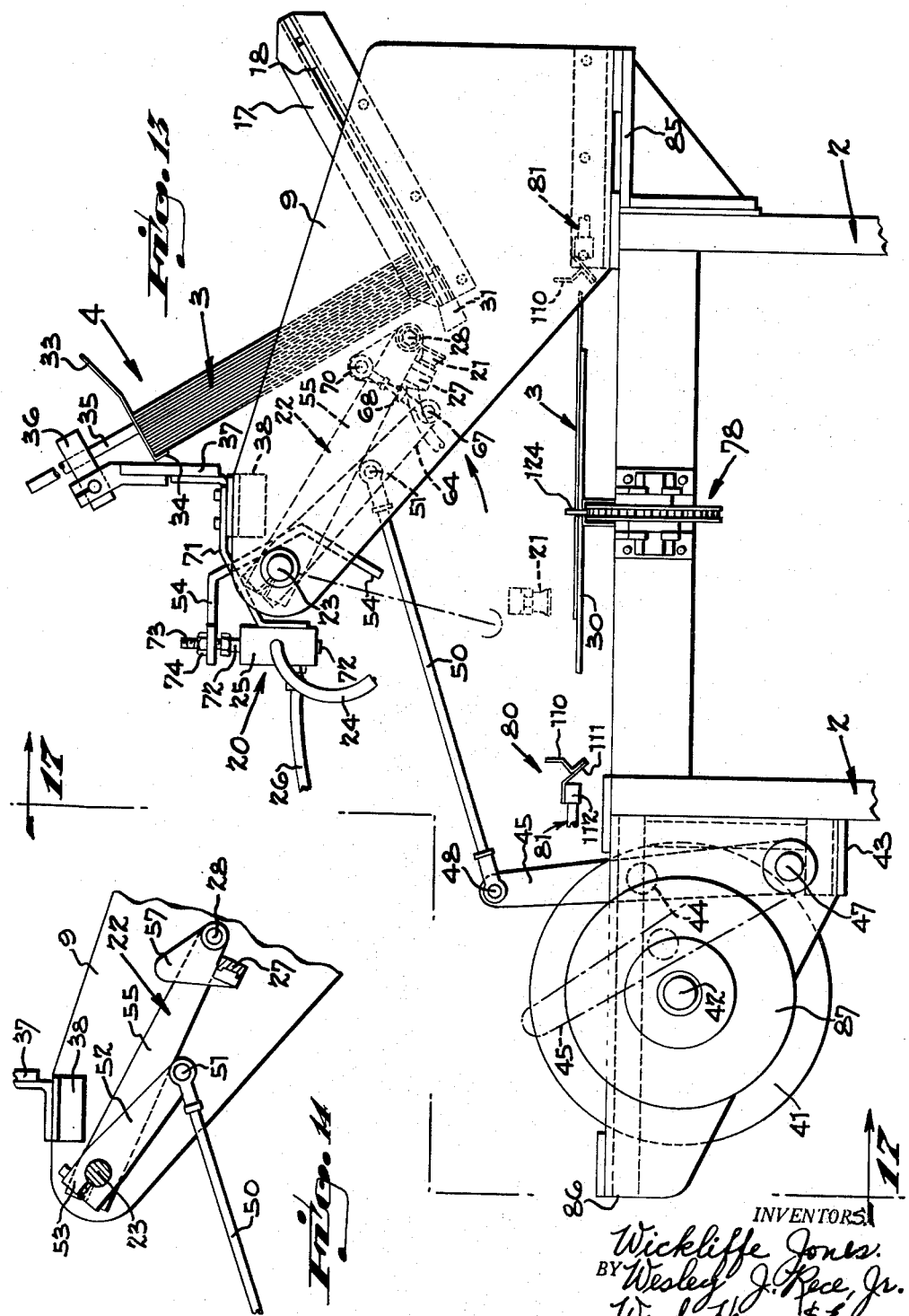

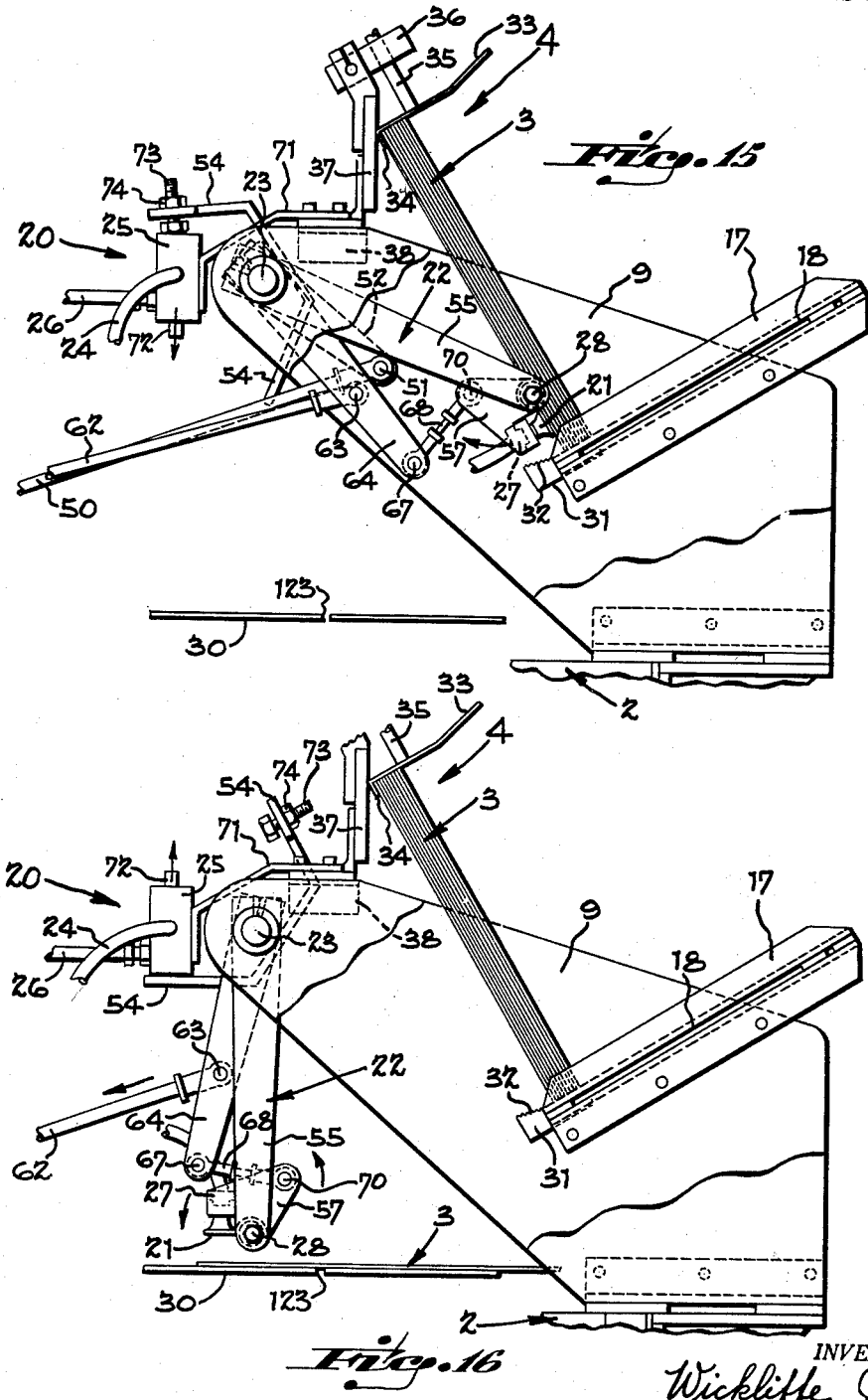

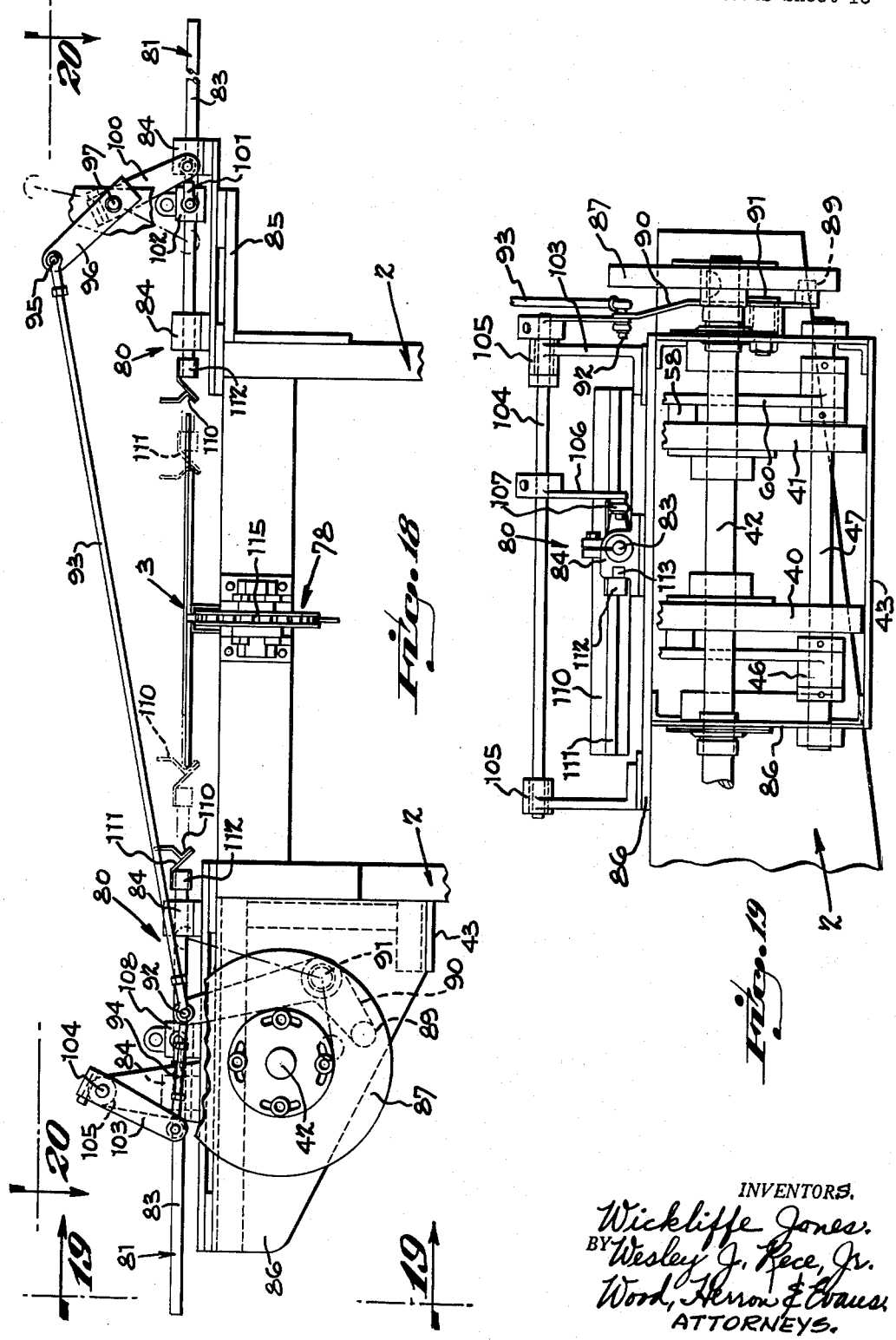

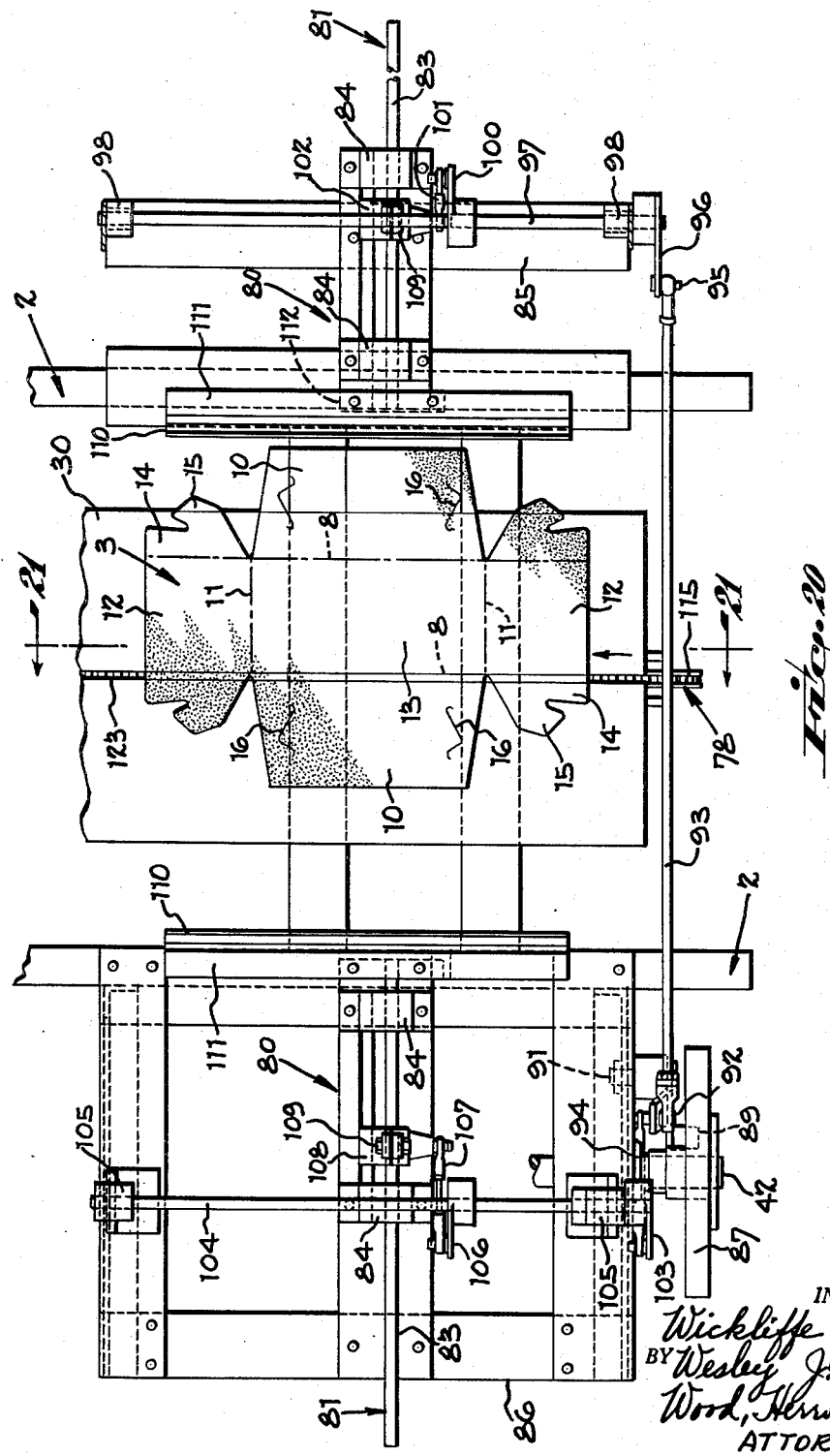

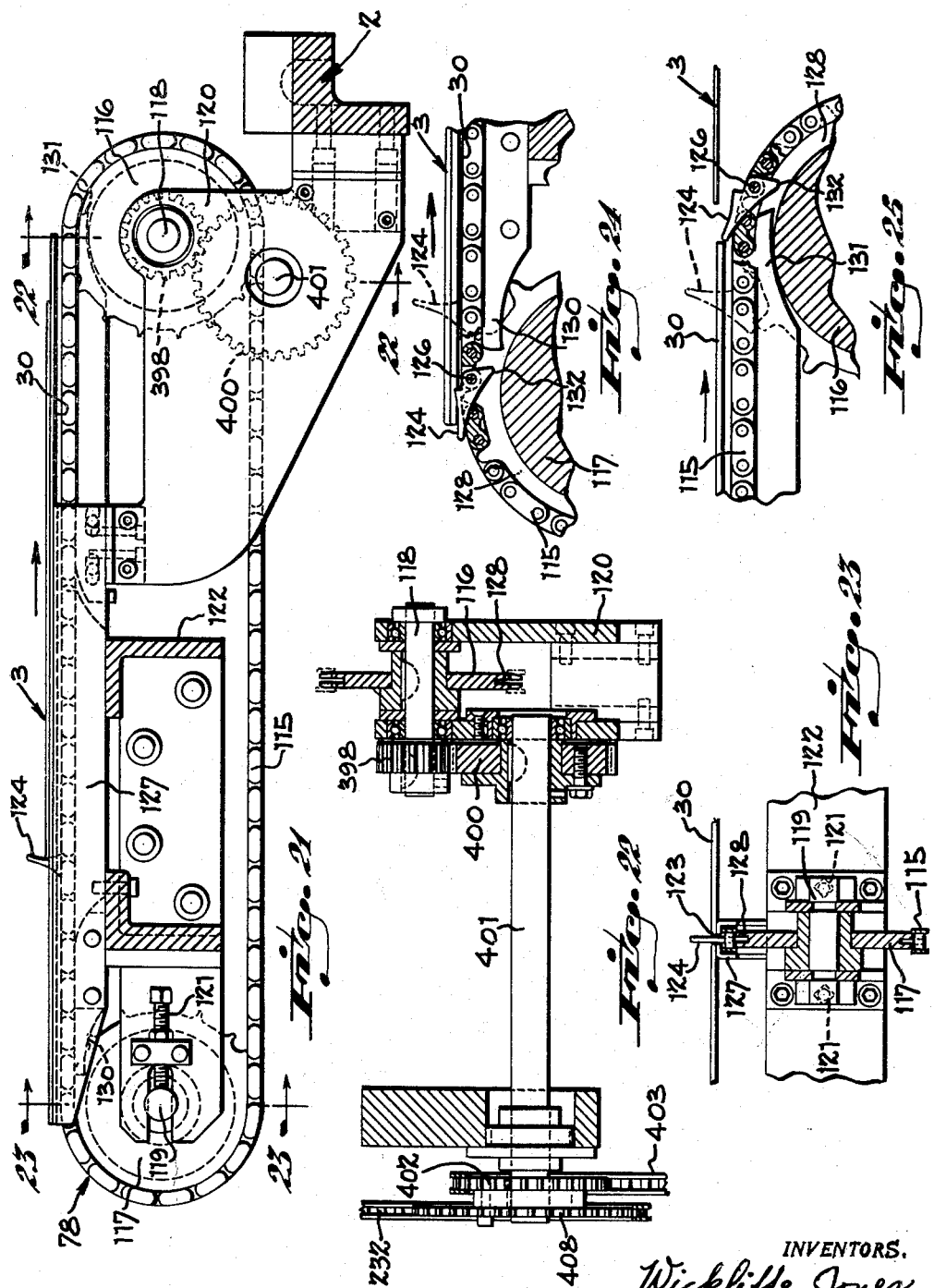

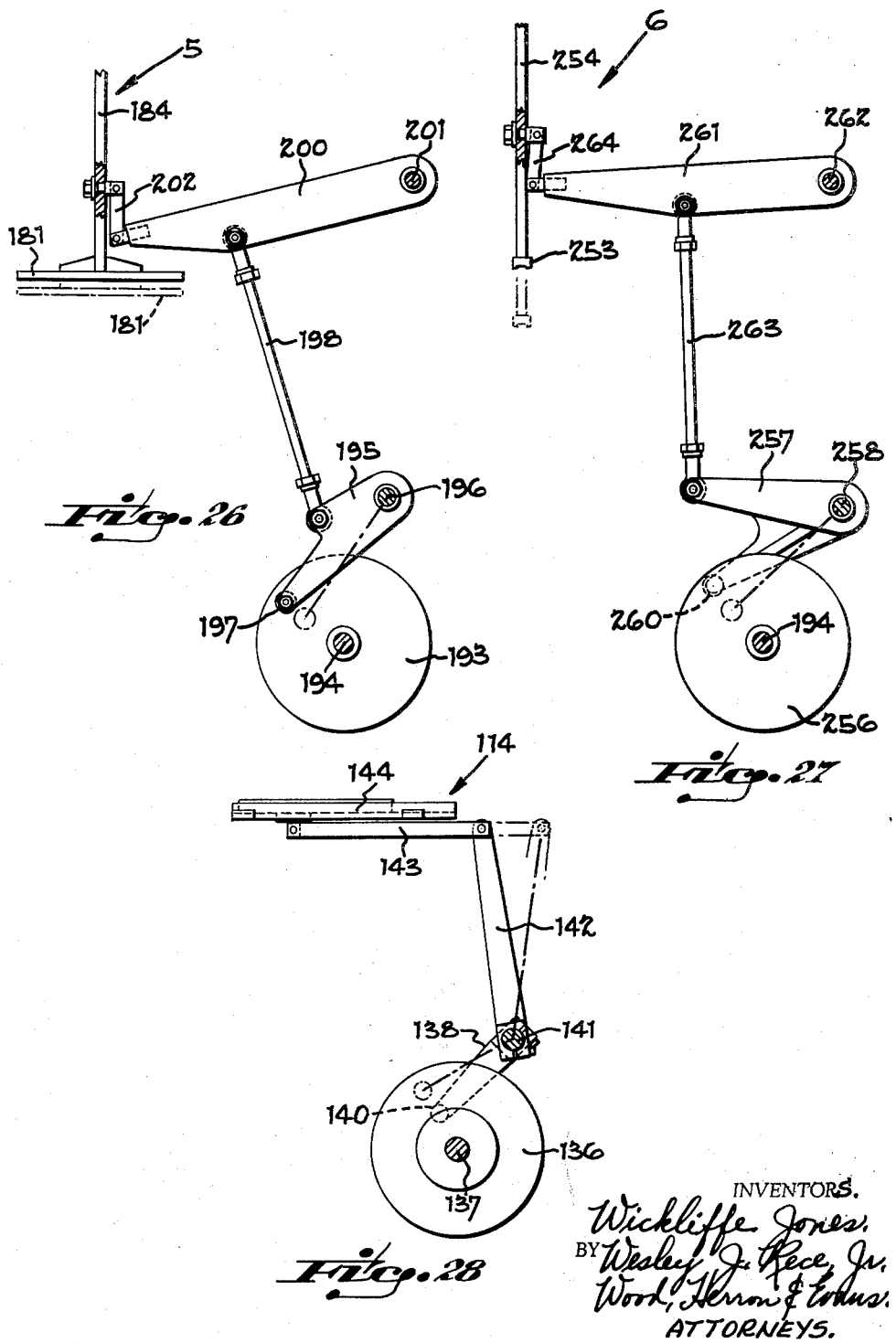

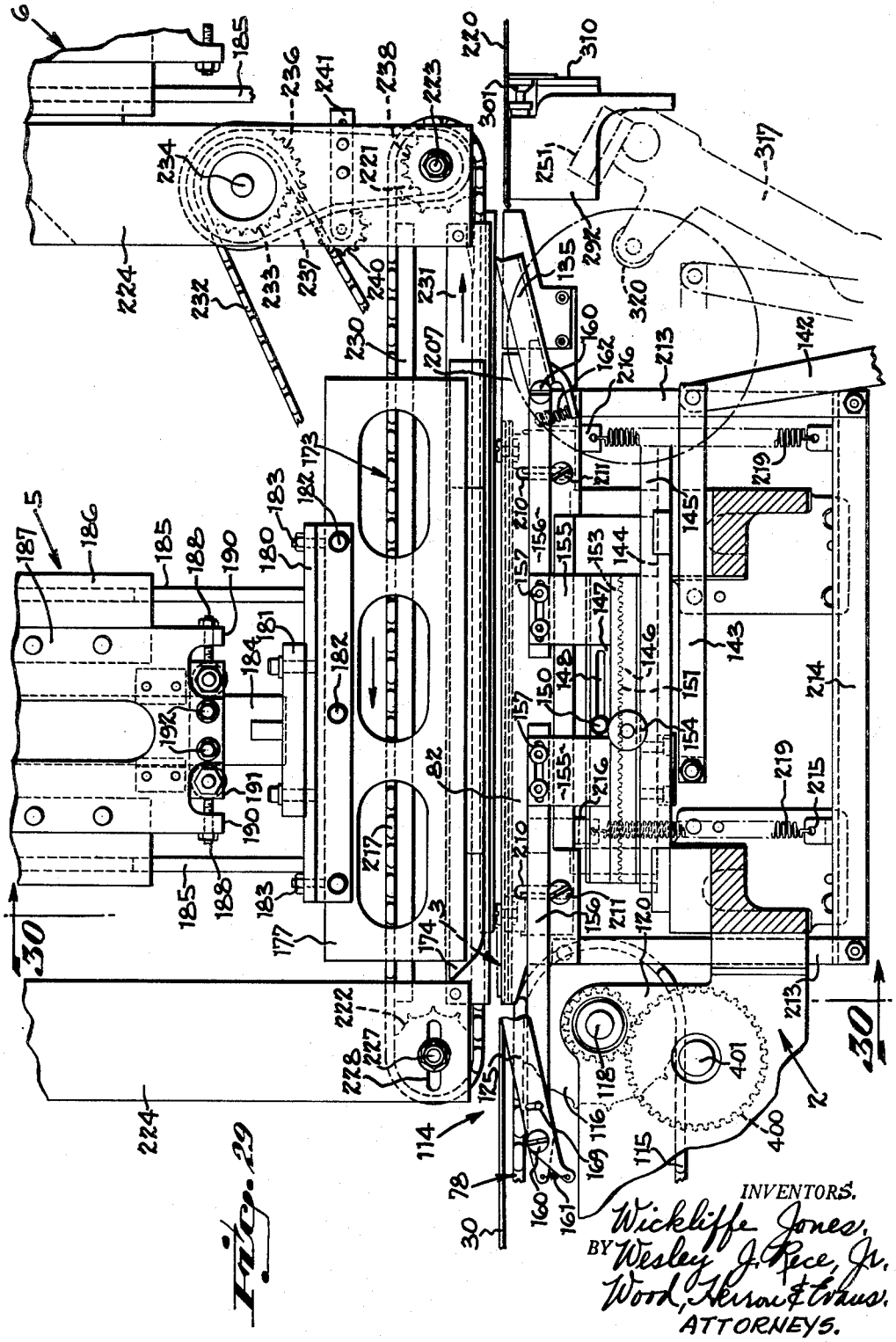

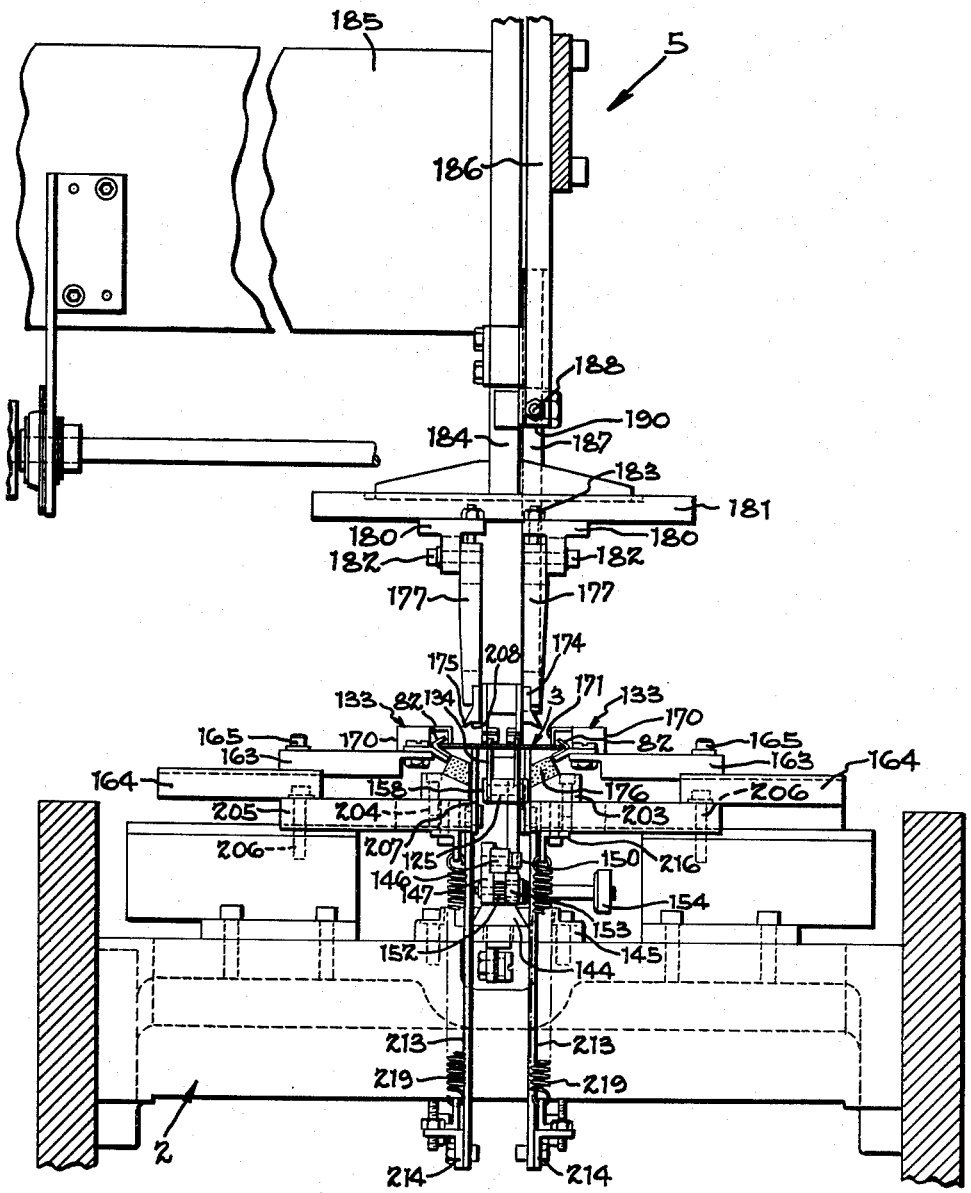

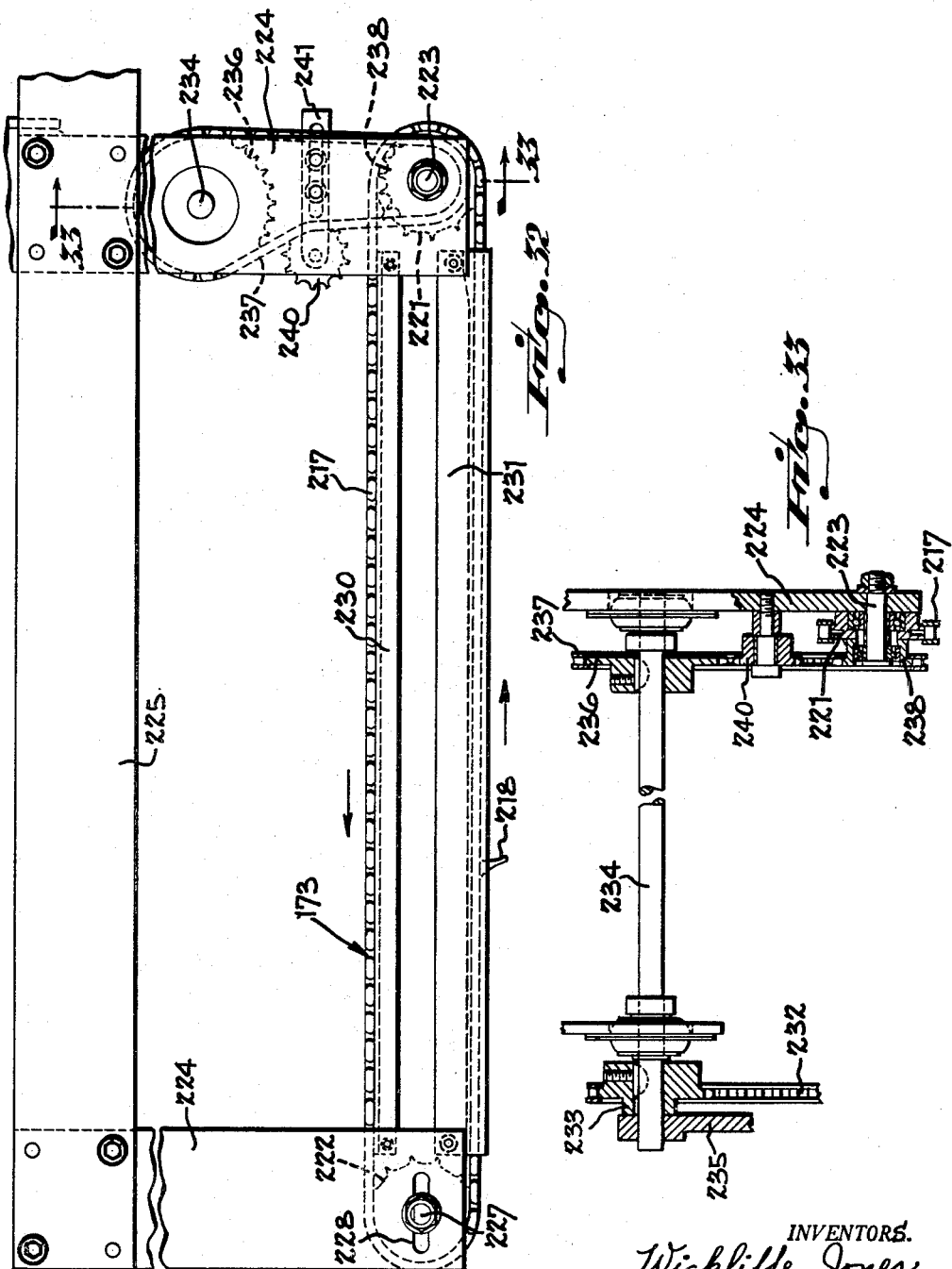

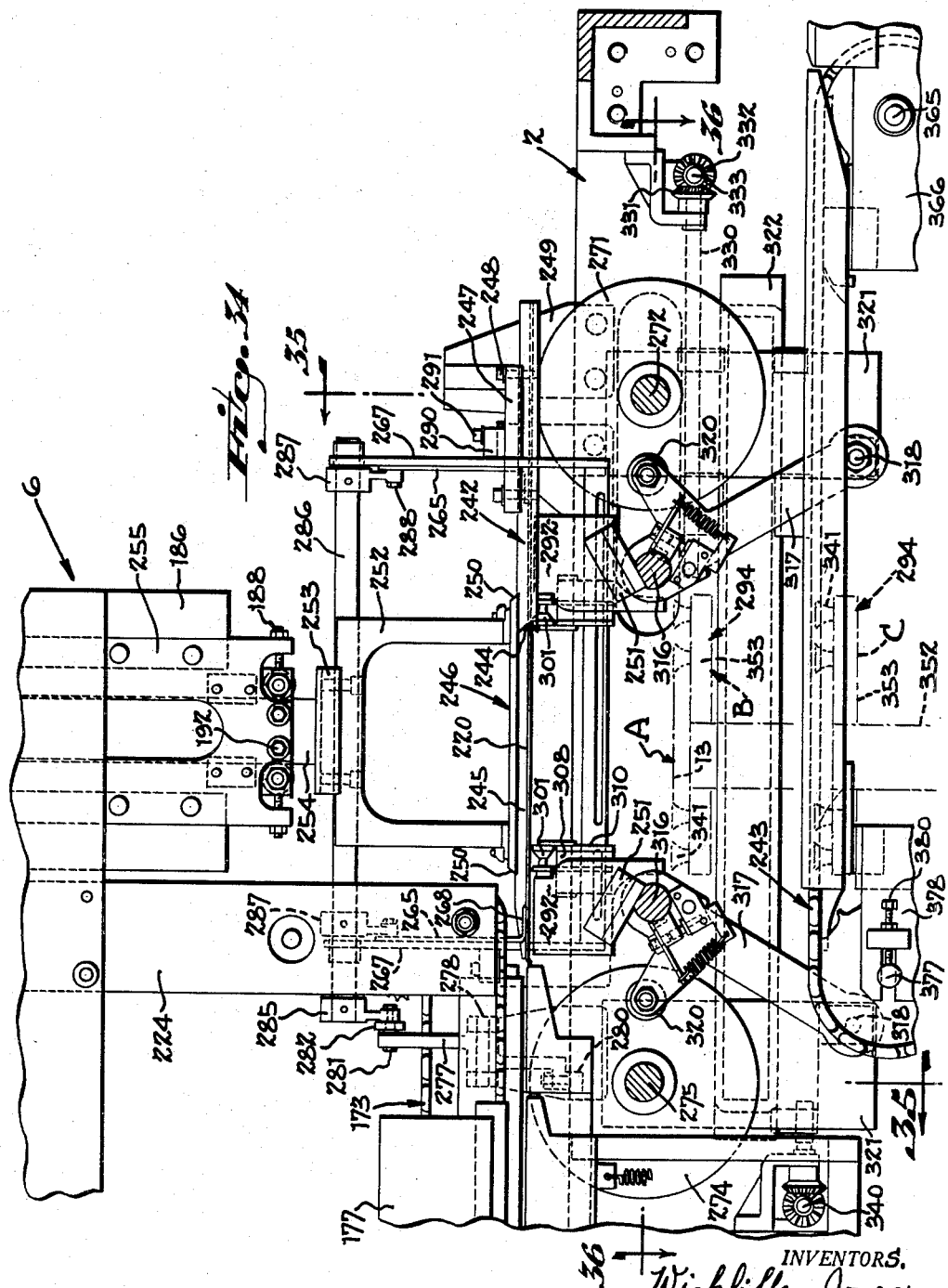

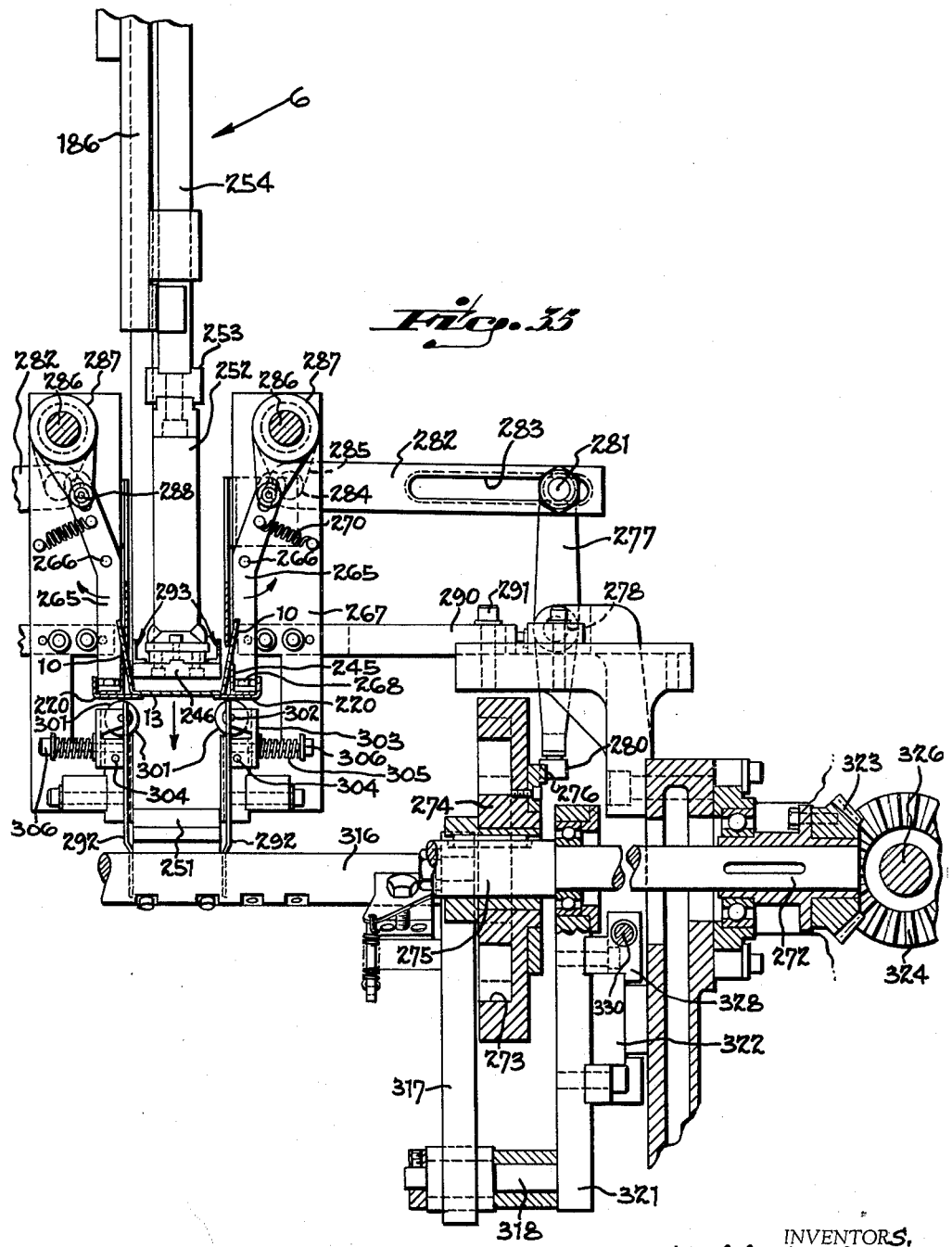

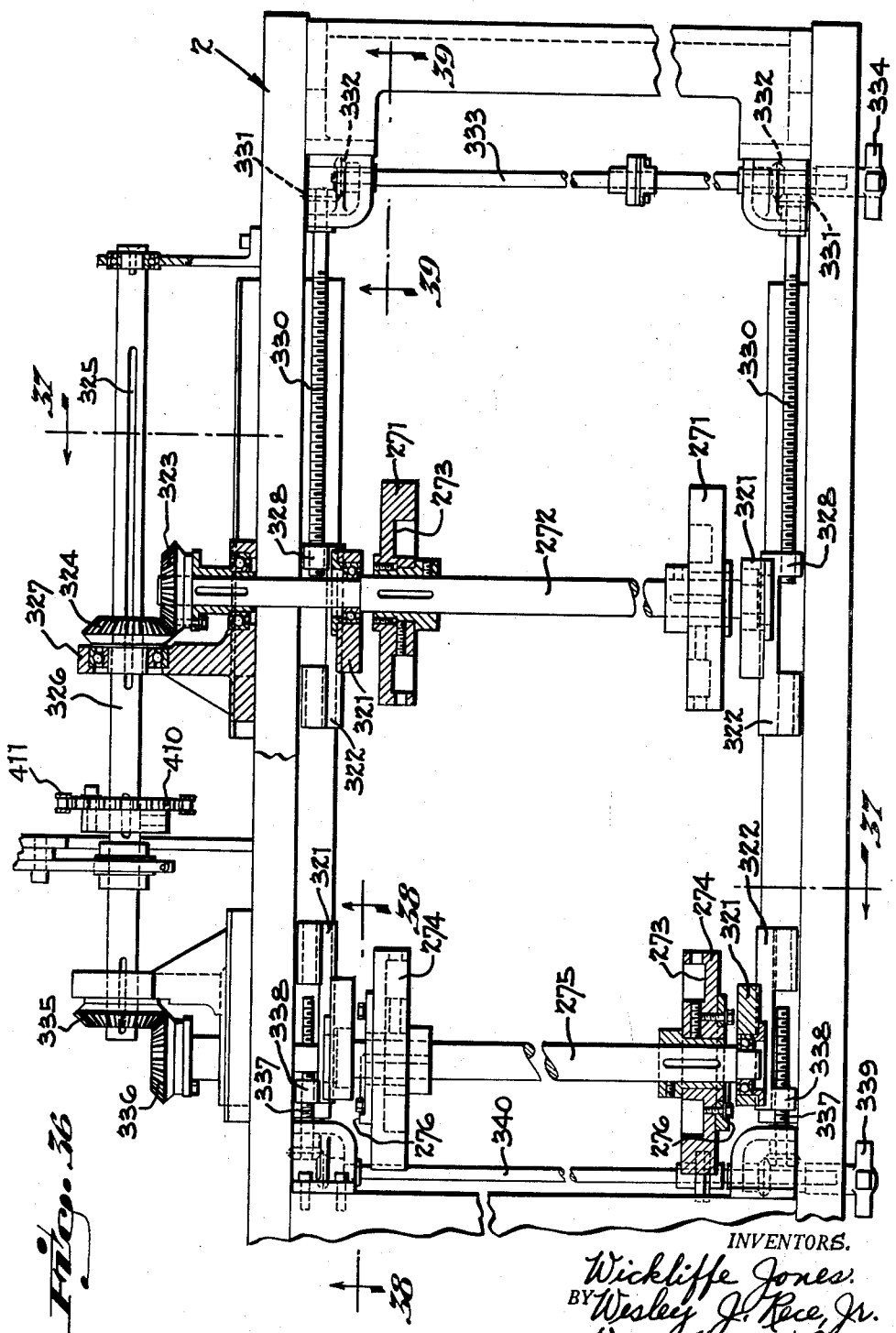

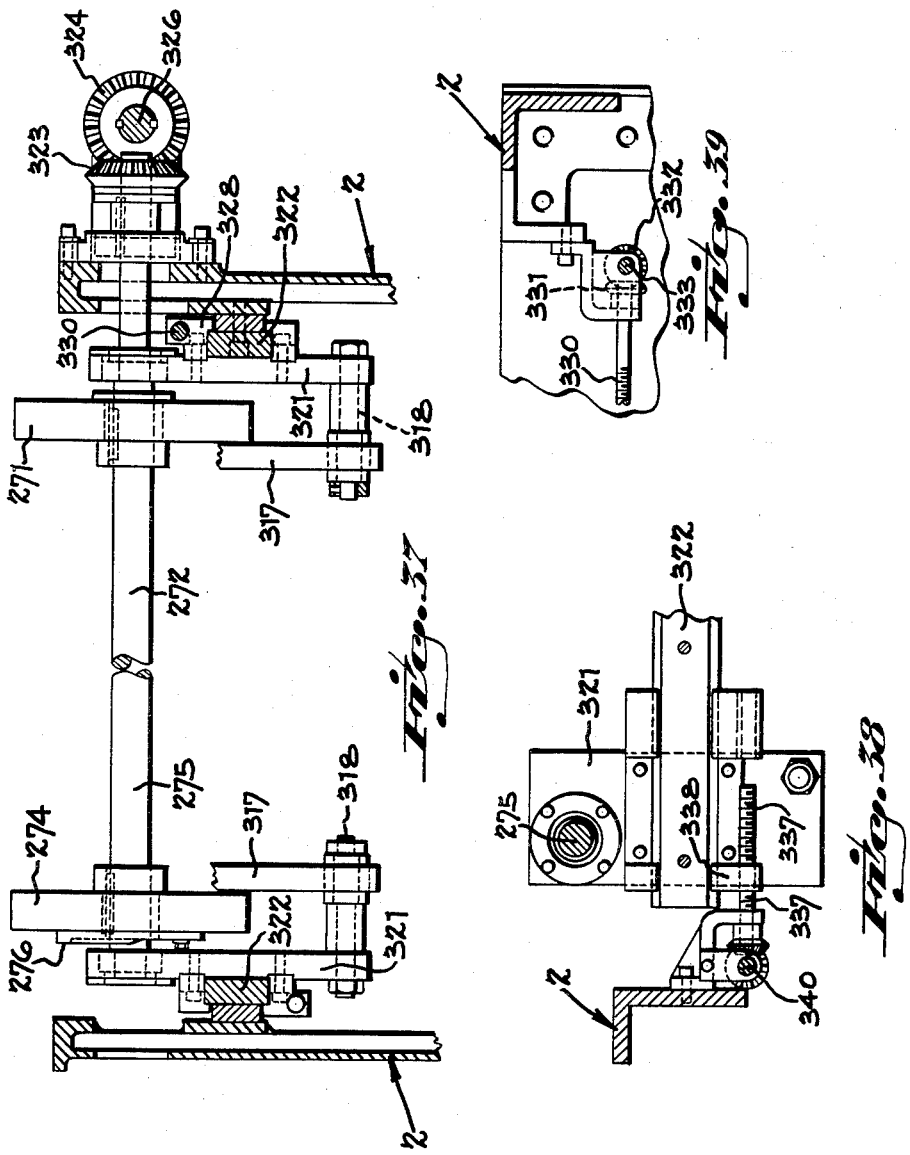

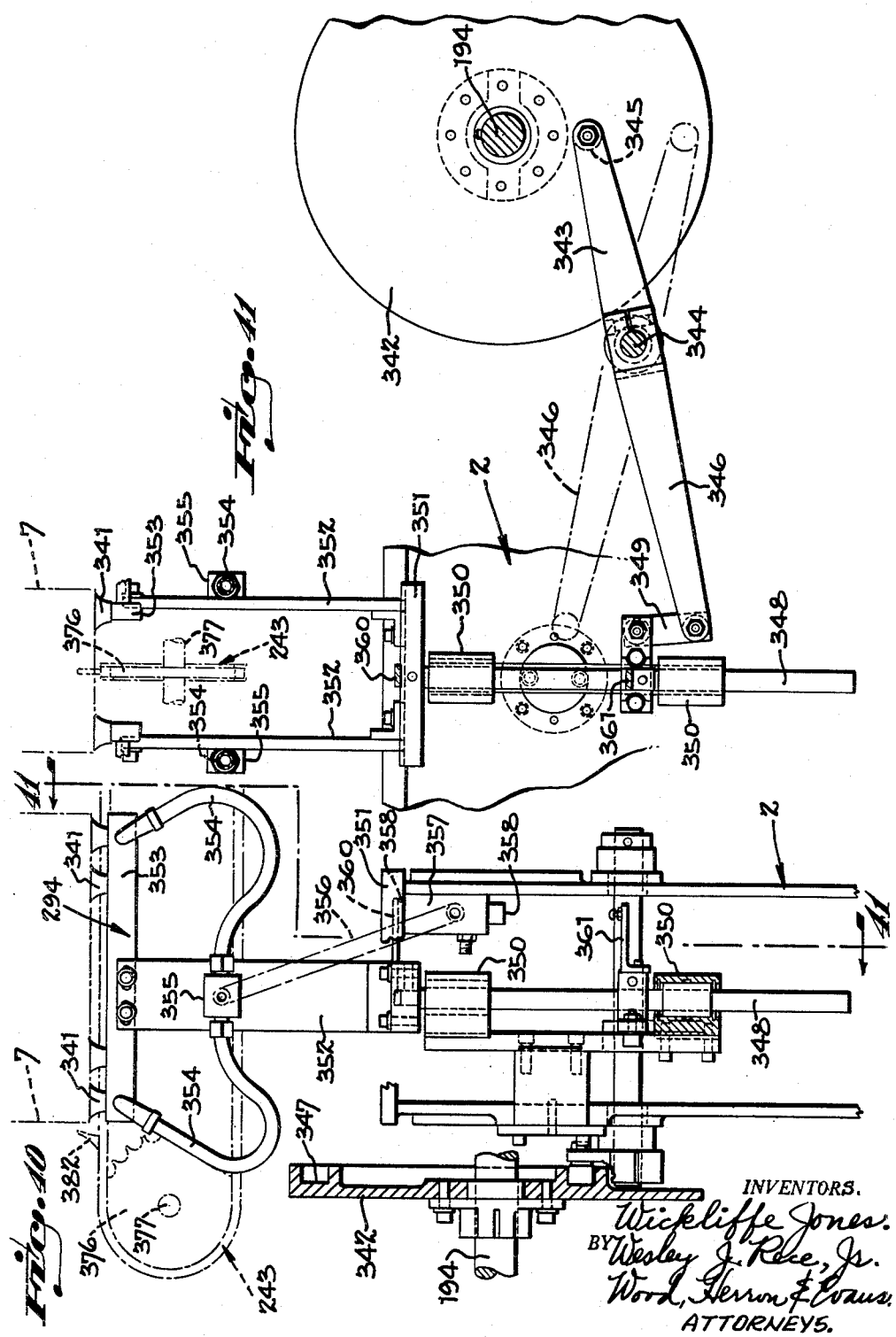

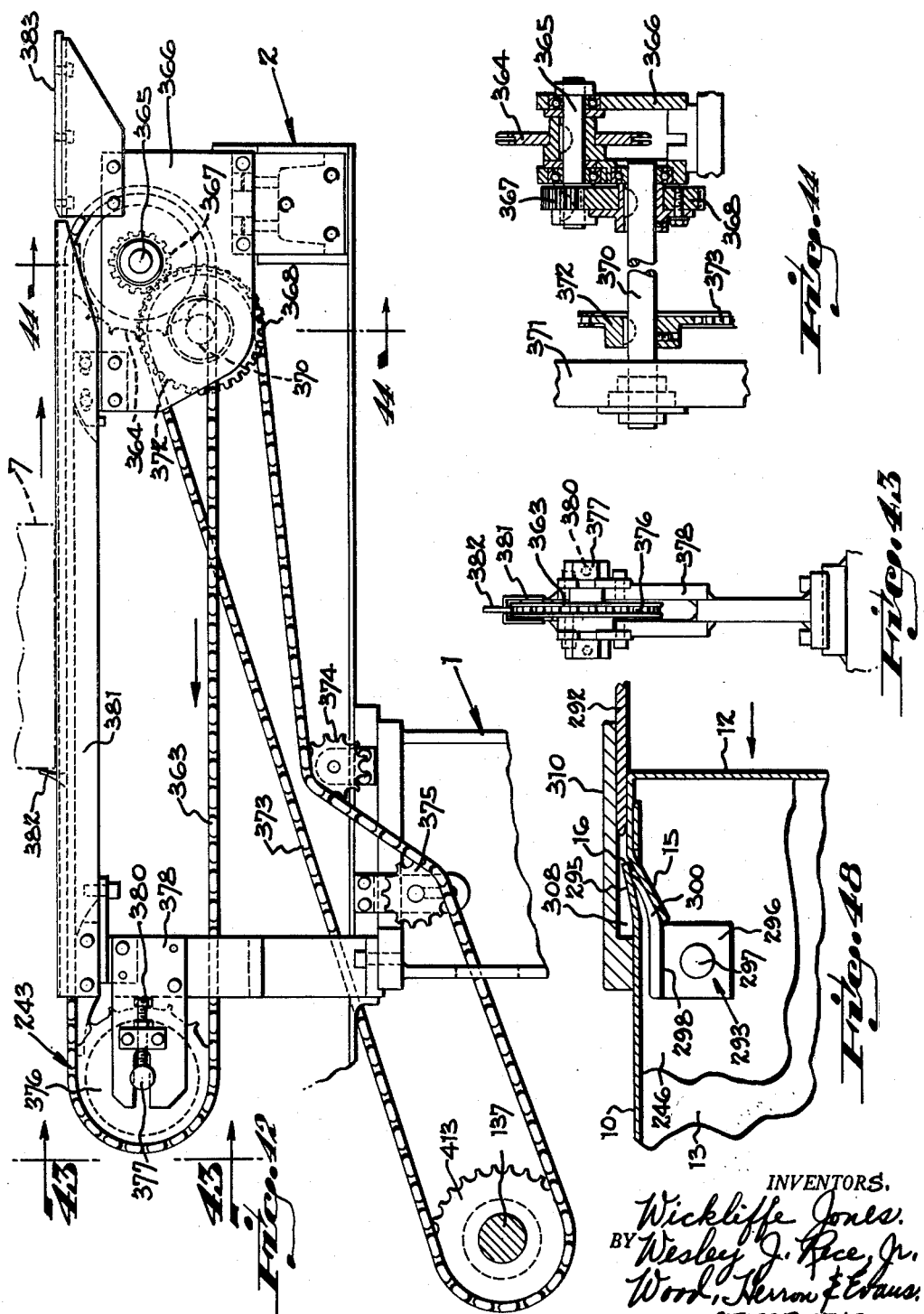

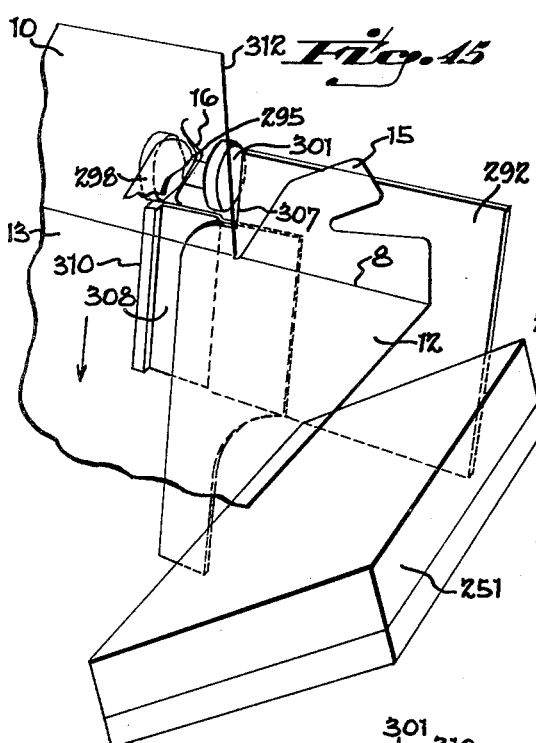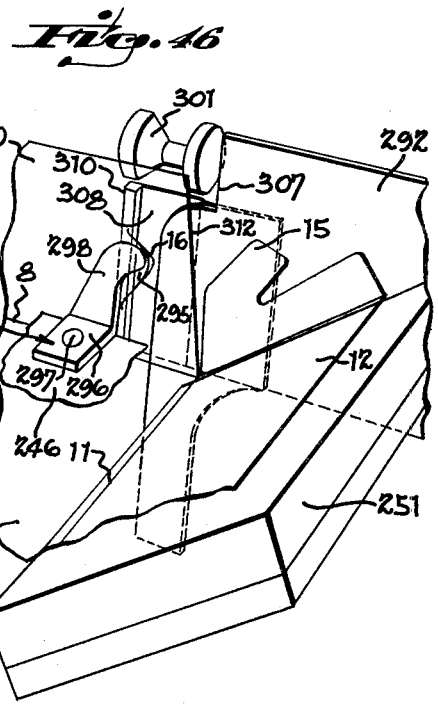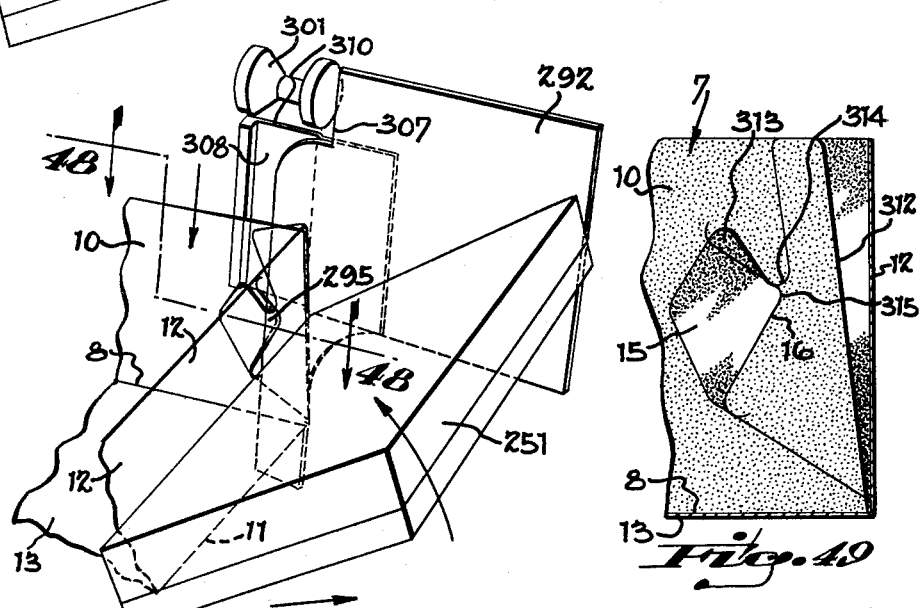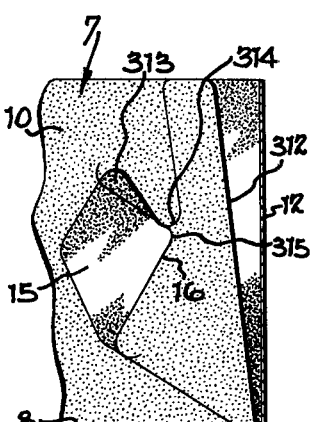

United States Patent Office 3,111,065
Patented Nov. 19, 1963

3,111,065
BOX FORMING MACHINE
Wickliffe Jones, Cincinnati, Ohio, and Wesley J. Rece, Jr., California, Ky., assignors to R. A. Jones and Company, Inc., Covington, Ky., a corporation of Kentucky
Filed Dec. 12, 1961, Ser. No. 158,724
26 Claims. (Cl. 93—49)

This invention relates to a machine for erecting boxes or cartons from flat, pre-cut blanks formed of sheet material, such as polystyrene and the like. More particularly, the invention is directed to a machine utilizing reciprocating mandrels or creasing bars, coacting with resilient deformable dies whereby longitudinal and transverse score lines are impressed in the flat blank of sheet material so as to delineate and erect the side and end walls of the carton or container.

One of the primary objectives of the invention has been to provide a machine arranged to feed the flat, pre-cut blanks individually from a magazine, impress the score lines in the blank sheet to delineate the walls, then to erect and permanently join the side and end walls together at a high rate of speed.

According to this aspect of the invention, the flat blanks, from which the boxes or containers are erected, are configurated to provide side and end walls upon being scored during passage through the machine. Two opposed walls of the blank are provided with male locking tabs, which are inserted into female locking slits formed in adjacent wall portions upon erection of the walls. The arrangement is such that the male locking tabs, upon being inserted into the mating slits, permanently join the walls of the container in erected position at its four corners. In the example illustrated, the male locking tabs project outwardly from the edges of the end walls, while the female locking slits are formed in the end portions of the side walls. It will be apparent however, that the positions of the male locking tabs and female slits may be reversed with respect to the container walls.

A further objective of the invention has been to provide an improved feeding mechanism which is adapted to feed the flat blanks at a high rate of speed and in a reliable manner from the lower end of a magazine for advancement in accurate registry with a first forming station which impresses the longitudinal score lines to delineate the side walls in the flat blank.

Briefly, the blanks are confined in stack formation in a magazine at the receiving end of the machine. The lower end of the magazine includes serrated elements which engage one edge of the lowermost blanks to confine the stack in the magazine. A reciprocating suction mouthpiece assembly successively contacts the lowermost blank of the magazine, so as to withdraw it from the magazine, counter to the resistance offered by the serrated elements. The mouthpiece assembly then deposits the flat blank on a first stage conveyor, which is arranged to advance the flat blank to the first forming station which impresses the pair of longitudinal score lines in the blank. Before being advanced to the first forming station, an alignment mechanism engages the opposite edges of the blank and shifts it transversely in alignment with the first forming station.

The first forming station includes a pair of vertically movable mandrels or creasing bars engageable with the top surface of the blank and arranged to force the blank downwardly into resilient deformable die pads. The creasing bars and pads form the longitudinal score lines which delineate the side walls of the container. As explained below, the machine includes a second forming station including a generally similar mandrel and resilient die mechanism arranged to impress the transverse score lines in the flat blank so as to delineate and erect the end walls of the container. The combination of rigid mandrels or creasing bars and coacting deformable die pads is disclosed in the pending application of Charles E. Palmer, Serial No. 741,328, now Patent 2,954,725, to which attention is invited.

A further objective of the invention has been to provide a simplified positioning apparatus adapted to concurrently advance one blank from the first stage conveyor precisely to a working position relative to the first forming station noted above, and concurrently to advance a second partially erected blank from the first forming station to a precise position relative the second forming station which impresses the transverse score lines in the blank.

Described briefly, the positioning mechanism includes a first pusher and a second pusher mounted for reciprocating motion in unison with one another. The first pusher engages one blank at the downstream end of the first stage conveyor and shifts the blank accurately with respect to the first forming station. After the first forming operation, the partially formed blank is engaged by a second stage overhead conveyor and transferred downstream from the first forming station. At this point, the partially formed blank is engaged by the second pusher and advanced precisely in registry with the second forming station. This station includes a mandrel arranged to engage the top surface of the partially formed blank and to depress the blank into a pair of deformable die pads which impress the transverse score lines, thereby to delineate and erect the end walls of the container.

Another objective of the invention has been to provide means at the second forming station for inserting the male locking tabs into the female locking slits of the adjacent walls, taking advantage of the downward motion of the mandrel, thereby to permanently lock the walls in erected position at a rapid rate during the downward motion of the mandrel at the second forming station.

According to this aspect of the invention, the deformable die pads at the second forming station are adapted to be shifted outwardly to retracted positions after formation of the transverse score lines, thereby providing clearance for the partially erected box during the downward motion of the mandrel to insert the locking tabs. For inserting the male tabs, the mandrel at the second station is provided with plow elements adapted to deform the end portions of the side walls outwardly so as to open the female locking slits, thereby to facilitate insertion of the male locking tabs. During downward movement of the mandrel (with the partially formed blank thus engaged by the downwardly moving plow), the side wall portions of the blank pass between respective pairs of rollers, mounted for rotation about fixed axes relative to the mandrel and plows. The rollers are located to track against the outer surface of the side walls and to straddle the portions of the wall engaged by the plows, thereby to spring outwardly the wall portions which delineate the female locking slits.

At this stage (during downward movement of the mandrel and blank) the end walls pass around the inner edges of the deformable die pads and are swung upwardly to completely erected position. During this motion, the male locking tabs, which project from the end walls, are directed through the female locking slits to lock the walls permanently in erected position.

After the mandrel reaches its downward limit of travel, a stripper mechanism, having suction mouthpieces, engages the bottom panel of the erected container and strips it from the mandrel. The erected container is then carried to a discharge conveyor and advanced to the discharge end of the machine.

A still further objective of the invention has been to provide a box erecting machine wherein the various components are adjustably mounted, adapting the machine to be set up in a convenient manner to act upon boxes having various length and width dimensions.

Generally speaking, the size and shape of the box is governed by the size and configuration of the pre-cut blank. Accordingly, the magazine into which the stacked blanks are confined, is adjustable to accommodate the size of the blanks. The blank alignment mechanism, which positions the blank transversely, and the blank positioning mechanism, which positions the blank longitudinally, are also adjustable to accommodate the selected blank size. The creasing bars are deformable pads at the first forming station are adjustable transversely to locate the longitudinal score lines, thereby to regulate the width of the bottom panel and the height of the side walls. The mandrel at the second stage forming station is interchangeable to determine the length of the box and height of the end walls. The deformable die pads and other components at the second forming station are also adjustable conveniently to conform with the size of the mandrel.

The various features and advantages of the machine will be more clearly apparent to those skilled in the art from the following description taken in conjunction with the drawings.

In the drawings:

FIGURE 1 is a perspective view illustrating the general arrangement of the box forming machine of the present invention.

FIGURE 2 is an enlarged fragmentary perspective view, showing a portion of the magazine and suction mouthpiece assembly which feeds the individual flat blanks from the magazine for advancement through the forming machine.

FIGURE 3 is a perspective generally similar to FIGURE 2, viewed from the opposite side of the magazine and showing one of the blanks advanced to the conveyor system, with the suction mouthpiece assembly swinging toward the stack of blanks in the magazine.

FIGURE 4 is a view generally similar to FIGURE 3, showing the suction mouthpiece assembly engaging the lowermost blank in the magazine for withdrawal therefrom.

FIGURE 5 is a view similar to FIGURE 4, showing the motion of the blank as it is withdrawn from the magazine.

FIGURE 6 is a fragmentary perspective view, showing the blank advanced to the first forming station which impresses the longitudinal score lines into the blank to form and erect the side walls of the box.

FIGURE 7 is a fragmentary perspective view, showing the blank at the second forming station in position to receive the transverse score lines which delineate the end walls of the box. The forming mechanism is shown in the elevated or inactive position in this view.

FIGURE 8 is a fragmentary perspective view, generally similar to FIGURE 7, showing the forming plunger of the second station shifted downwardly into the deformable die pads, with the end walls of the box erected.

FIGURE 9 is a view generally similar to FIGURE 8, showing the erected box withdrawn from the second forming station by the suction mouthpieces for advancement to the discharge conveyor.

FIGURE 10 is a fragmentary top plan view of the machine, generally illustrating the driving system of the several components.

FIGURE 11 is a fragmentary top plan view similar to FIGURE 10 showing the remaining portion of the driving system.

FIGURE 12 is a diagrammatic side elevation of the machine, generally as viewed in FIGURE 1, further illustrating the driving system of the several machine components.

FIGURE 13 is an enlarged fragmentary end elevation, as viewed along line 13—13 of FIGURE 12, illustrating the magazine and the mechanism for feeding the blanks individually from the magazine.

FIGURE 14 is a fragmentary sectional view taken from FIGURE 13 and further illustrating the blank feeding mechanism.

FIGURE 15 is a fragmentary view similar to FIGURE 13, showing the blank feeding mechanism advanced to a position bringing the suction mouthpieces into engagement with the lowermost blank of the magazine for withdrawal of the blank.

FIGURE 16 is a view similar to FIGURE 15, showing the feed mechanism shifted to the delivery position with the blank deposited upon the first stage conveyor for advancement through the machine.

FIGURE 18 is a view generally similar to FIGURE 17, with the magazine omitted, illustrating the cam and pusher arrangement for aligning the blank with the first station forming plunger after the blank is advanced from the magazine.

FIGURE 19 is a fragmentary side elevation, as viewed along the line 19—19 of FIGURE 18, further illustrating the blank alignment mechanism of FIGURE 18.

FIGURE 20 is a fragmentary top plan of the machine, as viewed along the line 20—20 of FIGURE 18, further illustrating the blank alignment mechanism.

FIGURE 21 is a sectional view taken along the line 21—21 of FIGURE 20, illustrating the first stage conveyor which advances the flat aligned blank to the first forming station.

FIGURE 22 is a sectional view taken along line 22—22 of FIGURE 21, detailing the driving system for the first stage conveyor shown in FIGURE 21.

FIGURE 23 is a sectional view taken along the line 23—23 of FIGURE 21, further illustrating the first stage conveyor system.

FIGURE 24 is a fragmentary view of the upstream end of the first stage conveyor, and illustrating the mechanism for shifting the conveyor lug from the inactive lowered position to the elevated position for engaging and advancing the blank after withdrawal, thereof from the magazine.

FIGURE 25 is a fragmentary view of the downstream end portion of the first stage conveyor, showing the arrangement for shifting the driving lug to the retracted position after the blank has been advanced toward the first forming station.

FIGURE 26 is a diagrammatic view showing the cam and driving mechanism of the first forming station.

FIGURE 27 is a similar diagrammatic view illustrating the cam and driving mechanism of the second forming station.

FIGURE 28 is a diagrammatic view showing the cam and linkage of the pusher mechanism which positions the blank accurately with respect to the first and second forming stations.

FIGURE 29 is a fragmentary side view of the machine, showing the several components at the first forming station.

FIGURE 30 is a fragmentary cross sectional view taken along line 30—30 of FIGURE 29, with certain parts omitted, illustrating the first forming station, the plunger thereof being shown in the elevated position for advancing and locating the blank with respect to the creasing bars.

FIGURE 31 is a view similar to FIGURE 30 on an enlarged scale, showing the plunger assembly of the first forming station in its lowered position to score and erect the side walls of the box.

FIGURE 32 is a fragmentary side view showing the second stage overhead chain conveyor which advances the partially formed box from the first toward the second forming station.

FIGURE 33 is a sectional view along the line 33—33 of FIGURE 32 detailing the overhead conveyor driving system.

FIGURE 34 is a fragmentary side view, partially insection, illustrating the components of the second forming station, with the plunger thereof in its elevated position.

FIGURE 35 is a fragmentary cross sectional view, taken along the line 35—35 of FIGURE 34, further detailing the second forming station with the plunger assembly thereof in the elevated position corresponding to FIGURE 34.

FIGURE 36 is a sectional view taken along the line 36—36 of FIGURE 34, showing the operating cams and adjustment mechanism of the second forming station.

FIGURE 37 is a fragmentary cross sectional view, taken along the line 37—37 of FIGURE 36, further illustrating the actuating cams of the second forming station.

FIGURE 38 is a fragmentary sectional view taken along the line 38—38 of FIGURE 36, detailing a portion of the adjustment mechanism of the second forming station.

FIGURE 39 is a fragmentary sectional view taken along line 39—39 of FIGURE 36 further detailing the adjustment mechanism of the second forming station.

FIGURE 40 is a fragmentary side view taken from FIGURE 34, illustrating the reciprocating stripper assembly which withdraws the finished box from the second forming station for transfer to the discharge conveyor.

FIGURE 41 is a cross section taken along the line 41—41 of FIGURE 40, further illustrating the stripper mouthpiece assembly.

FIGURE 42 is a fragmentary side view showing the discharge conveyor which transports the finished box from the machine after being released from the stripper assembly of FIGURE 40.

FIGURE 43 is a fragmentary end elevation, as viewed along the line 43—43 of FIGURE 42, further illustrating the discharge conveyor.

FIGURE 44 is a sectional view taken along the line 44—44 of FIGURE 42, detailing the driving system of the discharge conveyor.

FIGURES 45, 46 and 47 are diagrammatic or perspective views, illustrating the successive steps of scoring and erecting the end walls and of tucking the male tabs into the female locking slits to lock the walls in erected condition.

FIGURE 48 is a diagrammatic view, taken generally along the line 48—48 of FIGURE 47, showing the guide mechanism which acts upon the side walls of the box to direct the male locking tabs into the female locking slits as the end walls are erected at the second forming station.

FIGURE 49 is a fragmentary sectional view detailing the interlocked tabs at completion of the second forming operation.

*General Arrangement and Operation*

Figure 17:
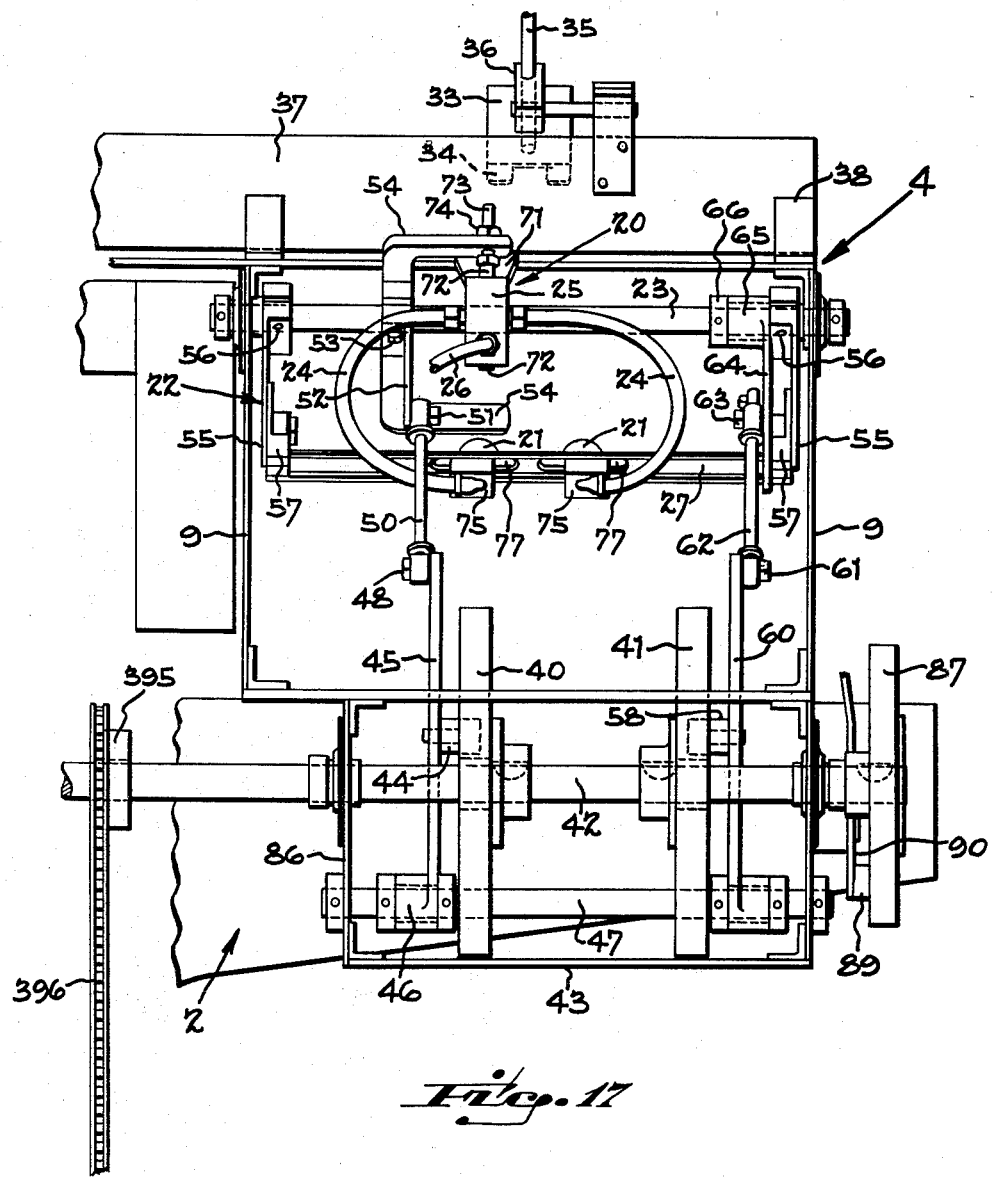
FIGURE 17 is an end elevation of the blank magazine and feed mechanism, as viewed along the lines 17—17 of FIGURE 13.

As best shown in FIGURE 1, the box forming machine comprises a base indicated generally at 1, supporting a frame structure, indicated at 2, the several components of the machine being supported by the frame 2. The flat, pre-formed blanks, indicated generally at 3, from which the boxes are erected, are confined in stack formation in a magazine indicated generally at 4. The flat blanks, as explained later in detail, are withdrawn individually from the lower end of the magazine and are then advanced from the magazine to the first forming station, which is indicated generally at 5. The first forming station 5 is arranged to impress a pair of longitudinal score lines in the blank and to erect the side walls of the blank.

After erection of the side walls at the first forming station 5, the partially erected blank is advanced to the second forming station, indicated generally at 6. The second forming station, as explained later in detail, is arranged to impress a pair of transverse score lines in the blank to delineate the end walls of the box. After impressing the transverse score lines, the second forming station is arranged to erect the end walls and concurrently to insert the male locking tabs of the end walls into the slits, which are formed in the side walls, so as to lock the side and end walls in erected position. After this operation, the erected box 7, is stripped from the second forming station and advanced to the discharge end of the machine, as indicated in FIGURE 1.

The configuration of the carton blank 3 is best shown in FIGURES 3 and 20. The blanks are formed of flat sheet material, for example, a transparent plastic, being cut from the sheet material in a press having a cutting die of the required configuration. The longitudinal score lines, indicated at 8—8, which delineate the side walls 10, are impressed at the first forming station. The transverse score lines 11—11 are impressed in the blank at the second station to delineate the end walls 12 which are subsequently erected and locked to the side walls 10 at the four corners of the box. These operations are explained in detail later.

It will be noted in FIGURES 45–47, that the longitudinal score lines 8 and transverse score lines 11 delineate the bottom panel of the box, as indicated at 13. It will also be noted in these views, that each end wall 12 includes on opposite sides a respective flap 14 delineated by the longitudinal score line 8. Each flap 14 includes a male locking tab 15 adapted to be inserted into the female locking slit 16 formed in the opposite end portions of the side walls 10—10, at the second forming station 6, as shown in FIGURES 45–48. The location of these score lines with reference to the blank is shown in FIGURE 20.

*Magazine and Blank Feed Mechanism*

As shown generally in FIGURE 2, the magazine 4 comprises a pair of side frames 9—9 rising vertically from the frame 2, and having a downwardly inclined bottom plate 18. The stack of blanks 3 is thus sustained in an inclined position between the side plates 17 and bottom plate 18, adapting the blanks to be withdrawn individually from the bottom of the stack by the feed mechanism, which is indicated generally at 20 in FIGURES 2–5 and FIGURES 13–17. The feed mechanism 20 essentially comprises a pair of suction mouthpieces indicated at 21—21, formed of rubber or the like, and mounted on a swinging frame, indicated generally at 22 (FIGURES 3–5 and 15).

The swinging frame is mounted for pivotal motion upon a rock shaft 23 having its opposite ends journalled in the side plates 17 of the magazine. Swinging motion is important to the frame 22 by a pair of cams linked to the swinging frame and adapted to reciprocate frame 22 and the suction mouthpieces 21 in time with one another and in time with the several components of the machine. The cams are rotated by a driving system which is common to the other components of the machine, as explained in detail later. In order to engage and release the successive blanks 3, in time with the machine operations, the mouthpieces 21 are interconnected by way of flexible conduits 24—24 with a control valve 25. The control valve is connected by way of a flexible conduit 26 with a suitable vacuum system of conventional design.

During the feeding cycle, the suction mouthpieces or cups 21 are swung by the frame 22 into engagement with the side wall 10 of the lowermost blank, as shown in FIGURES 4 and 5. At this point in the cycle, the valve 25 is shifted, as explained later, to a position to apply vacuum to the mouthpieces 21, such that the lower side wall 10 is firmly gripped by the mouthpiece. Thereafter, the blank is withdrawn, as explained below.

It will be noted at this point, that the suction mouthpieces are mounted upon a cross bar 27, pivotally connected as at 28 to the swinging end of the frame 22 (FIGURES 15 and 16). The arrangement is such that the bar 27 and the suction cups swing in an arc through an angle somewhat greater than 90°, so as to draw the lower portion of the blank 3 from the magazine, then to swing the blank bodily from its vertically inclined position in the magazine to a horizontal position for deposit upon the horizontal support plate 30 of the first stage conveyor, as explained later in detail.

It will be noted (FIGURES 2, 15 and 16) that the bottom plate 18 of the magazine includes retainer blocks 31, which are serrated as at 32, engageable with the lower edge of the blanks. The upper edge portion of the stack of blanks is confined in the magazine by a retainer plate 33 having a lip 34 which engages the upper portion of the stack. The retainer plate 33 is mounted upon a stem 35 which is adjustably mounted in a bracket 36 adapting the retainer plate 33 to be adjusted vertically to accommodate for the vertical dimension of the stack confined in the magazine. The bracket 36 is mounted upon a stationary rail 37 which is secured by angle irons 38 to the side frame 9 of the magazine.

As viewed in FIGURE 2, the side plates 17—17 of the magazine are adjustable transversely to accommodate for the transverse dimension of the stack of blanks. In order to provide this adjustment, the bottom plate 18 of the magazine is slotted transversely as at 19 and each side plate is mounted with respect to the bottom plate by means of clamp screws 19a which pass downwardly through the base of each side plate and through the respective slots 19. The lower end of each clamp screw includes a nut (not shown) which engages the lower surface of the bottom plate 18 to clamp the side plates in adjusted position.

As the suction mouthpieces swing from the position of FIGURE 15 to the position of FIGURE 16, the lower portion of the blank, which forms its leading edge, is pulled outwardly counter to the resistance offered by the serrations 33. After the lower edge is clear of the serrations, continued swinging motion of the mouthpiece pulls the blank downwardly and outwardly, thus withdrawing its upper portion from the retaining lip 34. The mouthpieces thus draw the blank through an arc by engagement with its leading portion; upon reaching the position of FIGURE 16, the valve 25 admits atmospheric pressure to the mouthpieces so as to release and deposit the blank on the support plate 30 of the first conveyor.

In order to impart the swinging motion to the frame 22, and also to impart arcuate motion of the mouthpieces relative to the frame, there is provided two cams 40 and 41 (FIGURE 17) which operate in time with one another. The cam 40, as explained below, imparts the swinging motion to the frame 22 and also operates the valve 25 which is connected to the mouthpieces. The cam 41 imparts the swinging motion to the cross bar 27 relative to the frame, so as to invert the mouthpieces relative to the swinging frame 22. The cams 40 and 41 are keyed to a cross shaft 42 (FIGURES 13 and 17), which are journalled in a bearing housing 43 to the main frame 2 of the machine; the cross shaft is interconnected with the main driving system, as explained later.

Described in detail with reference to FIGURE 17, the cam 40, which operates the valve 25 and reciprocates the swinging frame 22, includes a cam track (not shown) engaged by a cam follower 44 which is journalled on a cam lever 45. The lower end of lever 45 is pivotally mounted as at 46 upon a cross shaft 47 carried in the bearing housing 43. The upper or swinging end of cam lever 45 is pivotally connected as at 48 to a link 50. The opposite end of the link 50 is connected as at 51 to an actuating lever 52, which is clamped as at 53 upon the rock shaft 23. Rock shaft 23, as noted earlier, is journalled in the side frame 9 of the magazine. The actuating lever 52 includes at opposite ends a pair of lateral arms 54—54 which operate the two-position valve 25, while the lever 52 also oscillates the rock shaft 23, so as to reciprocate the swinging frame 22, which is pinned to rock shaft 23. The swinging frame 22 includes a pair of arms 55—55 pinned as at 56 (FIGURE 17) to the rock shaft 23, such that the rocking motion of the actuating lever 52 is imparted to the rock shaft and to the arms 55 so as to reciprocate the swinging frame 22 from the position of FIGURE 15 to the position in FIGURE 16 through operation of the cam 40.

In order to pivot the cross bar 27 and mouthpieces 21 relative to the swinging frame, the cross bar 27 has its opposite ends joined to a pair of generally triangular plates 57—57 (FIGURES 15–17) which, as noted earlier, are pivotally connected as at 28 to the arms 55—55. The plates 57 and cross bar 27, including the suction mouthpieces, thus comprise an assembly which swings through an arch relative to the swinging frame 22.

The suction mouthpieces are pivoted relative to the swinging frame 22 by the cam 41 (FIGURE 17) which includes a cam track (not shown) engaged by a cam follower 58. The follower 58 is journalled upon a cam lever 60, similar to the cam lever 45; lever 60 also has its lower end journalled on the cross shaft 47. The upper end of lever 60 is pivotally connected as at 61 to a link 62. The opposite end of link 62 (FIGURES 15, 16 and 17) is pivotally connected as at 63 to an arm 64 having its upper end loosely journalled as at 65 upon the rock shaft 23, adapting the arm 64 to swing relative to rock shaft. The arm 64 is confined longitudinally with respect to shaft 23 by a collar 66 (FIGURE 17). The lower end portion of arm 64 is pivotally connected as at 67 to a link 68, the opposite end of the link being connected, as at 70, to one of the triangular pivot plates 57.

From the foregoing, it will be understood that the swinging frame 22 as reciprocated through its path or motion as shown in FIGURES 15, 16 and 17 by the cam 40. The mouthpiece assembly is pivoted relative to frame 22, from its pick-off position of FIGURE 15 to the discharge position of FIGURE 16 through operation of the cam 41, which operates in time with the cam 40, bearing in mind that the arm 64 is free to pivot relative to the rock shaft 23. During the blank feeding cycle, the cam 40 pivots the swinging frame assembly 22 from the pick-up position of FIGURE 4 to the position of FIGURE 5 so as to swing the lower side wall 10 of the blank outwardly to a disengaged position with respect to the serrated retainer blocks 31, thus disengaging the lower position of the blank from the magazine. Thereafter, the cam 40 oscillates the swinging frame 22 through its path motion to the position of FIGURE 16 so as to withdraw the blank bodily from the magazine for deposit on the first stage conveyor, which advances the blank to the first forming station 5. As noted earlier, the cam 40 also operates the valve 25 in time with the swinging motion of the frame 22 through operation of the lateral arms 54 of the lever 52.

As is best shown in FIGURES 15 and 16, the valve 25 is mounted in a fixed position with reference to the cross bar 37 by a bracket 71. The valve includes shiftable, two-position plunger 72 projecting outwardly from its opposite ends and arranged to be shifted by the lateral arms 54—54 at the two limits of motion of the swinging frame 22. To facilitate setting up the machine, the upper lateral arm 54 includes an adjustable screw 73 which is locked in its adjusted position by a nut 74.

When the cam 40 swings the frame 22 to its blank engaging position (FIGURE 15), the adjustment screw 73 shifts the plunger downwardly, as indicated by the arrow, so as to interconnect the vacuum conduit 26 with the suction cups, thereby to provide a suction grip with the lower portion of the blank. This vacuum engagement is sustained while the blank is withdrawn from the magazine while the frame 22 swings toward the position of FIGURE 16. As the swinging frame approaches its delivery position, the lower lateral arm 54 engages the lower end of the plunger 72 (FIGURE 16), thereby shifting the plunger upwards, as indicated by the arrow. The valve, which is conventional, is arranged to shut off the vacuum at this point and to vent the mouthpiece to the atmosphere, thereby to release the blank which has been withdrawn from the magazine. The valve remains in the venting position until the mouthpieces are swung back to the position of FIGURE 15 during the next cycle of operation.

As best shown in FIGURE 5, each mouthpiece 21 includes a mounting block 75 in communication with the conduits 24. The blocks 75 interfit the cross rail 27, which is channel-shaped in cross section. Each mouthpiece includes a metallic coupling tube 76 passing through a respective slot 77 formed in the cross rail 27, the upper end of each tube 76 being threaded into its mounting block 75. The mounting blocks and coupling tubes thus provide a clamping engagement with respect to the cross rail 27, adapting the mouthpieces to be adjusted along the rail 27 in accordance with the size of the blanks which are being erected.

Blank Aligning Mechanism

Upon being withdrawn from the magazine and deposited upon the support plates 30 (FIGURE 16), as explained above, the blank 3 occupies an off-center position with respect to the first stage conveyor, indicated generally at 78 in FIGURE 20. The first stage conveyor subsequently advances the flat blank to the first forming station 5. In order to align the blank transversely with the creasing bars of the first forming station (which impress the longitudinal score lines 8), the blank is centered with respect to the longitudinal axis of the machine by the alignment mechanism, which is indicated generally at 80 in FIGURES 13–20.

The alignment mechanism includes a pair of opposed reciprocating pushers, indicated generally at 81—81, which normally reside in a retracted position, as shown in full lines (FIGURES 18–20) as the blank is deposited upon the support plates. Thereafter, the pushers 81 are shifted toward one another, as indicated in broken lines, so as to shift the blank transversely into alignment with the first stage conveyor 78. As explained later, the lever includes a pair of fixed guides 82—82 (FIGURES 30 and 31), located downsteam from the pushers 81, so as to hold the blank in alignment as it is advanced into the first forming station 5.

It will be understood at this point, that the pushers 81—81 of the alignment mechanism are reciprocated in time with the other components of the machine by operation of the common driving system, as described later.

Described in detail with reference to FIGURES 18–20, each pusher comprises a push rod 83 slidably confined in respective bearing blocks 84. The bearing blocks 84 for the right hand push rod 83 are mounted upon an angle bracket 85 projecting outwardly from the frame 2 of the machine. The bearing blocks 84 for the left hand push rod are mounted upon a bearing bracket 86 projecting outwardly from the opposite side of the frame 2. The bearing bracket 86 rotatably journals the alignment cam 87, which operates the pushers 81 in unison with one another.

The alignment cam 87 is mounted on the cross shaft 42 and includes a cam track (not shown) acting upon a cam roller 89 (FIGURES 18 and 19). The cam roller 89 is journalled on a bell crank lever 90 which is pivotally connected as at 91 to the bearing bracket 86. The upper end of the bell crank lever 90 is pivotally connected as at 92 to a cross link 93 which actuates the right hand pusher 80. The bell crank lever 90 also actuates the left hand pusher 81 by operation of a link 94, as explained below.

As best shown in FIGURE 18, the cross link 93 is pivotally connected as at 95 to a lever 96 clamped to a rock shaft 97 which is journalled in a pair of bearing brackets 98 rising from the angle bracket 85. An adjustable lever 100 (FIGURE 20) is clamped to the rock shaft 97 and is pivotally connected by a link 101 to a block 102 which is clamped to the right hand push rod 83. The reciprocating motion of the bell crank 90 is thus transmitted to the right hand push rod 83.

The left hand push rod 83 is actuated by the link 94, which is also connected to the bell crank lever 90, as noted above. Link 94 is pivotally connected to a lever 103 which is clamped to a rock shaft 104. As shown in FIGURE 20, the rock shaft 104 is journalled in bearing brackets 105—105 rising from the bearing bracket 86. Reciprocating motion is imparted to the left hand push rod by an adjustable lever 106 which is clamped to the rock shaft 104. The lower end of the lever 106 is connected by a link 107 to a block 108, which is clamped to the left hand push rod.

Each push rod 83, at its inner end portion, is provided with a blank-engaging guide bar 110, formed of sheet metal and being generally right angular in cross section (FIGURE 18) to provide a converging throat engageable with the edge portion of the blank at opposite sides. Each guide bar 110 is mounted upon a bracket 111 projecting outwardly from a mounting block 112 clamped to the push rod 83. In order to maintain the guide bars 110 in the horizontal plane, each of the blocks 102, which are clamped to the push rods 83, is slotted along one side the slotted portion being slidably engaged with a slide rail 113 (FIGURE 19) which extends parallel with the push rod 83. The slide rails 113 lock the blocks 102 against rotary motion and thus maintain the guide bars 110 in their horizontal planes during reciprocation.

It will be noted (FIGURE 20) that the clamping blocks 102 and 108 are secured to the push rods 83 by means of respective clamping screws 109—109. These screws permit the push rods 83 of the alignment mechanism to be adjusted transversely so as to accommodate for the size of the blanks. In the example disclosed (FIGURE 18), the pushers 81 move from the retracted position shown in full lines to the advanced position shown in broken lines so as to lightly engage the opposite side edges of the blank, thereby to center the blank precisely with respect to the first stage conveyor.

First Stage Conveyor

As noted above, after the blank 3 is withdrawn from the magazine and shifted into alignment, it is engaged by the first stage conveyor 78 and advanced toward the first forming station 5. As indicated diagrammatically in FIGURE 12, the first stage conveyor 78 comprises a chain run which is substantially coextensive with the magazine 4, the downsteam end of the conveyor chain being disposed adjacent the first forming station 5.

In order to position the blank accurately in the longitudinal direction with respect to the plunger assembly at the first station, there is provided a reciprocating positioning mechanism, indicated generally at 114 (FIGURE 29) at the downstream end of the first stage conveyor. The positioning mechanism, as explained later, engages the trailing edge of the blank 3 and reciprocates through its cycle so as to advance the blank longitudinally from the first stage conveyor to its operating position beneath the plunger of the first forming station 5. It will be recalled, at this point, that the opposite side edges of the blank are engaged by the fixed guides 82—82 (FIGURES 30 and 31) as the blank advances to the first station.

As explained later in detail (FIGURE 30), the fixed guide bars 82 are generally right angular in cross section to provide a converging throat, similar to the reciprocating guide bars, previously indicated at 110 in FIGURE 18. The fixed guides, as shown in FIGURES 4 and 5 extend from the downstream ends of the reciprocating guide bars 110 so as to engage the opposite edges of the blank and guide the blank to the first forming station. The stationary guide bars 82 are mounted for transverse adjustment to accommodate the width the blank. In other words, the fixed guide bars 82 are adjusted into alignment with the reciprocating guide bars 110 when the bars 110 are advanced to the position shown in broken lines in FIGURE 18.

Described in detail, the first stage conveyor 78 comprises a sprocket chain run 115 (FIGURES 21–25) passing about a drive sprocket 116 and an idler sprocket 117. The drive sprocket is mounted upon a drive shaft 118 journalled in a bearing bracket 120 attached to the frame 2. As described later in detail, the drive sprocket 116 is driven in time with the other components of the machine by the common driving system. The idler sprocket 117 is carried upon an idler shaft 119 adjustably mounted as at 121 in a bracket structure 122 which is attached to the bearing bracket 119. The chain run 115 is advanced continuously in the direction indicated by the arrows in FIGURES 12, 21 and 29.

As best shown in FIGURE 21, the upper run of the conveyor chain 115 is located immediately beneath the blank support plate, previously indicated at 30 (FIGURE 20). The plate 30 includes a longitudinal slot 123 and the conveyor chain 115 includes a retractable feed finger 124 which projects upwardly to the slot so as to engage and advance the blank 3 which rests upon the support plate 30. The lug 124 advances in time with the machine operations to engage and advance each blank after it has been deposited by the feed mechanism upon the plate 30.

In order to disengage and stop the blank at the downstream end of the conveyor 115, the finger 124 is shifted from the elevated position shown in broken lines (FIGURE 25) to the lowered position shown in full lines. This locates the trailing edge of the blank 3 in a position to be engaged by the retractable pusher 125 of the reciprocating positioning mechanism 114 (FIGURE 29).

As shown in FIGURES 24 and 25, the retractable finger 124 is pivotally mounted upon one of the cross pins 126 of the conveyor chain 115. The upper run of the conveyor chain is slidably supported by a stationary bar 127 which extends longitudinally parallel with the conveyor chain. This bar is secured rigidly to the bearing brackets 120 and 122. As shown in FIGURES 23 and 25, the driving sprocket 116 and idler sprocket 117 are both provided with a peripheral slot 128. The leading end 130 of the stationary bar 127 interfits the slot 128 of the idler sprocket 117 and the trailing end 131 of the bar interfits the slot 128 of the drive sprocket 116, as shown in FIGURES 24 and 25. The retractable finger 124 of the chain includes a downwardly extending tailpiece 132 (FIGURE 24) which engages the leading end 130 of the bar 127 as the finger passes around the idler sprocket to the upper run of the chain engagement of the tailpiece with the bar thus swings the finger 124 from the retracted position shown in full lines to the elevated or active position shown in broken lines, thus causing the finger 124 to engage the trailing edge of the blank. The tailpiece 132 rides upon the upper surface of the bar 127, thus holding the finger in its upright position as it advances across the upper run of the chain. Upon reaching the trailing or downstream end 131 of the bar 127, the tailpiece is disengaged, allowing the finger to drop to the retracted position of FIGURE 25. The blank thus stops at this point to be advanced to the first forming station by the positioning mechanism 114.

Blank Positioning Mechanism

After the blank 3 (FIGURE 25) is disengaged by the finger 124 of the first stage conveyor 78, it dwells momentarily at the first forming station 5, then the trailing edge of the blank is engaged by the first reciprocating pusher 125 of the positioning mechanism 114. As shown in FIGURE 29, the first pusher 125, in its indicated position, is engaged by the lower surface of the support plate 30 and is thereby shifted to its lowered position, adapting the blank 3 to be advanced beyond the end of the retracted pusher 125. After the blank is thus positioned, the pusher 125 is shifted in the downstream direction, causing its forward end to pass beyond the end of the plate 30 and to rise upwardly into engagement with the trailing end of the blank 3, so as to advance the blank to its position within the first forming station.

The first forming station includes stops 133—133 (FIGURES 30 and 31) which engage the leading end of the blank at the forward limit of travel of the first pusher 125, so as to locate the blank accurately with respect to the first station. As viewed in FIGURES 30 and 31, the pusher 125 comprises a pair of spaced limbs 134—134 which straddle the longitudinal slot 123 of the support plate 30, so as to avoid interference with the chain run 115 of the first stage conveyor. As shown in FIGURE 29, the positioning mechanism 114 includes a second retractable pusher 135, which is similar to the pusher 125. As explained later, the second pusher moves in unison with the first pusher and advances the partially formed blank to the second forming station after the blank has been acted upon at the first forming station.

Described in detail (FIGURE 28) the positioning mechanism 114 is reciprocated by a cam 136 mounted on a cross shaft 137 (FIGURE 12) which is journalled in the machine frame and connected with the main driving system. Cam 136 includes a cam track (not shown) arranged to impart reciprocating motion to the positioning mechanism 114. For this purpose there is provided a cam lever 138 having a cam follower 140 confined in the cam track. The cam lever 138 is clamped to a rock shaft 141 journalled in the machine frame. An actuating lever 142 rises upwardly from the rock shaft 141 and is pivotally connected by a link 143 to the slide 144 of the pusher mechanism.

As shown in FIGURES 29–31, the slide 144 is slidably confined in a guide 145 supported by the machine frame 2. The slide 144 is connected to the retractable pushers 125 and 135, as explained below.

In order to adjust the positioning mechanism to accommodate the size of the blank, the slide 144 includes an adjustment bar 146 which is shiftable with respect to the slide. The adjustment bar 146 is connected to the pushers 125 and 135, as explained below. As best shown in FIGURES 29–31 the adjustment bar 146 is mounted for adjustment with respect to a clamping rail 147 which rises from the slide 144. The rail 147 has a longituduinal slot 148 transversed by a clamp screw 150. A rack 151 is attached to the lower surface of adjustment bar 146. For adjustment purposes, a pinion 152 is journalled between the clamping rail 147 and a companion adjustment rail 153 (FIGURES 30 and 31). The pinion is operated by a knob 154.

The pushers 125 and 135 are connected to the adjustment bar 146 by means of plates 155 (FIGURE 29) raising vertically from the adjustment bar 146 at opposite ends. The pushers are connected to the vertical plates 155—155 by respective actuating bars 156—156, which are attached as at 157 to the vertical plates 155. The outer end of each actuating bar is bifurcated as at 158 (FIGURE 31), the pushers 125 and 135 being pivotally attached to the bifurcated end portions of the actuating bars by pivot screws 160—160 (FIGURE 29).

The rearward pusher 125 is normally urged upwardly by a tension spring 161 interconnecting the pusher and its actuating bar. The forward pusher 135 is normally urged upwardly by a compression spring 162. The rearward pusher 125 is slotted and its upper travel is limited by a pin 169 (FIGURE 29) which traverses the slot. The forward pusher 135 normally engages the lower surface of the first forming station, as explained later, so as to engage the partially formed blank as it is advanced from the first forming station.

It will be understood at this point, that the adjustment bar 146 may be shifted longitudinally relative to the slide 144 by loosening the clamp screw 150 and then rotating the knob 154 (FIGURES 29 and 31). This shifts the adjustment bar 146 and the pushers 125 and 135 relative to the slide 144 in initially setting up the machine for a given size blank. The screw 150 is tightened after this adjustment is made.

As the blank is advanced toward the first forming station (FIGURES 30 and 31), its opposite edges pass from the transversely shiftable guide bars 110 of the alignment mechanism 30 and advances between the stationary guides 82—82, which extend along the first forming station 5. In order to compensate for the width of the blank, the stationary guides 82 are mounted upon respective adjustment bars 163—163 (FIGURES 6 and 30). The adjustment bars 163 are shiftably mounted upon transverse guide bars 164 rigidly attached to the frame 2 of the machine. The adjustment bars 163 are locked in adjusted position by means of clamp screws 165—165.

As best shown in FIGURE 6, the locating stops 133—133 are also mounted for transverse adjustment. For this purpose, there is provided, at opposite sides of the machine, an adjustment plate 166 shiftably mounted on a pair of transverse rails 167—167. The adjustment plates 166 at opposite sides are clamped in adjusted position by respective pairs of clamp screws 168—168. Each of the stops 133 is mounted upon a respective block 170 raising from the adjustment plate 166.

As viewed in FIGURES 30 and 31, each stop 133 is right angular in profile so as to provide a vertical limb 171 which overhangs the stationary guide 82. As indicated in broken lines in FIGURE 6 the leading edges 172 of the side wall 10 of the blank is shifted into engagement with the vertical limb 171 by the first pusher 125, thus locating the blank within the first forming station. As explained later, the side walls 10—10 of the blank are erected at the first station 5 (FIGURE 31) thus shifting the leading edges 172 of the side walls upwardly to a disengaged position, adapting the blank to be advanced from the first station to the second station.

*First Forming Station*

As the blank is advanced by the first stage conveyor 73 from the magazine 4 and by the positioning mechanism 114 to the first forming station 5, the creasing bars or mandrels of the first forming station 5 reside in the elevated position, shown in FIGURES 29 and 30. The flat blank thus is positioned against the stops 133—133 in a position to be creased longitudinally along score lines 8—8 (FIGURE 20). After having been thus located, the first forming station shifts from the position of FIGURE 30 downwardly to the position of FIGURE 31 so as to impress the creases 8—8 and, in so doing, to erect the side walls 10—10. After this operation, the forming mechanism shifts back to the elevated position (FIGURE 30) and the overhead conveyor system 173 (FIGURES 12 and 32) advances the blank to the second pusher 135, where the blank dwells momentarily in a position to be advanced to the second forming station by the second pusher 135.

Described in detail (FIGURES 6, 29–31), the first forming station comprises a pair of mandrels or creasing bars 174—174 having forming edges 175—175 projecting downwardly and outwardly from the lower edges thereof. The forming edges 175 are adapted to engage the upper surface of the blank and to force the blank downwardly into the resilient die pads 176—176 (FIGURE 31). The resilient pads 176 are formed of gum rubber or an equivalent material and co-act with the creasing bars to form the longitudinal score lines 8 in the blank 3 and concurrently to erect the side walls 10—10 and the flaps 14 of the blank, as indicated in FIGURE 6.

As best shown in FIGURES 1, 6, 29–31, the creaser bars or mandrels 174 are bolted to the lower end portions of a pair of vertical plates 177—177. The plates are recessed as at 178 to receive the upper portion of the creaser bars. The respective plates 177 have their upper ends connected by T-shaped brackets 180—180 to a mounting plate 181. The vertical plates 177 are clamped to the T-shaped brackets 180 by clamp screws 182. The plates 177 may be adjusted vertically by means of adjustment screws 183. Vertical motion is imparted to the mounting plate 181 by a cam and lever system, as explained later with reference to FIGURE 26.

As best shown in FIGURES 29 and 30, the mounting plate 181 is reciprocated by a vertical plunger 184 slidably confined for vertical motion in a bracket 185, which overhangs the machine in cantilever fashion. As shown in FIGURE 1, the cantilever bracket 185 is in duplicate for the first and second stations and includes a vertical portion having its lower end rigidly attached to the frame 2 of the machine. The cantilever bracket 185 includes a vertical slideway 186 and the vertical plunger 184 is attached to a vertical slide bar 187 which is slidably confined in the slide way 186.

The vertical plunger 184 is adjustably connected to the vertical slide 187 to permit the creasing bars 174 to be adjusted relative to the resilient pads 176. For this purpose the vertical slide 187 is provided with a pair of adjustment screws 188—188 (FIGURE 29) passing through the lower portions 190 of the vertical slide 187 and engaging the opposite sides of a mounting block 191, which is attached by screws 192 to the lower portion of the vertical plunger 184. Rotation of the adjustment screws 188 (with the screws 192 loosened) permits the creasing bars 174 to be adjusted with respect to the slide bar 187.

The creasing bars are reciprocated by a cam 193 (FIGURE 26) which is keyed to the main shaft 194 journalled in the frame 2 and rotated by the driving system in time with the other machine components. A cam follower lever 195 is pivotally mounted upon a rock shaft 196 and includes a follower 197 confined in the track (not shown) of the cam 193. The swinging end of the lever 195 is pivotally connected to a link 198 and the upper end of the link is pivotally connected to an actuating lever 200 which is carried upon a shaft 201. The swinging end of the actuating lever 200 is connected by a pivotal link 202 to the vertical plunger 184. Accordingly, rotation of the cam 193 shifts the vertical plunger 184 from the elevated position shown in full lines (which corresponds to the position of FIGURE 30) to the lowered position shown in broken lines (corresponding to the position of FIGURE 31).

In order to adjust the creasing bars 174 in accordance with the size of the blank, the T-shaped brackets 180 are adapted to be adjusted transversely with respect to the mounting plate 181, thereby to vary the spacing of the longitudinal score lines 8. The resilient pads 176—176 are also mounted for transverse adjustment, such that the pads may be adjusted to mate properly with the creasing bars. For this purpose, the resilient pads 176 are attached to respective mounting blocks 203 (FIGURE 31) which are attached by screws 204—204 to respective adjustment bars 205—205. The adjustment bars 205 are secured by screws 206 which engage the frame 2 of the machine and which clamp the bars 205 transversely in adjusted position with respect to the frame of the machine.

As the flat blank is advanced into the first forming station, it is supported upon an upper table surface provided by a pair of spring-loaded vertical blank support plates 207—207 (FIGURES 29–31). The plates 207 reside in vertical alignment with the downwardly facing flat surfaces 208 of the creasing bars 174—174. The vertical plates are slidably mounted for vertical movement relative to the adjustment bars 205, each plate having a pair of vertical slots 210—210 transversed by screws 211, which are threaded into the end portion of the adjustment bars 205 at opposite sides of the machine.

The vertical support plates 207 are attached by screws 212 (FIGURE 31) to the upright members 213 (FIGURE 29) of a spring-loaded frame 214. Respective tension springs 219 have their lower ends anchored as at 215 to the frame 214, and their upper ends are anchored to brackets 216 (FIGURE 31) which are attached to the adjustment bars 205 at opposite sides of the machine. The vertical blank support plates 207—207 and associated components thus shift laterally with the resilient pads 176—176 when the machine is adjusted for a given box size.

During the cycle of operation at the first forming station (with the creasing bars 174—174 in elevated position, FIGURES 29 and 30), the blank is supported upon the upper surfaces of the spring-loaded blank support plates 207 as the blank is advanced by the reciprocating pusher 125 against the locating stops 133. Thereafter, the cam 193 shifts the vertical plunger 184 and creasing bars 174—174 downwardly from the position of FIGURE 30. During the downward stroke, the forming edges 175 of the creasing bars contact the flat upper surface of the blank 3; thereafter, the flat lower surfaces 208 engage the top surface of the blank and thus clamp the blank with respect to the spring-loaded support plates 207. Continued downward motion of the plunger 184 (FIGURE 31) causes the forming edges 175 to force the blank into the resilient die pads, thus stretching the material of the blank around the forming edges to form the score lines 8—8 and to erect the side walls 10—10 and the side wall flaps 14—14 (FIGURES 6, 20 and 31).

After the first forming operation, the plunger 184 and slide 187 are shifted upwardly to the position of FIGURE 30 to release the partially formed blank, then the second stage overhead conveyor system 173 engages the trailing edge of the partially formed blank and begins to shift the blank toward the second forming station 6, as indicated by the arrow in FIGURE 6.

*Second Stage Conveyor System*

As best shown in FIGURES 1, 12 and 29–33, the second stage conveyor system 173 comprises an endless sprocket chain 217 mounted between the vertical plates 177 of the first forming station 5 and driven in the direction indicated by the arrows, to advance the partially erected blank from the first forming station 5 to a dwell position with its trailing edge spaced slightly in advance of the second reciprocating pusher 135. The pusher 135 comprises spaced limbs 134—134, similar to the first pusher 125, such that the feed finger 218 of the second stage conveyor is free to pass between the spaced limbs 134 of the pushers 125 and 135.

As the blank is shifted from the first forming station 5 by the second stage conveyor system 173, it passes above the free end of the second pusher 135, which is spring-loaded for this purpose, as noted earlier. Upon being advanced from the first forming station, the blank is supported upon a pair of transversely shiftable support bars 220—220 (FIGURE 35), adapting its trailing edge to be engaged by the forward end of the second pusher 135 to be advanced to the second forming station 6. Thus, as the pushers 125 and 135 are reciprocated forwardly from the position of FIGURE 29, the second pusher 135 advances the partially formed blank along the support bars 220 so as to bring the leading edge of the blank into engagement with the stationary stops of the second forming station 6, as explained later in detail.

Described in detail (FIGURES 29, 32 and 33), the chain loop 217 of the second stage overhead conveyor 173 is tracked around a driven sprocket 221 at the downstream end, and about an idler sprocket 222 at the upstream end of the machine. The driving sprocket 221 is journalled on a stub shaft 223 projecting from a vertical bearing plate 224, which is attached to a horizontal support bar 225. As indicated in FIGURE 1, the horizontal support bar 225 is supported by brackets 226 which project upwardly from the machine frame 2.

The idler sprocket 222 (FIGURE 32) is rotatably journalled upon an idler shaft 227 which is supported by a similar vertical bearing plate 224 extending downwardly from the horizontal bar 225. In order to control the slack of the endless chain 217, the idler shaft 227 has its end portion projecting through a slot 228 formed in the vertical bearing plate 224. The idler shaft 227 includes conventional adjusting screws and is locked in its adjusted position relative to the slot by the usual clamping nut.

The endless chain 217 is tracked along an upper rail 230 and a lower rail 231, the end portions of the rails being rigidly attached to the vertical bearing plates 224—224. The feed finger, previously indicated at 218, is pivotally connected to the endless chain 217 in the manner described earlier with respect to the endless chain 115 (FIGURES 21–25). The feed finger 218 (FIGURE 32) includes a similar tailpiece (not shown) which slidably engages the surface of the lower rail 231 so as to pivot the finger 218 to the downwardly projected position shown in FIGURE 32, thereby to engage and advance the partially formed blank. As the finger 218 approaches the driven sprocket 221, the tailpiece passes beyond the downstream end of the lower rail 231, adapting the finger 218 to pivot to its disengaged position. This allows the blank to dwell momentarily on the shiftable bars 220 in advance of the outer end of the reciprocating pusher 135, as noted earlier.

The endless chain 217 is driven in time with the other components of the machine by a drive chain 232 (FIGURES 12 and 29) which is interconnected with the common driving system, as explained later. The drive chain 232 passes around a sprocket 233 which is keyed to a cross shaft 234 (FIGURES 32 and 33). The opposite end portions of cross shaft 234 are journalled respectively in the bearing plate 224, (previously noted) and a bearing bracket 235. As viewed in FIGURES 12, 32 and 33, the cross shaft 234 includes a second sprocket 236 which drives the conveyor system. For this purpose, a chain 237 meshes with sprocket 236 and passes around a sprocket 238 which is attached to the conveyor drive sprocket 221. The sprockets are both journalled on the stub shaft 223, thus transmitting the drive from the chain 232 to the conveyor system 173. In order to control the slack of the chain 237 (FIGURES 32 and 33) there is provided an idler sprocket 240 which is journalled upon a stub shaft carried by an adjustment bar 241. The adjustment bar is clamped in its adjusted position to the vertical bearing plate 224.

*Second Forming Station*

After the dwell period, with the partially formed blank residing in advance of the second pusher 135, the positioning mechanism 114 reciprocates in the downstream direction so as to advance the next flat blank (pusher 125) to the first forming station, as noted earlier. At the same time, the positioning mechanism (pusher 135) advances the partially formed blank 3 to the second forming station 6 (FIGURE 34). At the end of its downstream stroke, the second pusher 135 brings the leading edge of the blank into engagement with a pair of adjustable stop bars 242—242, which are mounted parallel with and along opposite sides of the shiftable support bars 220—220. The stop bars 242 locate the partially formed blank 3 accurately in the longitudinal direction with respect to the mandrel of the second forming station.

As noted earlier, the second forming station 6 impresses the transverse score lines 11—11 which delineate the end walls 12 (FIGURE 20). In addition, the end walls 12—12 are erected at the second station, and the male locking tabs 15 are inserted into the slits 16 of the side walls 10 so as to lock the side and end walls in erected position. After this operation, the erected box is stripped from the second forming station nad discharged from the machine by the third stage discharge conveyor, which is indicated generally at 243 (FIGURE 12).

As best shown in FIGURE 34, the adjustable stop elements 242, which position the partially formed blank 3 within the second forming station, comprise respective elongated bars, each having a V-shaped end 244 engageable with the leading edge of the blank, that is, the outer edge of the downstream end wall 12, as viewed in FIGURE 20. It will be understood at this point, that the side edges of the partially formed blank are engaged by the longitudinal flanges 245—245 (FIGURES 34 and 35), which form a part of the shiftable support bars 220—220, as the blank is transferred by pusher 135 to the second forming station.

The adjustable stop elements 242 (FIGURE 34) are mounted for longitudinal adjustment upon respective horizontal support bars 247—247 by means of clamping screws 248 (FIGURE 34). This arrangement permits the stop bars 242 to be adjusted longitudinally to accommodate the length of the blank. The horizontal support bars 247 are mounted in fixed position upon respective brackets 249 which rise from the machine frame at opposite sides. When the machine is set up for a given size blank, the pusher 135 shifts the leading edge of the blank into engagement with the V-shaped ends 244 of the stop elements 242, thereby positioning the blank accurately with respect to the opposite ends of the mandrel, indicated at 246 (FIGURE 34). As viewed in FIGURE 35, the mandrel 246 dwells in its elevated position as the blank is fed to its forming position within the second forming station.

It will be understood at this point, that the mandrel 246, which corresponds in configuration with the bottom panel of the box, is detachably mounted upon its actuating plunger assembly. This permits the mandrels to be interchanged in accordance with the size of the box to be erected. As explained later, the components at the second forming station, which coact with the mandrel, are also mounted for adjustment to accommodate the size of the box.

Described in detail (FIGURES 34 and 35), the opposite ends of the mandrel 246 are chamfered as at 250—259 to provide forming edges which coact with the resilient die pads 251—251 in impressing the transverse score lines 11 (FIGURE 20) in the blank 3. The mandrel 246 is mounted for reciprocation upon the lower end of a mounting bracket 252 which is of inverted U-shape, as viewed in FIGURE 34. The bracket 252 is secured to a mounting rail 253 which is attached to the lower end of a plunger 254.

As described earlier with reference to the first forming station 5, the vertical plunger 254 of the second forming station is mounted for vertical and horizontal adjustment with respect to a vertical slide 255 (FIGURE 34). Since the plunger and slide arrangement of the second station is identical to the slide structure of the first station 5, the structure need not be described in detail. As noted with respect to the first station (FIGURE 12), the plunger assembly of the second station 6 is mounted for vertical reciprocation with respect to a cantilever bracket 185 which includes a vertical portion rising upwardly from the frame of the machine. The overhanging end of each cantilever bracket, as noted earlier, includes a vertical slideway 186 shiftably confining the vertical slide 255 of the second station.

As viewed in FIGURE 27, the mandrel 246 of the second forming station is reciprocated vertically by a cam 256 which is keyed to the main shaft 194. The cam 256 thus is rotated in time with the other components of the machine by the common driving system mentioned earlier. A cam lever 257, journalled on a shaft 258, includes a follower 260 at its lower end. The follower 260 is confined in the track (not shown) of cam 256 to impart reciprocating motion to the cam lever 257, as indicated by the broken lines in FIGURE 27. The reciprocating motion or cam lever 257 is transmitted by a link 263 to an actuating lever 261 journalled on a shaft 262.

The swinging outer end of the actuating lever 261 is connected by a link 264 to the vertical slide 254, similar to the arrangement of the first station. Rotation of the cam 256 thus reciprocates the slide assembly and mandrel 246 (second station 6) from the elevated position to the lowered position, as indicated by the broken lines in FIGURE 27.

*Reciprocating Blank Support Rails (Second Forming Station)*

As the mandrel 246 moves downwardly, it engages the bottom panel 13 of the partially formed blank so as to force the blank downwardly. At this point, the transversely shiftable support rails 220—220 (FIGURES 34 and 35) shift outwardly to provide clearance for the blank. For this purpose, the rails 220—220 are mounted upon respective pairs of actuating levers 265—265 which are pivotally mounted as at 266 upon respective pairs of support bars 267. The lower ends of the actuating levers 265 are secured as at 268 to the respective support bars 220. The actuating levers 265 are normally biased outwardly by respective tension springs 270—270 having opposite ends anchored to the levers 265 and to the support bars 267.

The levers 265 and rails 220 are reciprocated by respective pairs of cams 271 and 274 (FIGURES 34–36) at opposite sides of the machine. The cams are mounted upon respective cross shafts 272 and 275 which are connected with the common driving system. It will be understood that the cam and linkage shown in FIGURE 35 is in duplicate for the opposite side of the machine. It will also be understood, at this point, that each of the cams 271 and 274 includes a track 273 for reciprocating the resilient pads, previously indicated at 251.

As shown in FIGURES 34–37, each cam 274 includes a lobe 276 on its face which is opposite the track 273. A cam lever 277 is pivotally mounted as at 278 to the frame of the machine. The lower end of lever 277 includes a roller 280 which tracks against the cam lobe 276. The upper end of lever 277 is pivotally connected as at 281 to a link 282. In order to permit the spacing of the shiftable rails 220 to be adjusted for different box sizes, the link 282 is slotted as at 283. The arrangement is such that the link 282 may be adjusted with respect to the pivot bearing 281.

The inner end of each link 282 (on opposite sides of the machine) is pivotally connected as at 284 to an arm 285. As viewed in FIGURE 7, the arm 285 is mounted upon an end portion of the rock shafts 286 on opposite sides of the machine. Each rock shaft includes a pair of toggle arms 287 and associated linkage connected to the opposite end portions of the respective support rails 220. The toggle arms 287, which are keyed to the rock shaft 286, are pivotally connected as at 288 to the upper ends of the respective actuating levers 265. Accordingly, rotation of the cams 274—274, through operation of the linkage, shifts the support rails 220 outwardly from the position shown (FIGURE 35) as the mandrel 246 moves downwardly.

The vertical mounting bars 267, which carry the support rails 220, are carried by respective bars 290—290 (FIGURE 35). The outer end portions of the bars 290 are adjustably secured as at 291 to the frame structure, adapting the support structure, and the shiftable rails 220, to be adjusted transversely in accordance with the size of the box.

*Operation (Second Forming Station)*

As the mandrel 246 moves downwardly (with the support rails 220 shifted outwardly from the position of FIGURE 35), the side walls 10—10 of the blank pass downwardly between a pair of vertical guide plates 292. It will be noted at this stage, that the side walls 10—10 of the box flare outwardly from the bottom panel; consequently, the side walls are sprung inwardly to vertical planes as the partially formed box is forced downwardly between the guide plates 292. As the blank is forced downwardly from the position shown in FIGURES 7 and 35, the chamfered ends 259 (FIGURE 34) of mandrel 246 force the opposite end portions of the blank downwardly against the top surface of the resilient plates 251—251 to impress the transverse score lines 11—11, thereby to delineate the end walls 12—12 (FIGURES 8, 34 and 45–48).

During this operation, the endwise portion of the side walls 10—10 are acted upon by respective plow elements 293 to open the female locking slits 16 for subsequent insertion of the male locking tabs 15 of the end walls. After the transverse score lines 11 are thus impressed (FIGURE 46), the resilient pads 251 (which are spring biased, as explained later) are deflected, by operation of the mandrel as shown by the arrows in FIGURE 47. As the transverse score lines 11 are impressed and the spring biased resilient die pads 251 begin to deflect, the opposed resilient die pads began to move outwardly (by operation of a cam and lever system), while the mandrel and partially formed box continue to move downwardly, as indicated by the arrows in FIGURE 47. During this continued downward motion of the mandrel and box, the end walls 12—12 are cammed against the opposed inner edges of the resilient die pads 251, thus erecting the end walls and concurrently inserting the male tabs into the female locking slits 16. After this operation, the erected box is pulled downwardly from the mandrel by a suction stripper assembly, as indicated generally at 294 (FIGURE 8), to be deposited upon the discharge conveyor, previously indicated at 243 in FIGURE 12.

Described in detail (FIGURES 8, 34, 35 and 45–49), the plow elements 293 are mounted at the four corners of the mandrel 246 for downward movement in unison with the mandrel relative to the stationary guide plates 292. Each female locking slit 16 is delineated by an angular line of severance in the side walls 10—10, thus forming a tongue 295 which is engaged by the plow element 293. Each plow element comprises a base 296 which is adjustably secured to the top surface of the mandrel by a screw 297. A vertical limb 298 rises from the base and has an upper portion 300 which curves outwardly, generally at right angles to the base, as shown in FIGURE 8. As viewed from above (FIGURE 49), the upper portion 300 of each plow projects outwardly at an angle with respect to the side edge of the mandrel. The end portions 300 of the plows register with the tongues 295 of the side wall when the mandrel shifts downwardly from the position of FIGURE 35 to the position of FIGURE 45 into engagement with the bottom panel 13 of the blank. Thereafter, the partially formed box moves downwardly in unison with the mandrel and with the plows relative to the guide plates 292 for insertion of the male locking tabs 15 into the female slits 16.

As best shown in FIGURES 35 and 45, each stationary guide plate 292, near its upper portion, includes respective pairs of rollers 301 located in positions to straddle the tongues 295 which delineate the female locking slits 16. Each pair of rollers 301 is journalled as at 302 in respective brackets 303 which is pivotally connected as at 304 to the guide plates 292 (FIGURES 7 and 8). Each bracket 303 is urged toward the guide plate 292 by a compression spring 305 mounted on a post 306 projecting outwardly from the guide plates 292. As viewed in FIGURE 45, each guide plate 292 includes respective right angular cut-out portions 307, which expose the side walls 10 of the box to the action of the pairs of rollers 301.

As the mandrel 246 forces the partially formed box downwardly between the stationary guide plates 292 (FIGURE 45), the pairs of rollers 301, at the four corners of the box, straddle the tongues 295 which delineate the locking slits 16. As noted earlier, the upper portion 300 of each plow element registers with the tongue 295. Thus, as the mandrel and plow elements descend, the upper portions 300 of the plow elements (which project outwardly at an angle), forces the tongues 295 of the female slits 16 outwardly at an angle to the side wall to receive the male locking tabs 15 (FIGURE 48).

During continued downward motion (FIGURES 46, 47 and 48), the tongues 295 (which are sprung outwardly by the angular portions 300 of the plows) move downwardly below the rollers and advance along a vertical channel 308, which is delineated by a plate 310 attached to the vertical guide plate 292. The plates 310 are attached to the end portions of both guide plates so as to act upon the four corners of the erected box. The channels 308 thus provide clearance for the tongues 295 which are sprung outwardly by the end portions 300 of the plow elements, as noted above.

As the mandrel and box move in unison from the position of FIGURE 46 to the position of FIGURE 47, the mandrel forces the blank into the upper portion of the resilient pads 251, as noted earlier, to impress the transverse score lines 11. Thereafter, the spring biased pads 251 begin to deflect downwardly in response to the mandrel pressure, then the pads begin to shift outwardly in opposite directions by operation of the cams 271 and 274 (FIGURE 34.) As noted earlier, this compound motion of the pads is indicated by the arrows in FIGURE 47. Accordingly, the continued downward motion of the mandrel and box cause the end walls 12—12 to cam against the edges of the resilient pads, thereby to erect the end walls and concurrently to insert the male locking tabs 15 into the female locking slits 16.

As viewed in FIGURE 49, the edges 312 of the side walls 10 are inclined inwardly from a perpendicular plane. The arrangement is such that the end walls 12 are forced by the edges of the resilient pads inwardly beyond a perpendicular position (FIGURES 47 and 49) during the downward motion of the box. This causes the upper end portions 313 of the male tabs to pass through the female slits 16 and inwardly beyond the position shown in FIGURE 49. After passing downwardly beyond the edges of the resilient pads 251, the end walls 12 spring outwardly to the position of FIGURE 49. At this point, the curved edge portion 314 of each male locking tab intersects the curved edge portion 315 of the female locking slit 16. This locks the end walls 12 firmly in erected position relative to the side walls 10, as shown in FIGURE 49. Thereafter, the erected box 7 is discharged from the machine.

*Resilient Pad Actuating Mechanism*

Referring to FIGURES 7, 8, 34, 35 and 36, the resilient pads 251 are mounted upon respective rock shafts 316—316. The cams, previously indicated at 271 and 274, are in duplicate at opposite sides of the machine (FIGURE 36). The opposite ends of the rock shafts 316—316 are journalled in the swinging ends of respective pairs of cam levers 317—317. The lower ends of the cam levers 317 are pivotally connected as at 318 to the machine frame 2 (FIGURES 34 and 35). The upper portion of each lever includes a roller 320 confined in the track 273 (previously indicated) of the respective pairs of cams 271 and 274. The pairs of cams 271 and 274 are rotated in time with the other components of the machine, such that the resilient die pads at opposite end of the box retract (FIGURE 47) in unison with one another as the end walls are erected and locked.

The cam tracks 273 are configured to cause the resilient die pads to dwell momentarily in the retracted position so as to permit the mandrel 246 to pass upwardly without interference between the pads during its upward or return stroke, after the erected box 7 is stripped from the mandrel.

As noted earlier, the mandrel 246 of the second forming station 6 is interchangeable with other sizes to accommodate the size of the box being erected. The other components of the machine are adjustable, as explained earlier, to accommodate for the width of the box. In order to compensate for the length of the box, that is, the location of the transverse score lines 11, as determined by the chamfered ends 250 of mandrel 246, the resilient pads 251 and associated mechanism are also adjustable longitudinally with respect to the mandrel 246.

As viewed in FIGURES 34–39, the right hand resilient die pad 251 and associated mechanism, as a unit, is mounted upon a pair of slides 321—321. The slides are shiftable along a horizontal plane relative to a pair of slide bars 322—322 attached to the frame 2 of the machine at opposite sides. As best shown in FIGURE 36, the cross shaft 272, which operates the cams 271 of the right hand die pads, has its opposite end portions rotatably journalled in the slides 321—321. Rotary motion is imparted to the shaft 272 by a bevel gear 323 mounted on shaft 272 and meshing with a bevel gear 324 which is slidably keyed as at 325 to a power shaft 326. The shafts 272 and 326 of the bevel gear are journalled in a bearing bracket 327 which is slidably connected to the machine frame. The power shaft 326 is rotated by the driving system of the machine, as noted later. As viewed in FIGURE 34, the cam levers 317, which support the right hand resilient die pad 251, are also journalled for shifting motion with respect to similar slides 321—321. Accordingly, the right hand pad 251, including the cams, cam levers and bevel gears may be shifted longitudinally of the machine frame to accommodate the size of the box.

In order to facilitate this adjustment (FIGURES 36–39), each of the slides 321—321 includes a nut 328 traversed by a respective threaded shaft 330 journalled with respect to the machine frame. The shafts 330 each include a bevel gear 331 meshing with respective companion bevel gears 332—332 mounted upon a cross shaft 333. The cross shaft 333 has its opposite ends journalled for rotation with respect to the frame of the machine. The outer end of the cross shaft 333 includes an adjustment knob 334 for rotating the shaft. Manual rotation of the knob 334 thus shifts the right hand resilient pad and associated components longitudinally relative to the machine to locate the die pad 251 accurately with respect to the right hand forming edge 250 of mandrel 246.

The left hand resilient die pad 251 and associated mechanism, as a unit, is also mounted for longitudinal adjustment. Thus, as viewed in FIGURE 36, the power shaft 326 includes a second bevel gear 335 meshing with a bevel gear 336 mounted on the end portion of the cam shaft 275. The opposite end portions of the left hand cam shaft 275 are rotatably journalled in slides 321—321, as described with reference to the right hand cam shaft 272. A pair of threaded shafts 337—337 are journalled for rotation in the opposite sides of the machine frame and are in threaded engagement with the respective nuts 338—338 attached to the slides 321 for adjustment purposes. An adjustment shaft 340, similar to shaft 333, includes bevel gears for rotating the threaded shafts 337—337, thereby to shift the left hand pad 251 and associated parts upon manual rotation of the knob 339.

Stripper Mechanism

As noted above (FIGURES 8 and 34), the stripper mechanism 294 pulls the erected box 7 from the mandrel 246 at the lower limit of motion of the mandrel. The stripper mechanism includes suction mouthpieces 341 which engage the bottom panel 13 of the erected box, similar to the mouthpiece 21, which withdraws the blanks from the magazine. When the mandrel reaches the lower limit of its stroke, as indicated by the broken line A in FIGURE 34, the stripper assembly shifts to its elevated position, indicated at B, such that the suction mouthpieces 341 are brought into contact with the bottom panel 13 of the erected box. At this point vacuum is applied to the mouthpieces to establish a suction engagement with the bottom panel, then the stripper 294 is shifted downwardly to the position indicated at C in FIGURE 34. When the stripper assembly is lowered to the position C, the bottom panel of the box resides immediately above the third stage or discharge conveyor 243, as indicated in FIGURES 12, 34, 40 and 41.

Described in detail (FIGURES 11, 40 and 41) the stripper assembly 294 is reciprocated by a cam 342 mounted upon the common drive shaft 194. A cam lever 343 is mounted upon a rock shaft 344 and includes a follower 345 confined in the track 347 of the cam. A second lever 346 is fixed to rock shaft 344 and is linked as at 349 to a plunger 348 which is slidably mounted for vertical motion in the guides 350 attached to the machine frame.

Attached to the upper end of the vertical plunger 348 is a horizontal mounting bar 351 including a pair of spaced parallel limbs 352 rising upwardly and straddling the discharge conveyor 243. The several suction mouthpieces 341 are mounted at spaced points along respective horizontal manifolds 353 attached to the vertical limbs 352. The mouthpieces 341 communicate with the manifolds, as explained below.

Vacuum is applied to the manifolds and mouthpieces 341 by respective conduits 354—354 which communicate with respective junction blocks 355. The junction blocks, in turn, are connected by conduits 356 with a control valve 357. The valve 357 is generally similar to the valve 25, previously described and is mounted in a stationary position along the machine frame 2 relative to the plunger 348.

The valve 357 is interconnected with a vacuum system (identified later in FIGURE 10) and includes a two-position plunger 358 which is shifted longitudinally by the actuating fingers 360 and 361 projecting outwardly from the reciprocating plunger 348. Thus, when the stripper assembly is shifted upwardly to the position indicated at B (FIGURE 34), the valve plunger 358 is shifted upwardly by the lower finger 361 (FIGURE 40). At this point, the valve applies vacuum to the mouthpieces 341 so as to engage the bottom panel of the box. The assembly then shifts downwardly to the position C (FIGURE 34) so as to strip the box from the mandrel. Upon reaching its lower limit of travel, the upper finger 360 shifts the valve plunger 358 downwardly (FIGURE 40) so as to apply atmospheric pressure to the suction mouthpieces, thus releasing the bottom panel with the box located above the discharge conveyor 243.

As best shown in FIGURES 8 and 9, the erected box is engaged between respective pairs of vertical guide bars 362—362 depending from the machine frame, as it is stripped from the mandrel. These bars slidably engage the side walls of the box as it is slipped from the mandrel 246 and shifted downwardly to the discharge conveyor 243.

Discharge Conveyor

Referring to FIGURES 42–44, the third stage discharge conveyor 243, is generally similar to the first stage conveyor 78, previously described. The discharge conveyor 243 in general comprises an endless chain 363 passing about a drive sprocket 364 at the downstream end of the machine. The drive sprocket 364 is mounted upon a stub shaft 365 which has its opposite ends journalled in a bracket 366 attached to the machine frame 2. The stub shaft 365 includes a pinion 367 meshing with a gear 368 keyed to a cross shaft 370. The cross shaft 370 has one endwise portion journalled in the bracket 366 and its opposite end journalled in a bracket 371. A sprocket 372 is keyed to the cross shaft 370 and is driven by a power chain 373, which is connected with the main drive system. Slack in the chain 373 is controlled by the adjustable idler sprockets 374 and 375, which are adjustably mounted upon the machine frame.

The upstream end of the endless conveyor chain 363 passes about an idler sprocket 376 carried upon an idler shaft 377 adjustably mounted in a bracket 378 carried by the machine frame. A pair of adjustment screws 380 engage the opposite end portions of shaft 377 for adjusting the endless conveyor chain 363.

The upper run of chain 363 is supported by a rail 381. The chain run includes a retractable feed finger 382 pivotally connected to the endless chain, similar to the finger 124 (FIGURES 21–25). The chain 363 is advanced in the direction indicated by the arrow (FIGURE 42) and the finger is erected as it advances about the idler sprocket 376 upon engagement of its tailpiece with the rail 381. The finger 382 thus advances the erected box 7 to the shelf 383. From the shelf the erected boxes are transported from the machine by suitable conveyor mechanism which is not shown.

*Driving System*

Referring to FIGURES 10, 11 and 12, the driving system of the machine is powered by an electric motor 384 which is mounted upon an adjustable base 385 carried by the machine frame. The motor includes a variable pitch pulley 386 connected by a belt 387 to a companion variable pulley 388 of a speed reduction gear box 390. The pulleys 386 and 388 are conventional and permit the speed of the machine to be regulated by operation of a hand wheel 391, arranged to shift the motor 384 relative to the adjustable base 385.

The gear reduction unit 390 is in driving connection with the main drive shaft 194. For safety purposes, a magnetic clutch 392 is interposed in the drive shaft adjacent the speed reduction unit. The clutch is interconnected with a suitable electrical control system (not shown) arranged to disengage the clutch in the event certain components of the machine should become jammed. The main drive shaft 194 is interconnected with the several components of the machine, as explained below. As shown in FIGURE 10, the vacuum system for the suction mouthpieces 21 of the magazine and mouthpieces 341 of the discharge mechanism includes a vacuum pump 393 mounted in the base of the machine. The pump is driven by a motor 394. Since the vacuum system is conventional, the details have been omitted from the disclosure.

As noted earlier the cams 40 and 41 (FIGURE 17) which operate the feed mechanism of the magazine, and also the cam 87 of the blank aligning mechanism 80 (FIGURE 20), are mounted upon the cross shaft 42. Cross shaft 42 includes a sprocket 395 having a sprocket chain 396. As shown in FIGURES 10–12, the sprocket chain 396 passes about a sprocket 397 which is keyed to the main shaft 194. This completes the drive from the main shaft to the cams 40 and 41 of the magazine and to the cam 87 of the alignment mechanism.

The drive to the first stage conveyor 78 (FIGURES 12 and 21–25), which advances the flat blanks from the blank aligning mechanism 114 (FIGURE 20) to the first forming station 5, is driven by a pinion 398 (FIGURE 22) which is keyed to the drive shaft 118 of conveyor 78. Pinion 398 meshes with a gear 400 keyed to one end portion of a cross shaft 401. A drive sprocket 402 is keyed to the opposite end of shaft 401 and includes a sprocket chain 403. As shown in FIGURES 10 and 12, the sprocket chain 403 meshes with a sprocket 404 mounted upon the cross shaft, previously indicated at 137. The cross shaft 137 (FIGURE 10) includes a bevel gear 406 meshing with a bevel gear 407 which is keyed to the main drive shaft 194.

This completes the drive to the first stage conveyor 78. The cross shaft 401 (FIGURES 12 and 22) also completes the drive to the second forming station, as explained later.

The reciprocating blank positioning mechanism 114 (FIGURE 29), as explained previously, is actuated by the cam 136, also mounted on the cross shaft 137 (FIGURE 28). As indicated diagrammatically in FIGURE 12, the lever 142 of the positioning mechanism is mounted on the rock shaft 141 which is carried by the machine frame above the cam 136. As noted earlier, the slide 144 of the positioning mechanism 114 locates the blank accurately at the first forming station 5.

As previously explained with reference to FIGURES 6 and 29–31, the creaser bars or mandrels 174 at the first forming station 5 are reciprocated by the cam 193 (FIGURE 26) which is carried upon the main shaft 194. The cam lever 195 of cam 193 is carried upon the rock shaft 196, which is parallel with the main shaft 194 and spaced above it. The motion imparted to the creaser bars by the cam 193 is indicated by the broken lines in FIGURE 26.

Described with reference to FIGURES 12, 29, 32 and 33, the second stage overhead conveyor 173 shifts the partially formed blank from the first forming station 5 to a position adapting the second reciprocating pusher 135 to advance the blank to the second forming station 6. The second stage overhead conveyor 173 is interconnected with the first stage conveyor 78, such that both conveyors are driven by the cross shaft 137. Thus, as explained with reference to FIGURES 12 and 33, the second stage conveyor 173 is driven by the sprocket chain 232 which passes around the sprocket 233 of cross shaft 234 of the second stage conveyor 173. Referring now to FIGURE 22, the chain 232 passes around a sprocket 408 mounted on the cross shaft 401 which drives the first stage conveyor 78. The first stage conveyor, as noted above (FIGURE 12), is interconnected with the main driving system by the cross shaft 137 and sprocket 404.

Reciprocating motion is imparted to the mandrel 246 of the second forming station 6 (FIGURES 8, 27, 34 and 35) by the cam 256, as noted earlier. As shown in FIGURE 11, cam 256, which is linked to the plunger 254 of the second forming station, is keyed to the common drive shaft 194.

The transversely shiftable support rails 220—220 (FIGURE 35), which shift outwardly to provide clearance for the blank at the second forming station 6, are reciprocated by the respective pairs of cams 271 and 274 (FIGURES 36 and 37), as noted earlier. The cams 271 are mounted on the cross shaft 272 and the cams 274 are mounted upon the cross shaft 275. The cross shafts 272 and 275 are rotated in unison by the longitudinal power shaft 326. The longitudinal power shaft 326 is driven from the common drive shaft 194 by a sprocket 410 (FIGURE 36) having a chain 411. As shown in FIGURE 11, the chain 411 passes around a sprocket 412 keyed to the common drive shaft 194. This completes the drive to the shiftable support rails 220—220 at the second forming station 6.

As noted above, the erected box 7 is stripped from the mandrel 246 (second forming station 6) by the stripper assembly 294, which is actuated by the cam 342 (FIGURES 8, 34, 40 and 41). As viewed in FIGURE 11, cam 342 is mounted upon the common drive shaft 194. The reciprocating motion of the cam is imparted to the stripper mechanism by the cam lever 343 which is clamped to the rock shaft 344. The lever 346, which is keyed to the rock shaft 344, transmits the reciprocating motion to the stripper mechanism.

The discharge conveyor 243 (FIGURES 10, 12 and 42) is driven from the common driving system by the power chain 273. Chain 373 passes around the sprocket 413, which is keyed to the cross shaft 137, thus driving the discharge conveyor in time with the other components of the machine Having described our invention, we claim:

1. A box forming machine for erecting boxes formed from flat pre-cut sheet blanks, said blanks comprising a bottom panel having opposed pairs of wall portions, two of the opposed wall portions of the blank including female locking slits, the two adjacent wall portions of the blank including male locking tabs adapted to be inserted into the said female slits to lock the walls of the box in erected position, said box forming machine comprising, a first stage conveyer for feeding said blanks individually into said box forming machine, a first forming station having reciprocating mandrel means adapted to impress a first pair of score lines in said blank, thereby to delineate and partially erect a first pair of opposed walls from the blank, a reciprocating positioning mechanism disposed adjacent the first stage conveyor, said mechanism having a first pusher adapted to position said blank longitudinally with respect to the first forming station, a second forming station having reciprocating mandrel means adapted to impress a second pair of score lines in the blank, thereby to delineate and partially erect a second pair of opposed walls from said blank, said reciprocating positioning mechanism having a second pusher movable in unison with said first pusher and adapted to advance the partially erected blank from the first forming station to the second forming station, and means adapted to completely erect said opposed pairs of walls and concurrently to insert said male locking tabs into said female locking slits, thereby to lock the said walls in erected position.

2. A box forming machine for erecting boxes formed from flat pre-cut sheet blanks, said blanks comprising a bottom panel having opposed pairs of wall portions, two of the opposed wall portions of the blank including female locking slits, the two adjacent wall portions of the blank including male locking tabs adapted to be inserted into the said female slits to lock the walls of the box in erected position, said box forming machine comprising, a first stage conveyor for feeding said flat blanks individually into the box forming machine, a first forming station having reciprocating mandrel means adapted to impress a pair of longitudinal score lines in said blank and thereby to delineate and partially erect a first pair of walls from the blank, a reciprocating positioning mechanism disposed adjacent said first stage conveyor, said mechanism having a first pusher adapted to engage the blank at the end of the first stage conveyor and to position the same longitudinally with respect to said first forming station, a second forming station having reciprocating mandrel means adapted to impress a pair of transverse score lines in the blank, thereby to delineate and partially erect a second pair of opposed walls from said blank, said reciprocating positioning mechanism having a second pusher movable in unison with said first pusher, said second pusher adapted to engage the blank at the first forming station and to advance the partially erected blank from the first forming station toward the second forming station, means for locating the partially erected blank longitudinally relative to the second station, thereby to locate the transverse score lines in the blank, and means at said second forming station adapted to completely erect said opposed pairs of walls and concurrently to insert said male locking tabs into said female locking slits, thereby to lock the said walls in erected position.

3. A box forming machine as set forth in claim 2 in which the mandrel means at the first forming station are mounted upon vertically reciprocating plunger means, and in which the position of the mandrel means relative to the plunger means at the first station may be varied transversely so as to vary the spacing of the longitudinal score lines, thereby to control the width dimension of the box in accordance with the width dimension of the blank.

4. A box forming machine for erecting boxes formed from flat pre-cut sheet blanks, said blanks comprising a bottom panel having opposed pairs of wall portions, two of the opposed wall portions of the blank including female locking slits, the two adjacent wall portions of the blank including male locking tabs adapted to be inserted into the said female slits to lock the walls of the box in erected position, said box forming machine comprising, a first stage conveyor for feeding said flat blanks individually into the box forming machine, a first forming station having reciprocating mandrel means, deformable die pads mounted below said reciprocating mandrel means, said mandrel means adapted to force portions of said blank into said deformable die pads, said mandrel means thereby adapted to impress a pair of longitudinal score lines in said blank to delineate and partially erect a first pair of walls from the blank, a reciprocating positioning mechanism disposed adjacent said first stage conveyor, said mechanism having a first pusher adapted to position the blank longitudinally relative to the first forming station, a second forming station having reciprocating mandrel means adapted to impress a pair of transverse score lines in the blank, thereby to delineate and partially erect a second pair of opposed walls from said blank, said reciprocating positioning mechanism having a second pusher movable in unison with said first pusher and spaced forwardly therefrom, said second pusher adapted to engage and advance the partially erected blank from the first forming station toward the second forming station, and means at said second forming station adapted to completely erect said opposed pairs of walls and concurrently to insert said male locking tabs into said female locking slits, thereby to lock the said walls in erected position.

5. A box forming machine as set forth in claim 4 in which the deformable die pads at the first forming station are supported upon mounting means attached to the forming machine, and in which the position of the mounting means and deformable die pads may be varied transversely to correspond with the transverse spacing of the reciprocating mandrel means to vary the transverse spacing of the longitudinal score lines which are impressed in the blank.

6. A box forming machine for erecting boxes formed from flat pre-cut sheet blanks, said blanks comprising a bottom panel having opposed pairs of wall portions, two of the opposed wall portions of the blank including female locking slits, the two adjacent wall portions of the blank including male locking tabs adapted to be inserted into the said female slits to lock the walls of the box in erected position, said box forming machine comprising, conveyor means, means for feeding said flat blanks individually to said conveyor means, a blank alignment mechanism associated and with the conveyor means and adapted to align said blank transversely on the conveyor means, a first forming station adapted to receive the aligned blank from the conveyor means, a reciprocating positioning mechanism disposed adjacent the conveyor means, said mechanism having a first pusher adapted to position the blank longitudinally relative to the first forming station, said reciprocating mandrel means adapted to impress a pair of longitudinal score lines in said blank and thereby to delineate and partially erect a first pair of walls from the blank, a second forming station having reciprocating mandrel means adapted to impress a second pair of transverse score lines in the blank, thereby to delineate and partially erect a second pair of opposed walls from said blank, said reciprocating positioning mechanism having a second pusher spaced forwardly from said first pusher, said second pusher adapted to engage and advance the partially erected blank from the first forming station toward the second forming station, and means at said second forming station adapted to completely erect said opposed pairs of walls and concurrently to insert said male locking tabs into said female locking slits, thereby to lock the said walls in erected position.

7. A box forming machine as set forth in claim 6 in which the blank alignment mechanism includes pusher elements which reciprocate transversely relative to the conveyor means and which are adapted to engage the opposite side edges of the blank and to align the same transversely on the conveyor means, and in which the transverse position of the pusher elements may be varied relative to the alignment mechanism to compensate for the width dimension of the blank.

8. A box forming machine for erecting boxes from flat pre-cut sheet blanks, said blanks adapted to provide a bottom panel having opposed pairs of wall portions, said box forming machine comprising, a first forming station having reciprocating mandrel means, said mandrel means adapted to impress a pair of longitudinal score lines in said blank to delineate and partially erect a first pair of walls from the blank, a second forming station having reciprocating mandrel means, respective deformable die pads mounted relative to the mandrel means of the second forming station, said deformable die pads normally residing in an active position, said mandrel means adapted to force portions of said blank into said deformable die pads, said mandrel means thereby adapted to impress a pair of transverse score lines in the blank to delineate and partially erect a second pair of walls from the blank, and means for shifting said die pads from said active position to a retracted inactive position relative to said mandrel means, thereby adapting the partially erected blank to be forced downwardly by said mandrel means between said retracted die pads.

9. A box forming machine as set forth in claim 8 in which the deformable die pads at the second forming station are supported by reciprocating means, and in which the position of the die pads and reciprocating means may be varied longitudinally relative to one another to vary the location of the transverse score lines, thereby to control the length dimension of the box in accordance with the length dimension of the blank.

10. A box forming machine as set forth in claim 8 in which the deformable die pads at the second station are spring-biased to a normal working position relative to the reciprocating mandrel means, and in which the die pads are adapted to be pivoted to an inclined position when the mandrel means forces portions of the blank into the deformable die pads, thereby to facilitate the formation of the transverse score lines.

11. A box forming machine for erecting boxes from flat pre-cut sheet blanks, said blanks adapted to provide a bottom panel having opposed pairs of wall portions, said box forming machine comprising, a first forming station having vertically reciprocating mandrel means, respective deformable die pads mounted below said reciprocating mandrel means, said mandrel means adapted to force portions of said blank into said deformable die pads, said mandrel means thereby adapted to impress a pair of score lines in said blank to delineate and partially erect a first pair of walls from the blank, a second forming station having vertically reciprocating mandrel means, respective deformable die pads mounted below the reciprocating mandrel means of the second forming station, said deformable die pads normally residing in an active position below said mandrel means, said mandrel means adapted to force portions of said blank into said deformable die pads, said mandrel means thereby adapted to impress a second pair of score lines in the blank to delineate and partially erect a second pair of walls from the blank, and means for shifting said die pads outwardly from said active position to a retracted inactive position relative to said mandrel means, thereby adapting the partially erected blank to be forced downwardly by said mandrel means between said retracted die pads.

12. A box forming machine for erecting boxes from flat pre-cut sheet blanks, said blanks adapted to provide a bottom panel having opposed pairs of wall portions, said box forming machine comprising, a first forming station having vertically reciprocating mandrel means, said mandrel means adapted to impress a first pair of score lines in said blank to delineate and partially erect a first pair of walls from the blank, a second forming station having vertically reciprocating mandrel means, respective deformable die pads mounted below the mandrel means of the second forming station, said deformable die pads normally residing in an inactive position below said mandrel means, said mandrel means adapted to force portions of said blank into said deformable die pads, said mandrel means thereby adapted to impress a second pair of score lines in the blank to delineate and partially erect a pair of end walls from the blank, and means for shifting said die pads outwardly from said active position to a retracted inactive position relative to said mandrel means, thereby to adapt the partially erected formed blank to be forced downwardly by said mandrel means between said retracted die pads, said die pads adapted to slidably engage said partially erected walls, whereby the second pair of walls is shifted to erected position upon being forced downwardly between said retracted die pads.

13. A box forming machine for erecting boxes from flat pre-cut sheet blanks, said blanks comprising a bottom panel having opposed pairs of side and end wall portions, the side wall portions of the blank including female locking slits, the end wall portions of the blank including male locking tabs adapted to be inserted into the female locking slits to lock the walls of the box in erected position, said box forming machine comprising, a first forming station having vertically reciprocating mandrel means, said mandrel means adapted to impress a pair of longitudinal score lines in said blank to delineate and partially erect a pair of side walls from the blank, a second forming station having vertically reciprocating mandrel means, respective deformable die pads mounted at the second forming station, said deformable die pads normally residing in an inactive position below said mandrel means, said mandrel means adapted to force portions of said blank into said deformable die pads, said mandrel means thereby adapted to impress a pair of transverse score lines in the blank to delineate and partially erect a pair of end walls from the blank, means for shifting said die pads outwardly from said active position to a retracted inactive position relative to said mandrel means, thereby to adapt the partially erected blank to be forced downwardly by said mandrel means between said retracted die pads, said die pads adapted to slidably engage said partially erected end walls, whereby the end walls are shifted to erected position upon being forced between said retracted die pads, and means adapted to guide said male locking tabs of the end walls through the locking slits of the side walls, thereby to lock the walls in erected position during passage of the box between said retracted die pads.

14. A box forming machine for erecting boxes from flat pre-cut sheet blanks, said blanks comprising a bottom panel having opposed pairs of side and end wall portions, the side wall portions of the blank including female locking slits, the end wall portions of the blank including male locking tabs adapted to be inserted into the female locking slits to lock the walls of the box in erected position, said box forming machine comprising, a first forming station having vertically reciprocating mandrel means, said mandrel means adapted to impress a pair of longitudinal score lines in said blank to delineate and partially erect a pair of side walls from the blank, a second forming station having vertically reciprocating mandrel means, respective deformable die pads mounted at the second forming station, said deformable die pads normally residing in an inactive position below said mandrel means, said mandrel means adapted to force portions of said blank into said deformable die pads, said mandrel means thereby adapted to impress a pair of transverse score lines in the blank to delineate and partially erect a pair of end walls from the blank, means for shifting said die pads outwardly from said active position to a retracted inactive position relative to said mandrel means, thereby to adapted the partially erected blank to be forced downwardly by said mandrel means between said retracted die pads, said die pads adapted to slidably engage said partially erected end walls, thereby to shift the end walls to an erected position, and plow means mounted on the mandrel means and adapted to spring the female slits of the side walls to an open position as the partially erected box is forced downwardly between said die pads, adapting male locking tabs to be inserted through said female locking slits, thereby to lock the walls in erected position during passage of the box between said retracted die pads.

15. A box forming machine for erecting boxes from flat pre-cut sheet blanks, said blanks comprising a bottom panel having opposed pairs of side and end wall portions, the side wall portions of the blank including female locking slits, the end wall portions of the blank including male locking tabs adapted to be inserted into the female locking slits to lock the walls of the box in erected position, said box forming machine comprising a first forming station having vertically reciprocating mandrel means, said mandrel means adapted to impress a pair of longitudinal score lines in said blank to delineate and partially erect a pair of side walls from the blank, a second forming station having vertically reciprocating mandrel means, respective deformable die pads mounted at the second forming station, said deformable die pads normally residing in an inactive position below said mandrel means, said mandrel means adapted to force portions of said blank into said deformable die pads, said mandrel means thereby adapted to impress a pair of transverse score lines in the blank to delineate and partially erect a pair of end walls from the blank, means for shifting said die pads outwardly from said active position to a retracted inactive position relative to said mandrel means, thereby to adapt the partially erected blank to be forced downwardly by said mandrel means between said retracted die pads, said die pads adapted to slidably engage said partially erected end walls, thereby to shift the end walls to erected position upon being forced between said retracted die pads, plow means mounted on the mandrel means and movable vertically therewith, said plow means adapted to engage the inside surface of the side walls adjacent the said female slits, stationary guide means including vertical channel ways providing clearance for the vertically movable plow means, said plow means adapted to spring said female slits to an open position into the vertical channel ways as the partially erected box is forced downwardly between said die pads, and means adapted to guide the male locking tabs of the end walls through said locking slits during erection thereof, thereby to lock the walls in erected position during passage of the box between said retracted die pads.

16. A box forming machine for erecting boxes from flat pre-cut sheet blanks, said blanks adapted to provide a bottom panel having side and end wall portions, said box forming machine comprising, a magazine adapted to confine a plurality of said flat blanks in stacked formation, means adapted to withdraw said flat blanks individually from the magazine, a longitudinal support surface adjacent said magazine adapted to receive the said flat blanks which are withdrawn from the magazine, an alignment mechanism having a pair of pushers mounted along the opposite sides of said support surface, said pushers adapted to reciprocate in a horizontal plane transversely relative to the support surface from a retracted position toward one another, said pushers adapted to engage the opposite side edges of the blank and to shift the same transversely into alignment with the longitudinal axis of the support surface, a first forming station mounted in a position downstream from said alignment mechanism, said first forming station adapted to impress a pair of longitudinal score lines in said blank to delineate and partially erect a pair of side walls from the blank, a first pusher adapted to reciprocate longitudinally and to advance the blank along the longitudinal support surface from said alignment mechanism to said first forming station, a second forming station mounted downstream from said first forming station, said second forming station adapted to impress a pair of transverse score lines in said blank to delineate and partially erect the end walls from said blank, a second reciprocating pusher adapted to engage the blank at said first forming station and to advance the same longitudinally along said support surface to the second forming station.

17. A box forming machine as set forth in claim 16 in which the magazine is provided with side members adapted to engage the side edges of said blanks in stacked formation, and in which the position of the side members may be varied transversely relative to the machine in accordance with the width dimension of the stack of blanks which are confined in the magazine.

18. A box forming machine for erecting boxes from flat pre-cut sheet blanks, said blanks adapted to provide a bottom panel having side and end wall portions, said box forming machine comprising, a magazine adapted to confine a plurality of said flat blanks in stacked formation, means adapted to withdraw said flat blanks individually from the magazine, a longitudinal support surface adjacent said magazine adapted to receive the said flat blanks which are withdrawn from the magazine, a first forming station mounted relative to the machine downstream from said magazine, said first forming station adapted to impress a pair of longitudinal score lines in said blank to delineate and partially erect the side walls of the blank, a positioning mechanism mounted for reciprocation longitudinally of said support surface, first and second pusher elements mounted on said positioning mechanism, said first pusher element adapted to advance the blank along the support surface to said first forming station, a second forming station mounted downstream from said first forming station, said second forming station adapted to impress a pair of transverse score lines in said blank to delineate and partially erect the end walls of said blank, said second pusher element adapted to engage the trailing edge of the partially formed blank at the first forming station and to advance the same to the second forming station.

19. A box forming machine as set forth in claim 18 which the longitudinal position of the positioning mechanism, including said first and second pusher elements, may be varied longitudinally of the machine to vary the position of the blank on the support surface relative to the first and second forming stations, thereby to vary the location of the transverse score lines to control the length dimension of the box in accordance with the length dimension of the blank.

20. A box forming machine for erecting boxes from flat pre-cut sheet blanks, said blanks adapted to provide a bottom panel having side and end wall portions, said box forming machine comprising, a magazine adapted to confine a plurality of said flat blanks in stacked formation, means adapted to withdraw said flat blanks individually from the magazine, a longitudinal support surface adjacent said magazine adapted to receive the said flat blanks which are withdrawn from the magazine, a first forming station mounted relative to the machine downstream from said magazine, said first forming station adapted to impress a pair of longitudinal score lines in said blank to delineate and partially erect the side walls of the blank, a positioning mechanism mounted for reciprocation longitudinally of said support surface, first and second pusher elements mounted on said positioning mechanism, said first pusher element adapted to advance the blank along the support surface to said first forming station, stationary stop means mounted at said first station, said stop means adapted to engage the leading edge of the blank upon advancement thereof by the first pusher element to the first forming station, and a second forming station mounted downstream from said first forming station, said second forming station adapted to impress a pair of transverse score lines in said blank to delineate and partially erect the end walls of said blank, said second pusher element adapted to engage the trailing edge of the partially formed blank at the first forming station and to advance the same to the second forming station.

21. A box forming machine for erecting boxes from flat precut sheet blanks, said blanks adapted to provide a bottom panel having side and end walls portions, said box forming machine comprising, a magazine adapted to confine a plurality of said flat blanks in stacked formation, means adapted to withdraw said flat blanks individually from the magazine, a longitudinal support surface adjacent said magazine adapted to receive the said flat blanks which are withdrawn from the magazine, an alignment mechanism having a pair of pushers mounted along the opposite sides of said support surface, said pushers adapted to reciprocate in a horizontal plane transversely relative to the support surface from a retracted position toward one another, said pushers adapted to engage the opposite side edges of the blank and to shift the same transversely into alignment with the longitudinal axis of the machine, a first forming station mounted in a position downstream from said alignment mechanism, said first forming station adapted to impress a pair of longitudinal score lines in said blank to delineate and partially erect the side walls of the blank, a positioning mechanism mounted for reciprocation longitudinally of said support surface, first and second pusher elements mounted on said positioning mechanism, said first pusher element adapted to advance the blank along the support surface to said first forming station, a second forming station mounted downstream from said first forming station, said second forming station adapted to impress a pair of transverse score lines in said blank to delineate and partially erect the end walls of said blank, said second pusher element adapted to engage the trailing edge of the partially formed blank at the first forming station and to advance the same toward the second forming station.

22. A box forming machine for erecting boxes from flat precut sheet blanks, said blanks adapted to provide a bottom panel having side and end wall portions, said box forming machine comprising, a magazine adapted to confine a plurality of said flat blanks in stacked formation, means adapted to withdraw said flat blanks individually from the magazine, a longitudinal support surface adjacent said magazine adapted to receive the said flat blanks which are withdrawn from the magazine, an alignment mechanism having a pair of pushers mounted along the opposite sides of said support surface, said pushers adapted to reciprocate in a horizontal plane transversely relative to the support surface from a retracted position toward one another, said pushers adapated to engage the opposite side edges of the blank and to shift the same transversely into alignment with the longitudinal axis of the machine, support surface, a first forming station mounted in a position downstream from said alignment mechanism, said first forming station adapted to impress a pair of longitudinal score lines in said blank to delineate and partially erect the side walls of the blank, a positioning mechanism mounted for reciprocation longitudinally of said support surface, first and second pusher elements mounted on said said positioning mechanism, said first pusher element adapted to advance the blank along the support surface to said first forming station, a second forming station mounted downstream from said first forming station, said second forming station adapted to impress a pair of transverse score lines in said blank to delineate and partially erect the end walls of said blank, said second pusher element adapted to engage the trailing edge of the partially formed blank at the first forming station and to advance the same toward the second forming station, and stop means mounted relative to the second forming station in a position to engage the leading edge of the blank which is advanced by the second pusher element, said stop means adapted to locate the blank longitudinally relative to the second forming station.

23. In a box forming machine for erecting boxes from flat pre-cut sheet blanks, said blanks adapted to provide a bottom panel having pairs of wall portions, a mechanism for feeding said blanks individually to the components of the box forming machine comprising, a magazine adapted to confine a plurality of said flat blanks in stacked formation, a longitudinal support surface extending downstream from the magazine, a suction mouthpiece assembly mounted for reciprocation in an arc downwardly from a position adjacent the lower end of said magazine to a position adjacent the support surface, a plurality of suction mouthpieces mounted for pivotal motion upon the reciprocating mouthpiece assembly, actuating means for swinging said mouthpieces relative to said assembly to a pick-up position adapted to engage lower edge portion of the lowermost blank of the stack in the magazine when said assembly swings to a position adjacent the lower end of the magazine, thereby to withdraw a blank therefrom, said mouthpiece assembly thereafter adapted to reciprocate from said pick-up position in said arc downwardly and outwardly toward said longitudinal support surface, thereby to advance the lower edge portion of the blank toward the support surface, said actuating means adapted to pivot said suction mouthpieces toward said support surface when the mouthpiece assembly reciprocates toward the support surface, said mouthpieces thereupon adapted to deposit the blank upon said support surface for advancement of the blank along the support surface to the components of the machine.

24. A box forming machine for erecting boxes from flat pre-cut sheet blanks, said blanks adapted to provide a bottom panel having pairs of wall portions, a mechanism for feeding said blanks individually to the components of the box forming machine comprising, a magazine adapted to confine a plurality of said flat blanks in stacked formation, a longitudinal support surface extending downstream from the magazine, a suction mouthpiece assembly mounted for reciprocation from a position adjacent the lower end of said magazine to a position adjacent the support surface, plurality of suction mouthpieces mounted for pivotal motion upon the reciprocating mouthpiece assembly, actuating means for swinging said mouthpieces relative to said assembly to a pick-up position adapted to contact the lower edge portion of the lowermost blank of the stack in the magazine when said assembly swings to a position adjacent the lower end of the magazine, means for applying vacuum to said mouthpieces upon reaching said pick-up position, thereby to engage the blank, said mouthpiece assembly thereafter adapted to reciprocate from said pick-up position outwardly toward said longitudinal support surface, thereby to withdraw the blank from the magazine and to advance the blank toward the support surface, said actuating means adapted to pivot said suction mouthpieces downwardly toward said support surface when the mouthpiece assembly reciprocates toward the support surface, said valve means adapted to apply atmospheric pressure to said mouthpieces, thereby to disengage and deposit the blank upon said support surface for advancement of the components of the machine.

25. In a box forming machine for erecting boxes from flat pre-cut sheet blanks, said blanks comprising a bottom panel including opposed pairs of side and end wall portions, said side wall portions including female locking slits and the end wall portions including male locking tabs adapted to be inserted into the said female locking slits, a mechanism for erecting the end walls and inserting the male tabs into the female slits after erection of the side walls comprising, a second forming station having vertically reciprocating mandrel means adapted to impress a pair of transverse score lines in said blank, thereby to delineate and partially erect a pair of end walls from said blank, plow elements mounted on the said mandrel means, said plow elements located in positions to engage the inside surface of the pair of side walls in areas thereof which are in proximity to said female locking slits, respective pairs of spaced roller elements mounted in positions to track against the outside surface of the side walls and to straddle the plow element, said plow elements thereby adapted to open said female locking slits during downward motion of said partially erected box while engaged by said mandrel means, pairs of rollers and plow elements, means for shifting the opposed end walls to erected position during said downward motion of the partially erected box, and guide means adapted to direct the said male locking tabs into said female locking slits as the end walls are shifted to erected position, thereby to lock the walls in erected position during downward motion of the box with the mandrel and plow elements at the second forming station.

26. In a box forming machine for erecting boxes from flat pre-cut sheet blanks, said blanks comprising a bottom panel including opposed pairs of side and end wall portions, said side wall portions including female locking slits and the end wall portions, said side wall portions including female locking slits and the end wall portions including male locking tabs adapted to be inserted into the said female locking slits, a mechanism for erecting the end walls and inserting the male tabs into the female slits after erection of the side walls comprising, a second forming station having vertically reciprocating mandrel means adapted to impress a pair of transverse score lines in said blank, thereby to delineate and partially erect a pair of end walls from said blank, plow elements mounted on the said mandrel means, said plow elements located in positions to engage the internal surface of the pair of side walls in areas thereof which are in proximity to said female locking slits, and respective pairs of spaced rollers mounted for rotation relative to the reciprocating mandrel means at the second forming station, said pairs of rollers being adapted to track against the external surface of said second pair of side walls, said pairs of rollers located in positions to straddle said plow elements, said plow elements and pairs of spaced rollers adapted to open said female locking slits during downward motion of said partially erected box while engaged by said mandrel means and plow elements, means for shifting the pair of end walls to erected position during said downward motion of the partially erected box, and guide means adapted to direct the said male locking tabs into said female locking slits as the end walls are shifted to erected position, thereby to lock the walls in erected position during downward motion of the box with the mandrel and plow elements at the second forming station.

References Cited in the file of this patent

UNITED STATES PATENTS

| | | |
|---|---|---|
| 420,194 | Gauchot | Jan. 28, 1890 |
| 1,582,205 | Wrigley | Apr. 27, 1926 |
| 2,488,551 | Nordquist et al. | Nov. 22, 1949 |
| 2,798,416 | Clement | July 9, 1957 |
| 2,805,060 | Lefief | Sept. 3, 1957 |
| 2,930,294 | Ritscher | Mar. 29, 1960 |
| 2,954,725 | Palmer | Oct. 4, 1960 |
| 2,969,719 | Shenigo | Jan. 31, 1961 |
| 2,995,991 | Trelford | Aug. 15, 1961 |
| 3,025,769 | Flynn | Mar. 20, 1962 |